(12) United States Patent
Harif

(10) Patent No.: US 10,882,115 B2
(45) Date of Patent: Jan. 5, 2021

(54) CUTTING INSERT WITH INTERNAL COOLING, MOLD AND METHOD FOR MANUFACTURE THEREOF

(71) Applicant: NO SCREW LTD., Holon (IL)

(72) Inventor: Gershon Harif, Ramat Gan (IL)

(73) Assignee: NO SCREW LTD., Holon (IL)

( * ) Notice: Subject to any disclaimer, the term of this patent is extended or adjusted under 35 U.S.C. 154(b) by 79 days.

(21) Appl. No.: 16/160,746

(22) Filed: Oct. 15, 2018

(65) Prior Publication Data

US 2019/0047054 A1 Feb. 14, 2019

Related U.S. Application Data

(63) Continuation-in-part of application No. 14/901,514, filed as application No. PCT/IL2014/050573 on Jun. 26, 2014, now Pat. No. 10,124,412.

(30) Foreign Application Priority Data

Jun. 27, 2013 (IL) .......................................... 227228

(51) Int. Cl.
*B23B 27/10* (2006.01)
*B23B 51/04* (2006.01)
(Continued)

(52) U.S. Cl.
CPC ............ *B23B 27/10* (2013.01); *B23B 27/145* (2013.01); *B23B 51/048* (2013.01); *B23B 51/06* (2013.01);
(Continued)

(58) Field of Classification Search
CPC ....... B23B 27/10; B23B 27/145; B23B 51/06; B23B 5/28; B23B 2200/125
See application file for complete search history.

(56) References Cited

U.S. PATENT DOCUMENTS 4,544,517 A 10/1985 Ohno
5,237,894 A 8/1993 Lindeke
(Continued)

FOREIGN PATENT DOCUMENTS

DE 102006034489 1/2008
DE 102006034489 A1 1/2008
(Continued)

*Primary Examiner* — Alan Snyder
(74) *Attorney, Agent, or Firm* — Dorsey & Whitney LLP

(57) ABSTRACT

A cutting insert is provided, comprising a top surface, a bottom surface, a plurality of side surfaces spanning therebetween, and a cutting edge formed at an intersection of the side surface and a forwardly-disposed portion of the top the surface. It further comprises a cooling cavity projecting into the insert, a top end thereof being disposed further forwardly than an open bottom end thereof. The cooling cavity defines at least one molding axis such that a solid element having the shape of the cooling cavity and completely inserted therein may be retracted intact therefrom along a linear path parallel to the molding axis. A circumscribing portion is formed on the side surfaces encircling the cutting insert. The circumscribing portion is formed parallel to the molding axis and has a non-zero height along its entire extent. The cutting insert does not extend beyond the circumscribing portion.

14 Claims, 83 Drawing Sheets

(51) Int. Cl.
   *B23C 5/20* (2006.01)
   *B23C 5/28* (2006.01)
   *B30B 11/02* (2006.01)
   *B23B 27/14* (2006.01)
   *B23B 51/06* (2006.01)
   *B30B 15/02* (2006.01)

(52) U.S. Cl.
   CPC ............... *B23C 5/207* (2013.01); *B23C 5/28* (2013.01); *B30B 11/02* (2013.01); *B30B 15/022* (2013.01); *B23B 2200/0476* (2013.01); *B23B 2200/083* (2013.01); *B23B 2200/286* (2013.01); *B23B 2200/3618* (2013.01); *B23B 2205/12* (2013.01); *B23B 2205/16* (2013.01); *B23B 2250/12* (2013.01); *B23B 2251/50* (2013.01); *B23C 2210/168* (2013.01); *B23C 2250/12* (2013.01); *B25D 2217/0061* (2013.01)

(56) References Cited

U.S. PATENT DOCUMENTS

| | | | |
|---|---|---|---|
| 5,346,335 A | 9/1994 | Harpas et al. | |
| 5,775,854 A | 7/1998 | Wertheim | |
| 5,901,623 A | 5/1999 | Hong | |
| 6,053,669 A | 4/2000 | Lagerberg | |
| 6,705,805 B2 | 3/2004 | Lagerberg | |
| 7,634,957 B2 | 12/2009 | Ghosh et al. | |
| 7,934,891 B2 | 5/2011 | Jonsson et al. | |
| 7,959,384 B2 | 6/2011 | Breisch | |
| 7,997,832 B2 | 8/2011 | Prichard et al. | |
| 8,328,471 B2 | 12/2012 | Nelson et al. | |
| 8,967,921 B2 * | 3/2015 | Yamaguchi | B23B 51/048 407/113 |
| 9,656,323 B2 | 5/2017 | Harif | |
| 2001/0007215 A1 | 7/2001 | Murata et al. | |
| 2002/0172569 A1 | 11/2002 | Nakamura | |
| 2004/0086415 A1 | 5/2004 | Gubanich et al. | |
| 2004/0240949 A1 | 12/2004 | Pachao-Morbitzer et al. | |
| 2007/0042217 A1 | 2/2007 | Fang et al. | |
| 2010/0272529 A1 | 10/2010 | Rozzi et al. | |
| 2011/0027021 A1 | 2/2011 | Nelson et al. | |
| 2013/0078043 A1 | 3/2013 | Henry et al. | |
| 2013/0108383 A1 | 5/2013 | Scheicher | |
| 2013/0251463 A1 | 9/2013 | Harif | |
| 2013/0266681 A1 | 10/2013 | Cripps | |
| 2014/0079495 A1 | 3/2014 | Chen et al. | |
| 2014/0086695 A1 | 3/2014 | Jameson et al. | |
| 2015/0139744 A1 | 5/2015 | Harif | |
| 2017/0368612 A1 | 12/2017 | Imai et al. | |

FOREIGN PATENT DOCUMENTS

| | | | |
|---|---|---|---|
| EP | 0791420 | 8/1997 | |
| EP | 0791420 A1 | 8/1997 | |
| JP | 333005 | 4/1991 | |
| JP | 6562229 B1 * | 8/2019 | ......... B23B 27/1622 |
| WO | 2012/070046 | 5/2012 | |
| WO | 2012070046 A1 | 5/2012 | |

* cited by examiner

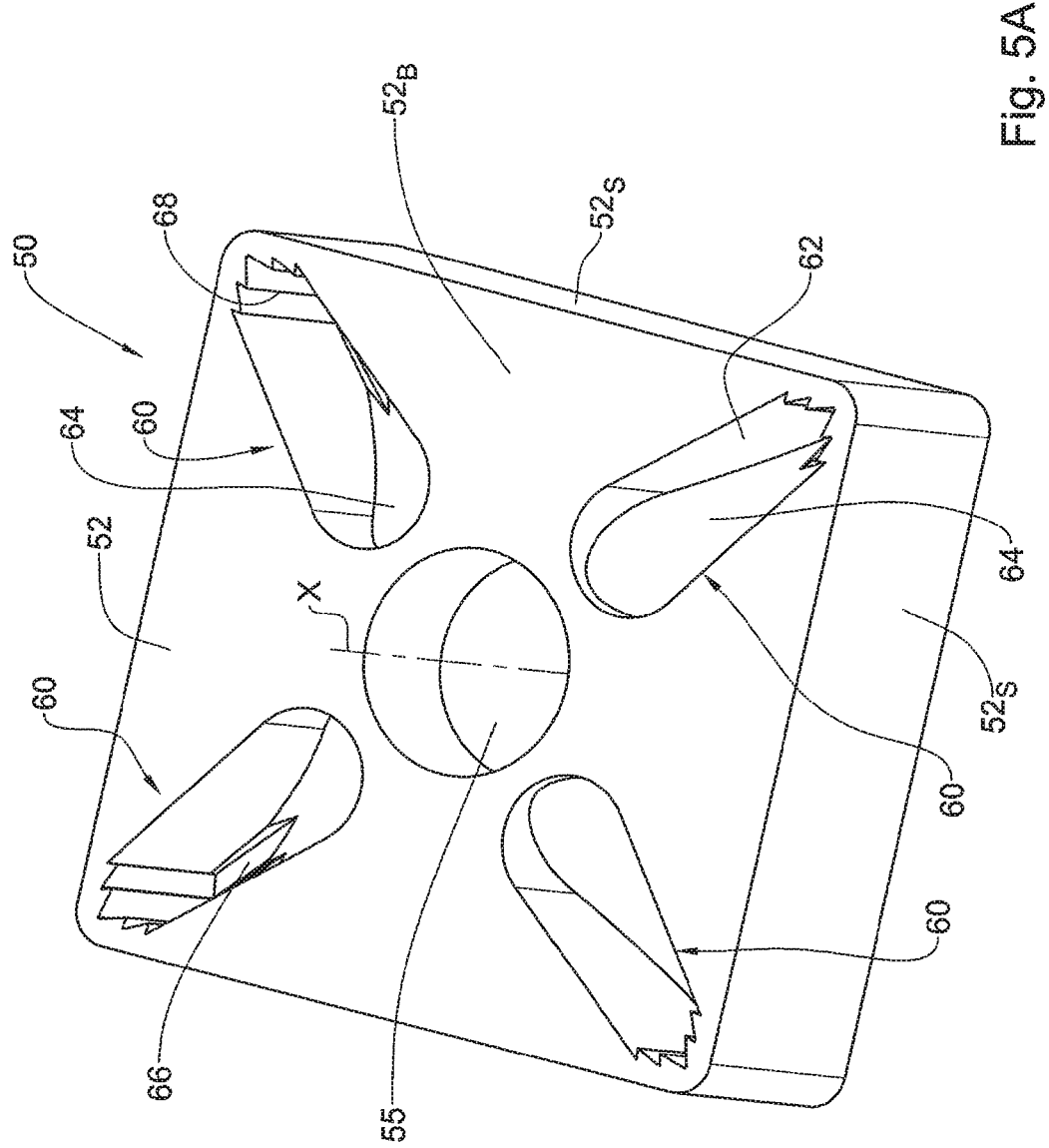

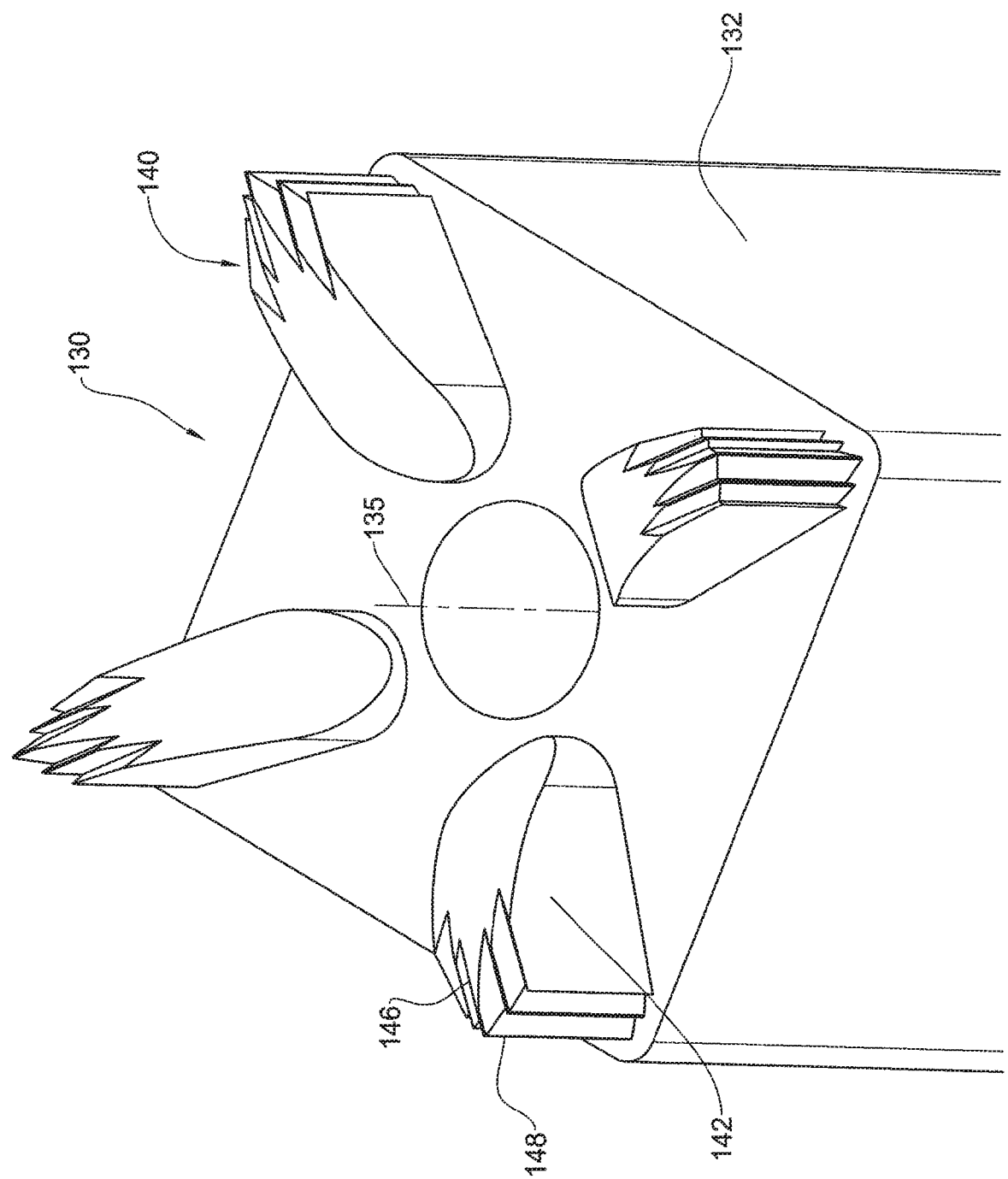

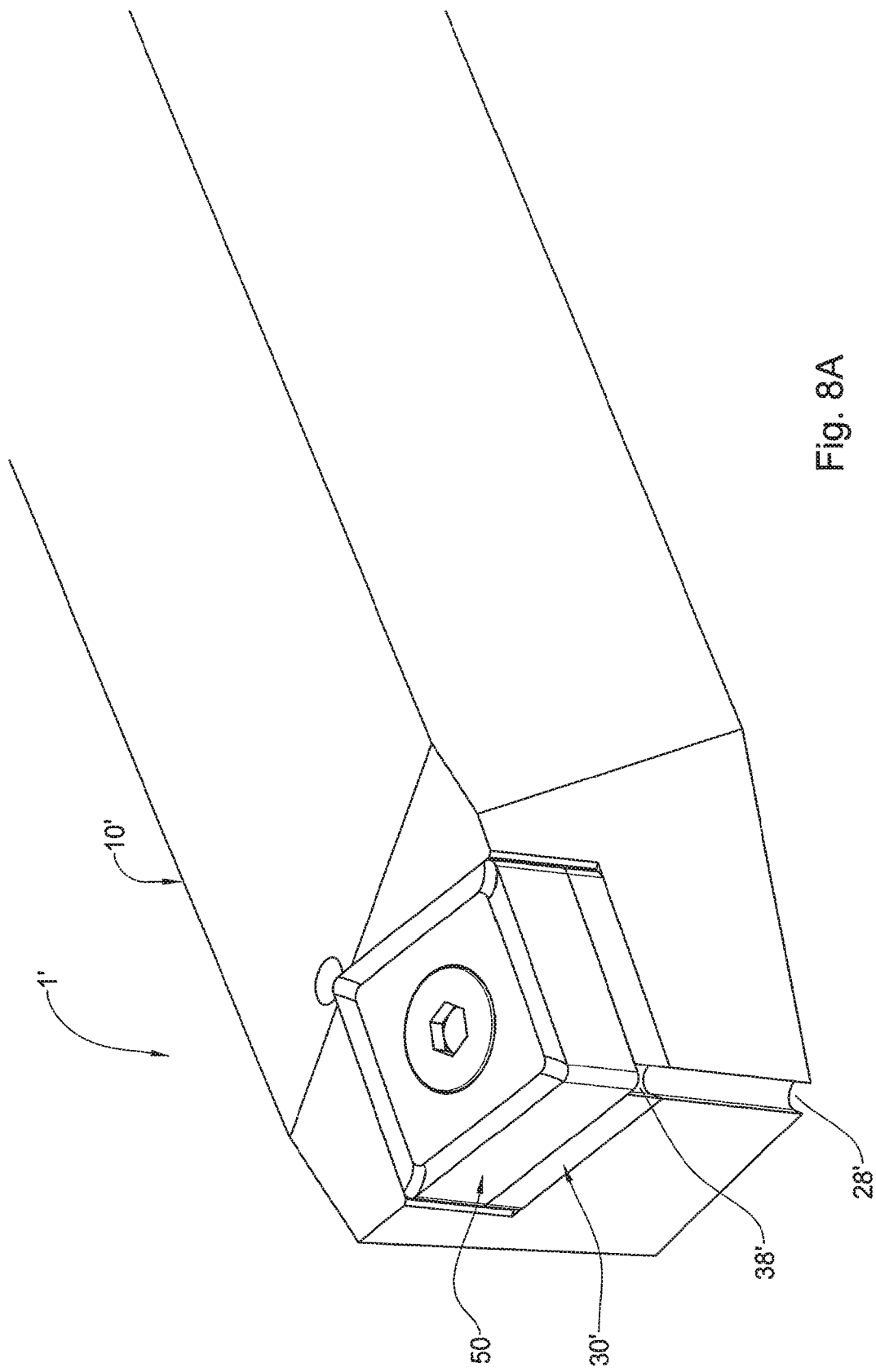

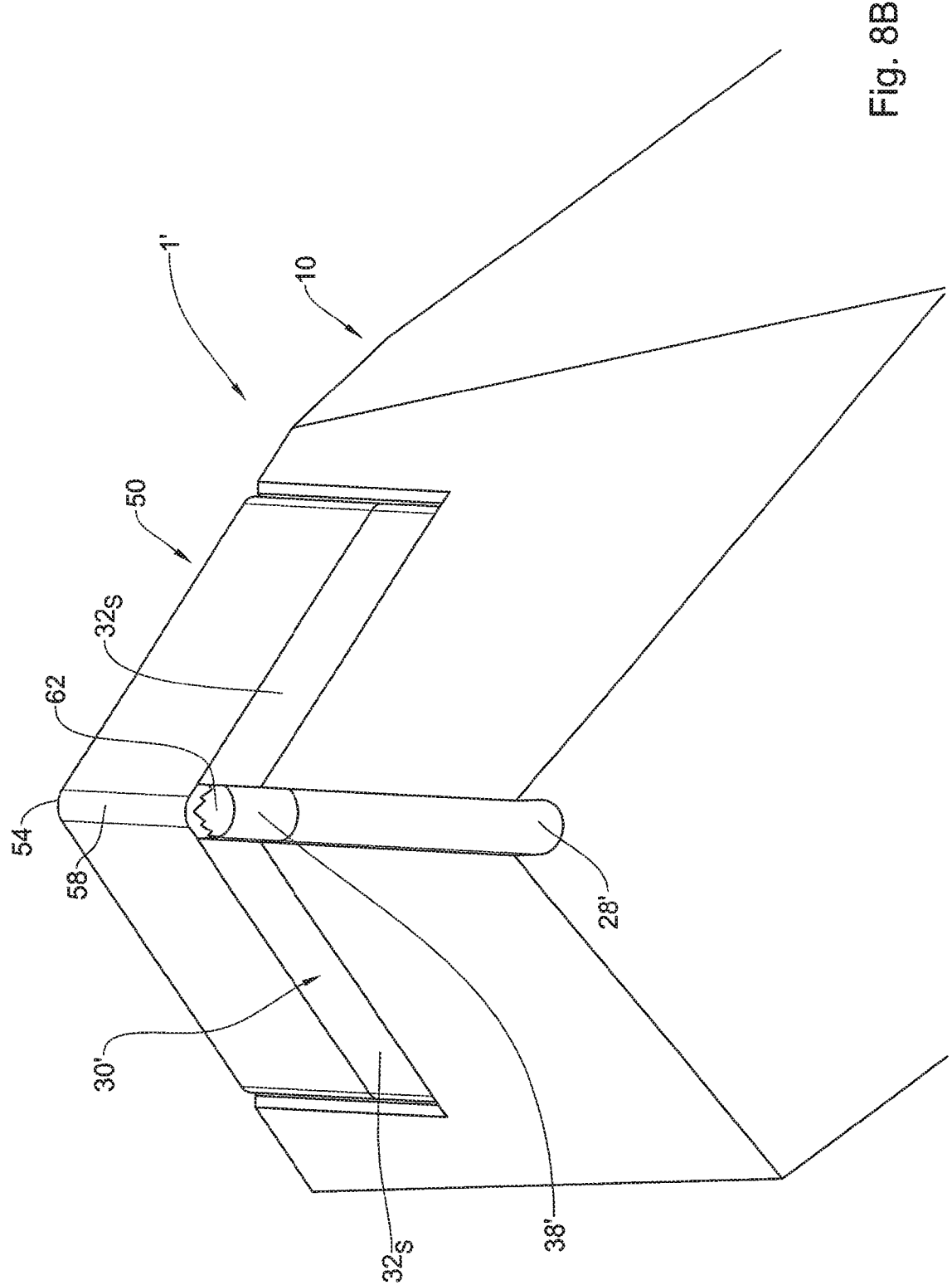

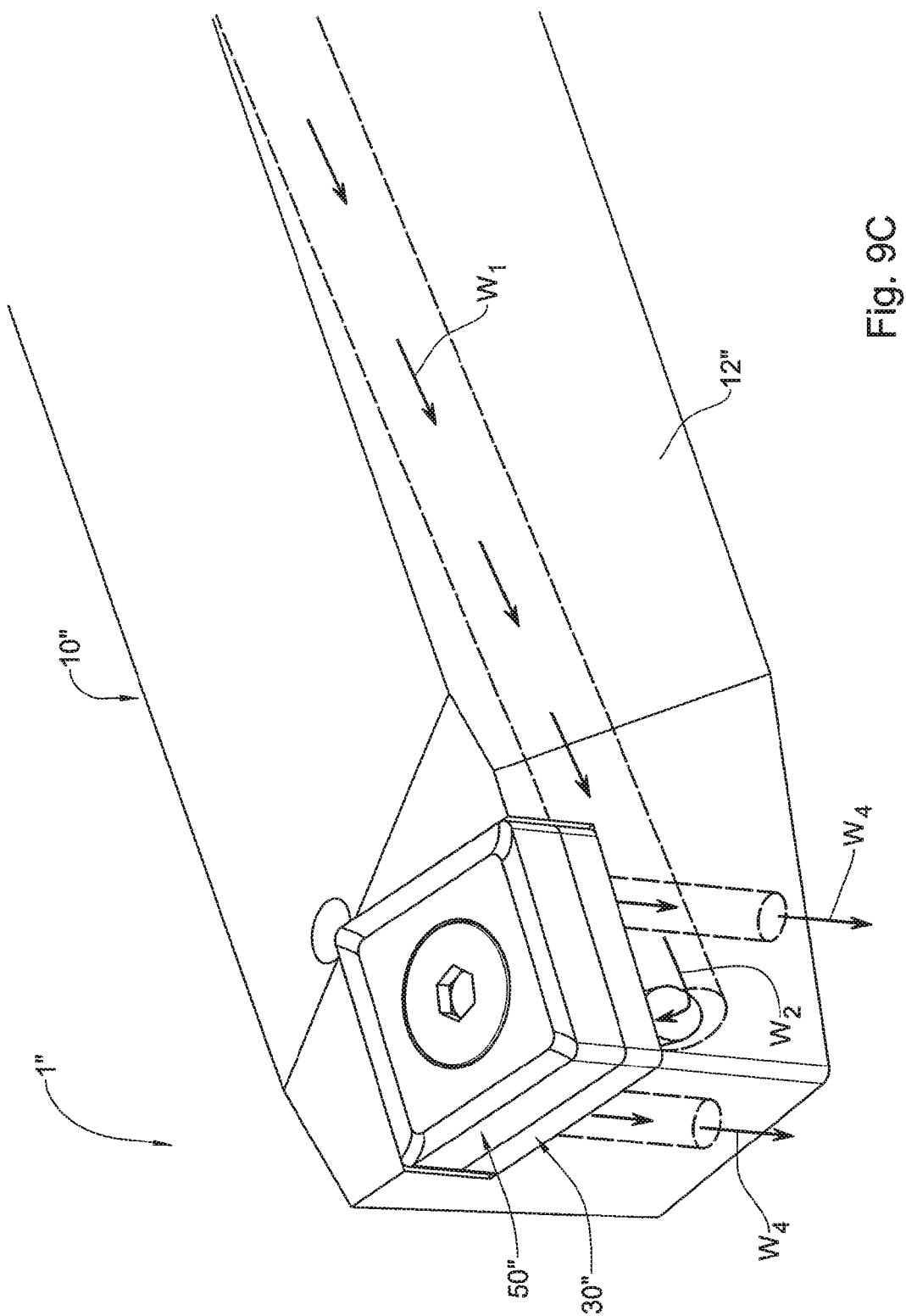

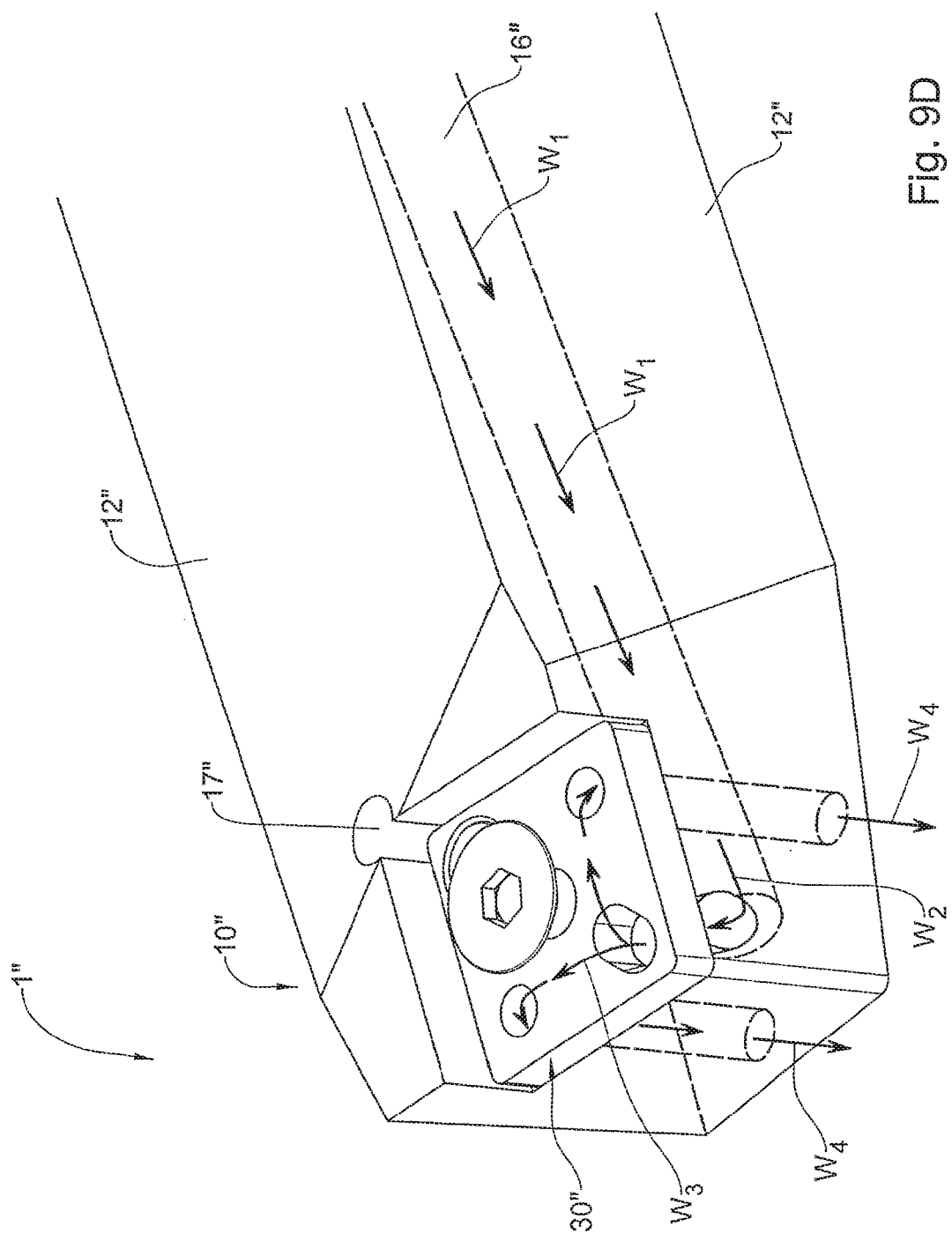

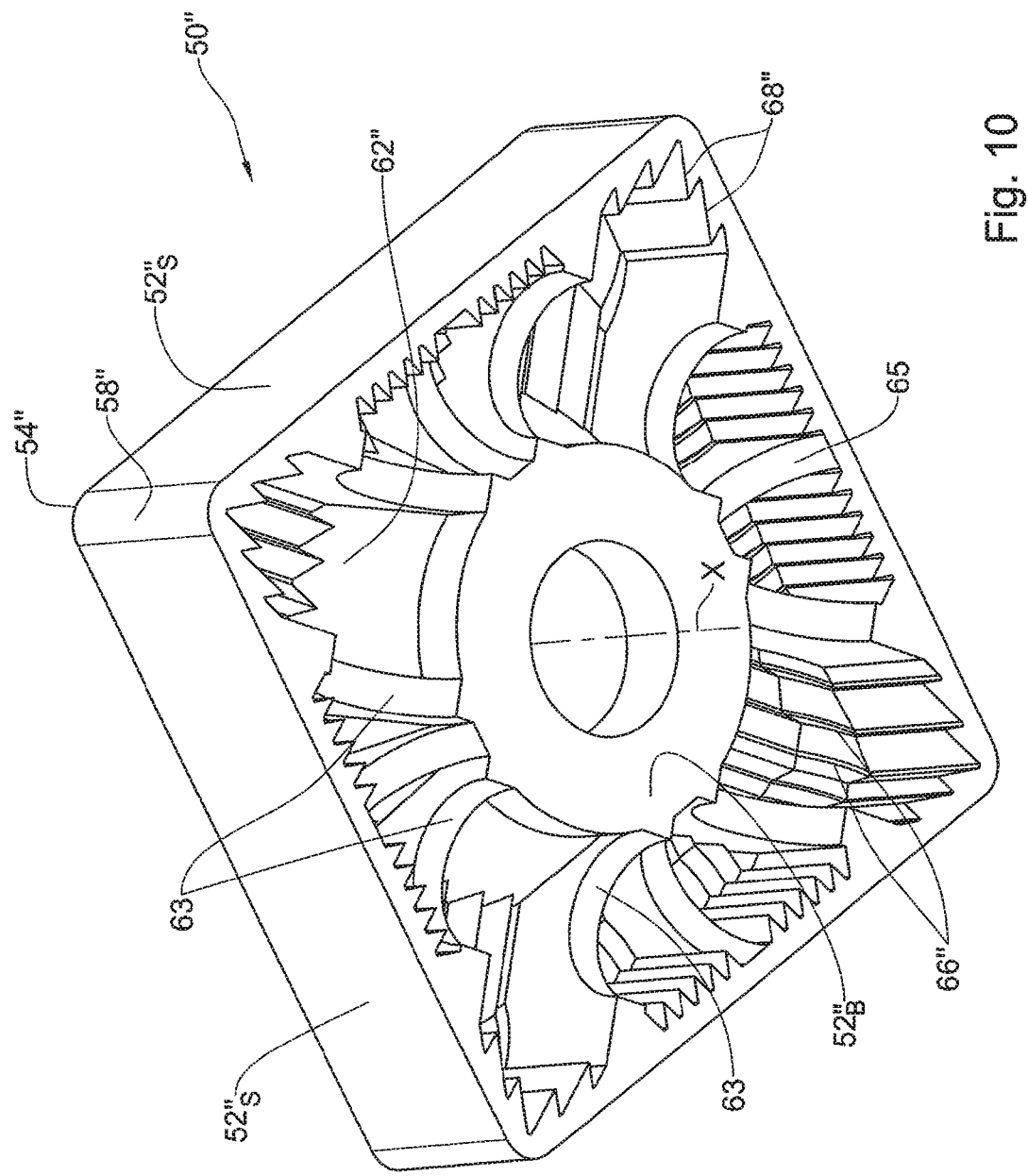

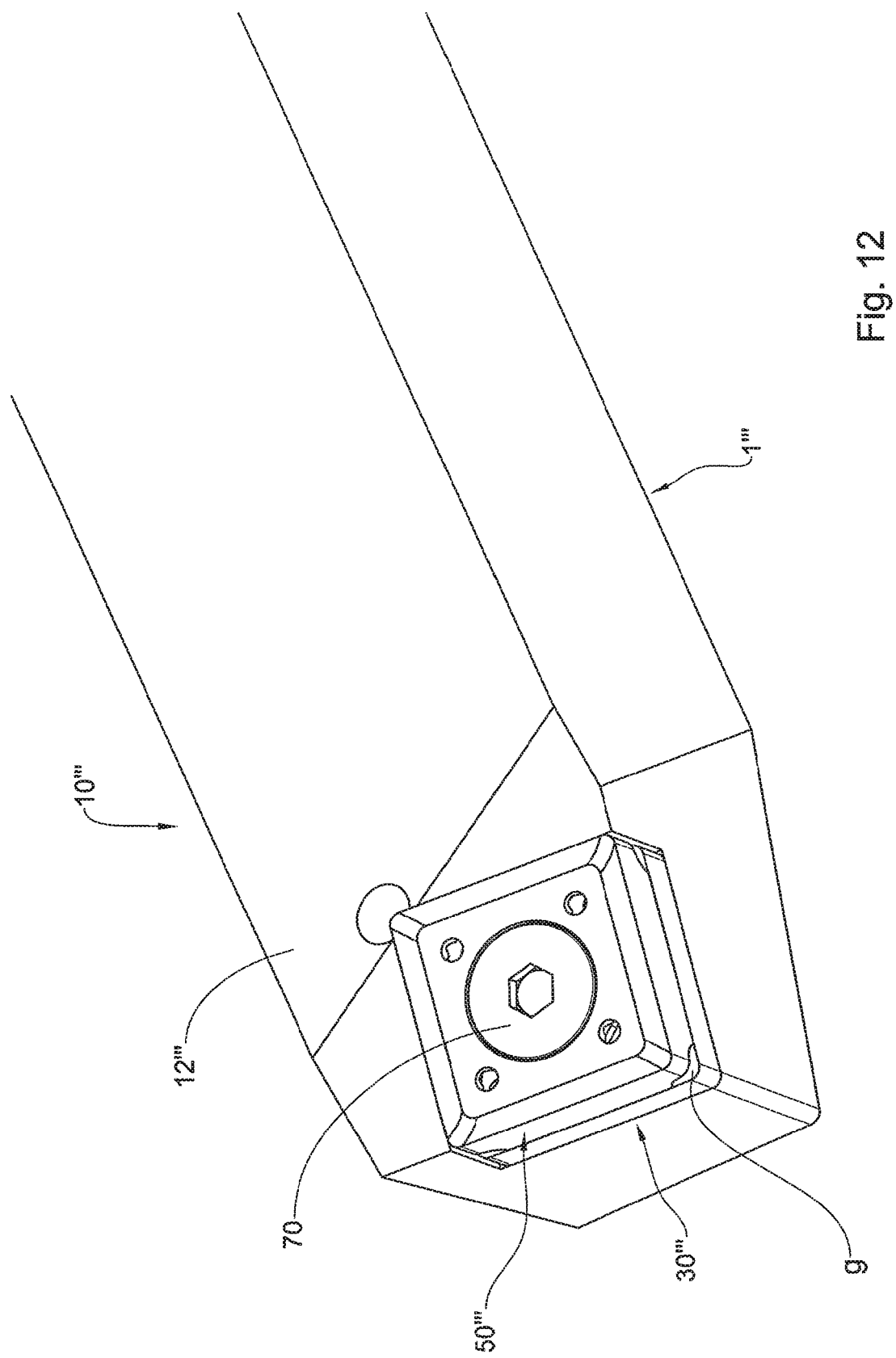

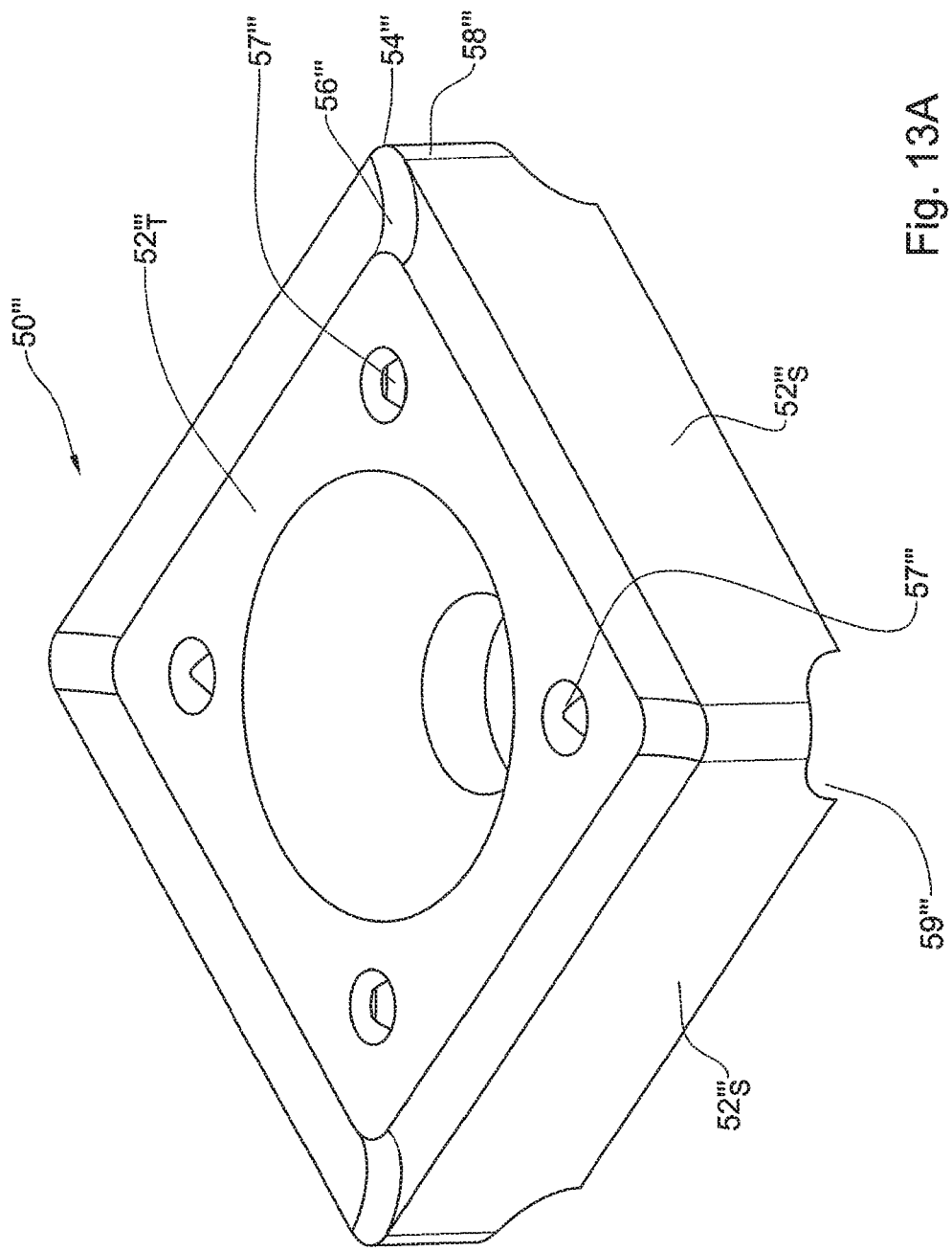

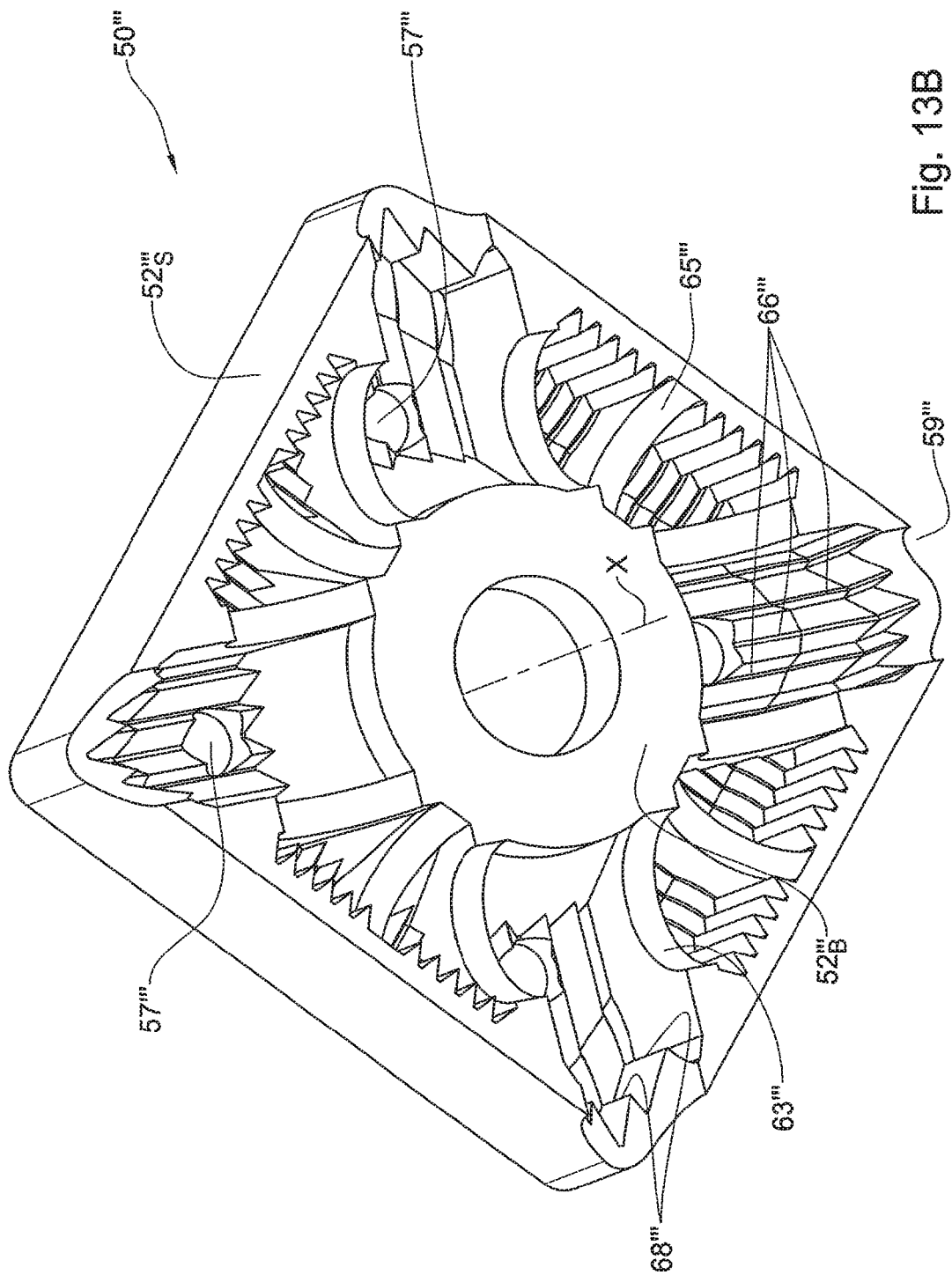

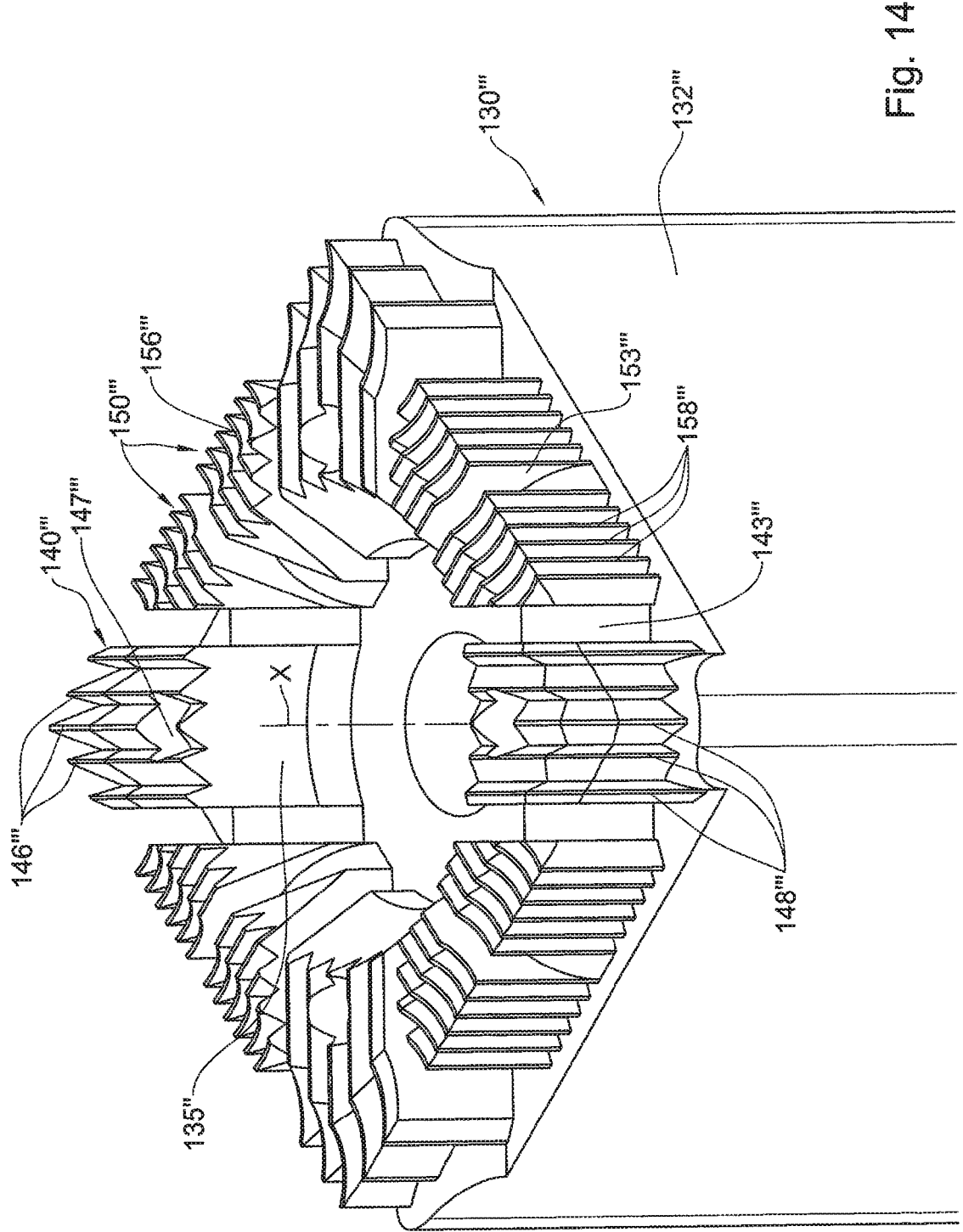

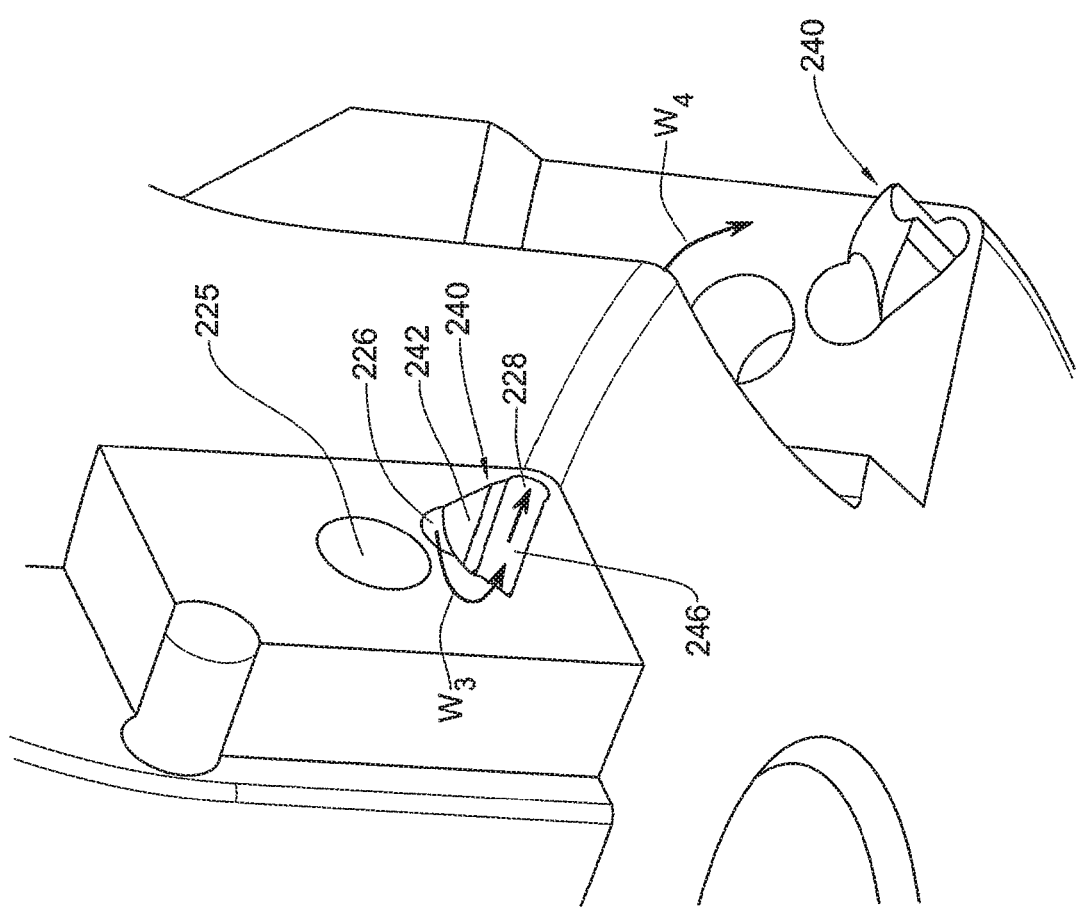

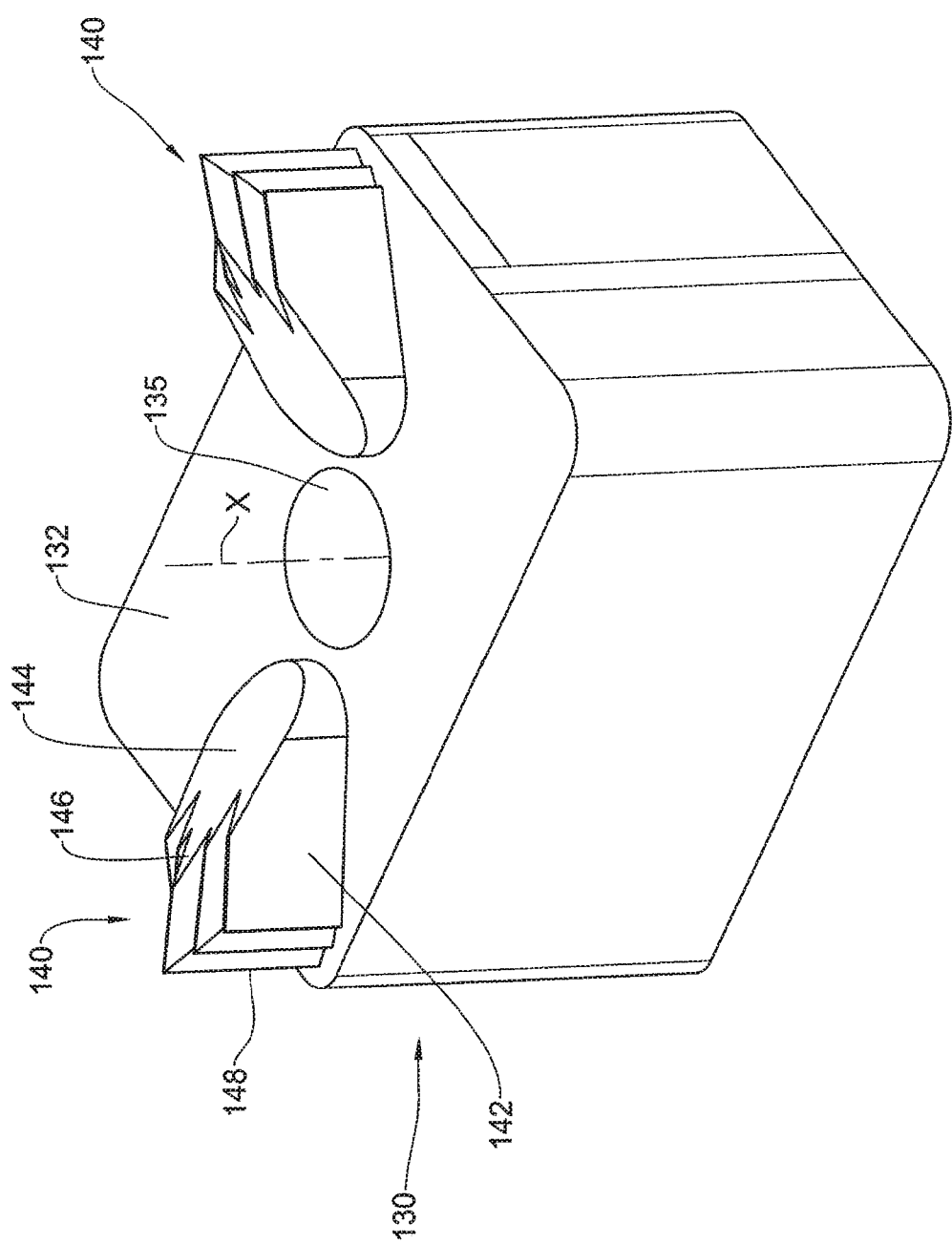

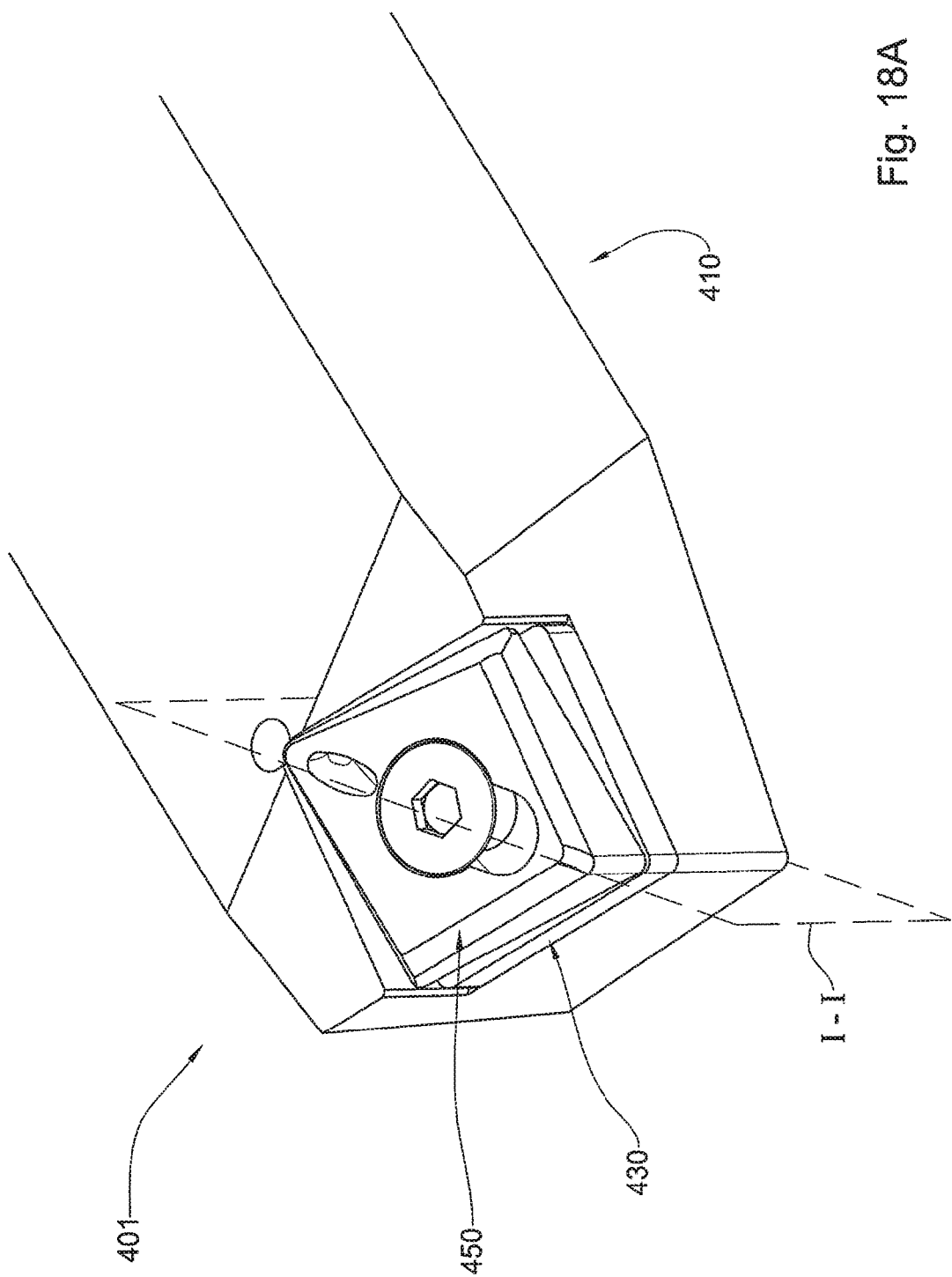

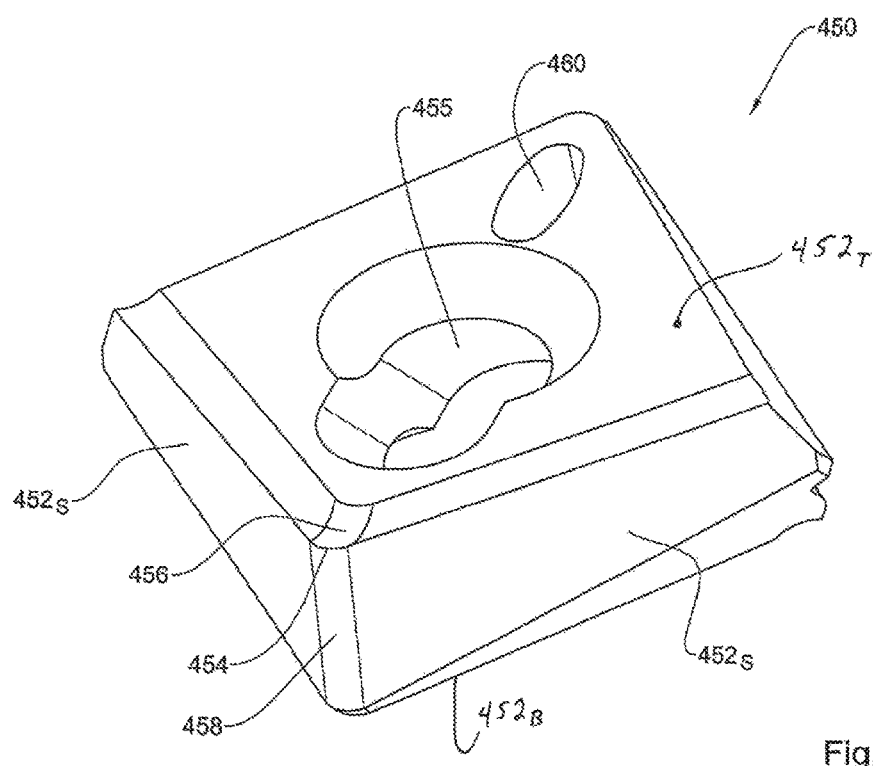
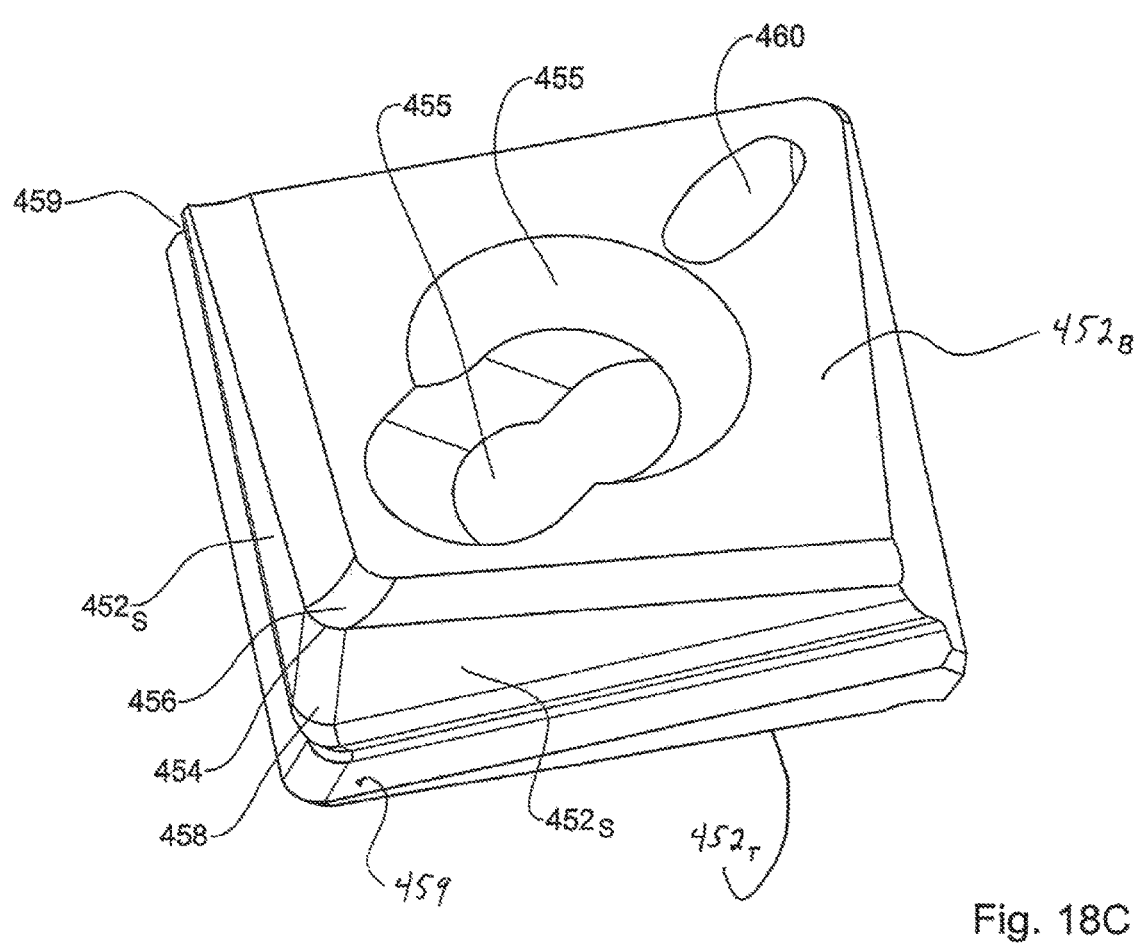
Fig. 18B
Fig. 18C

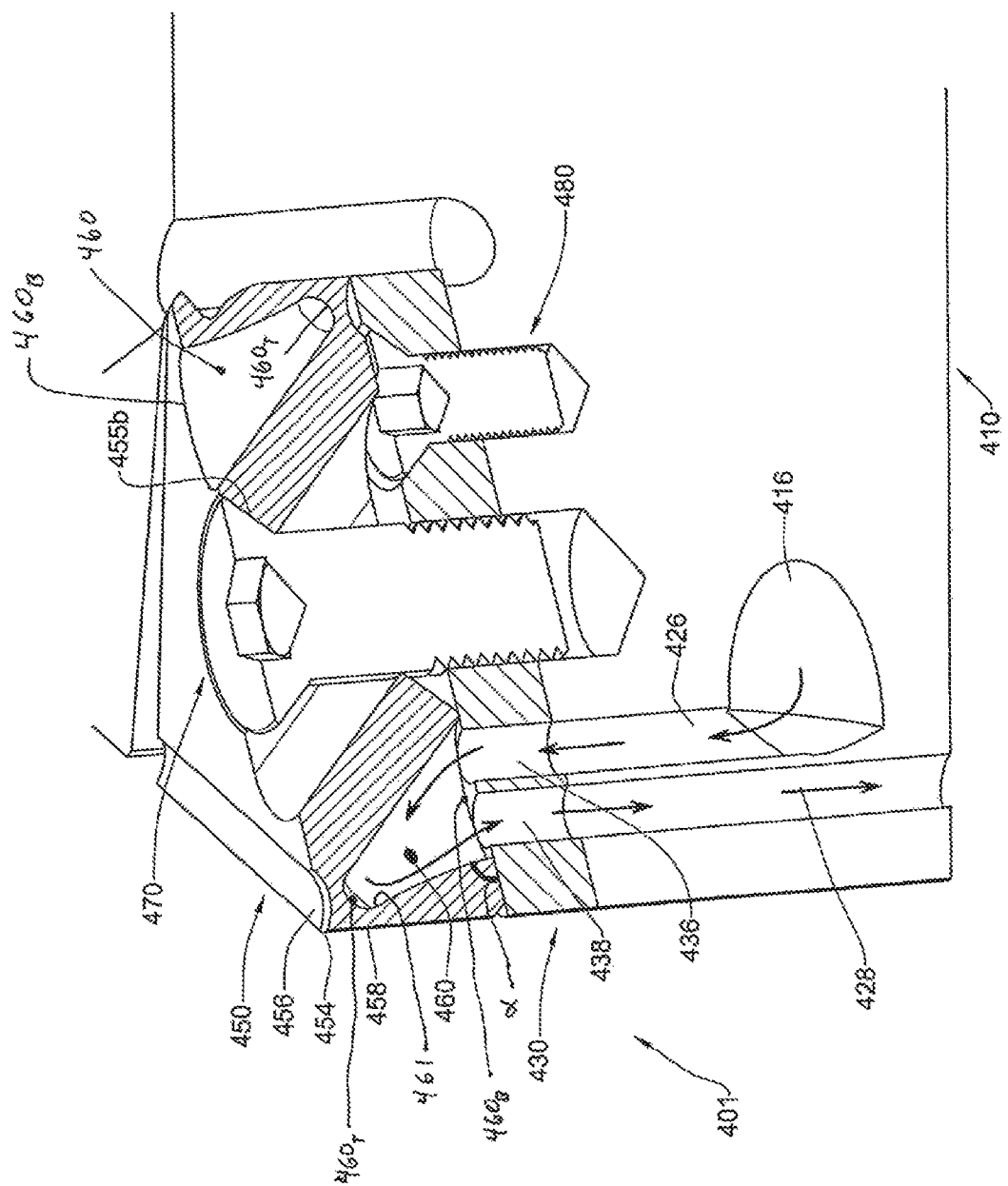

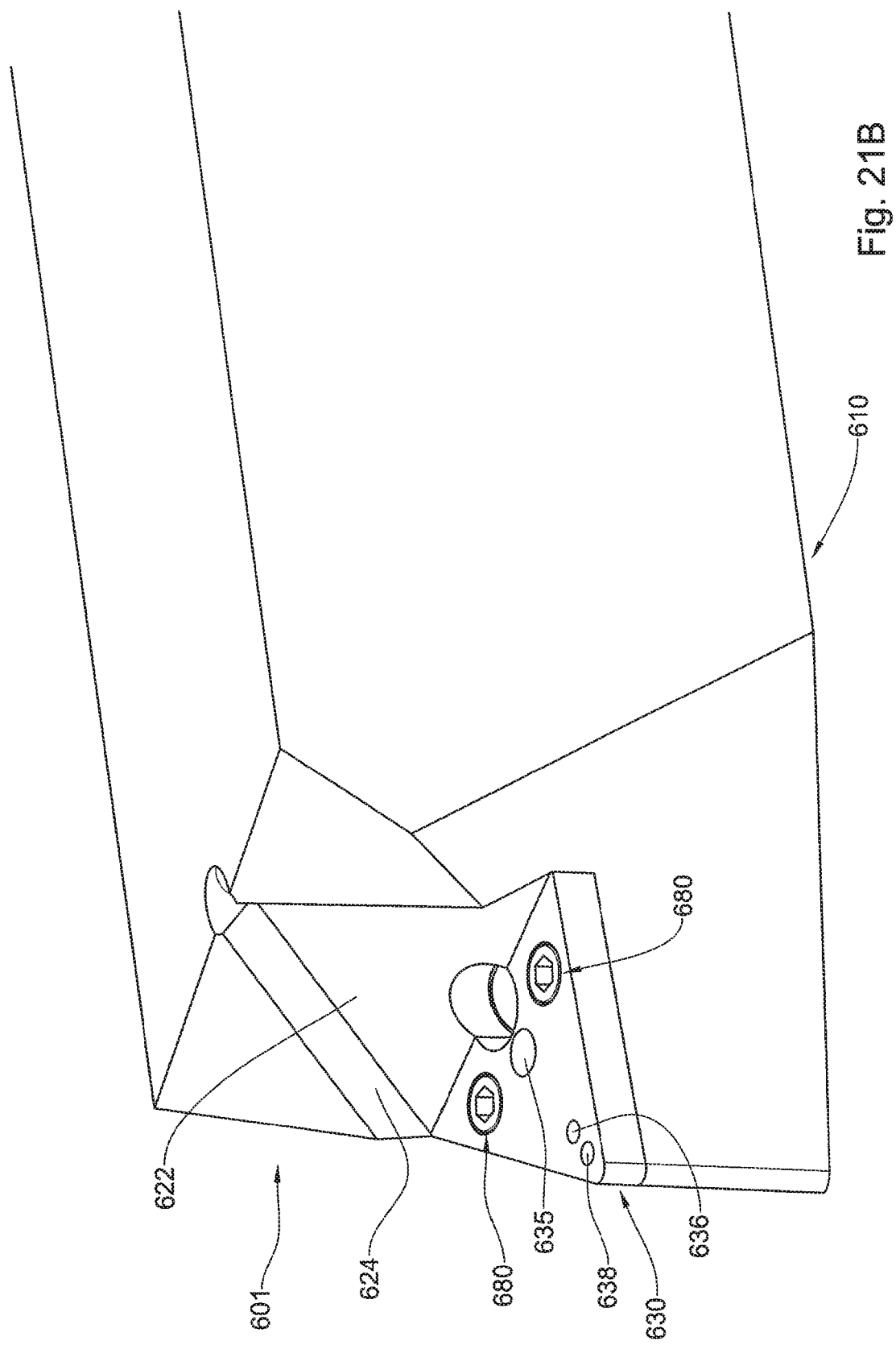

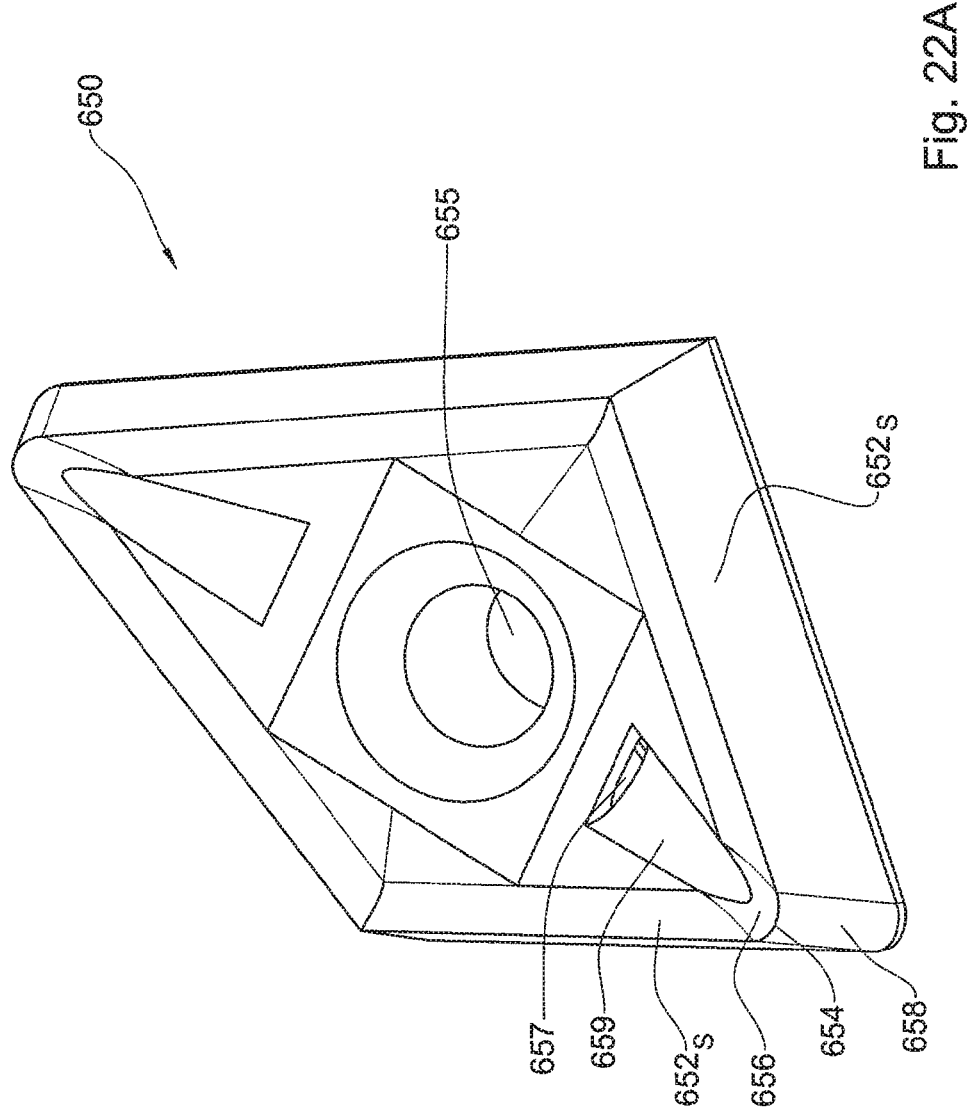

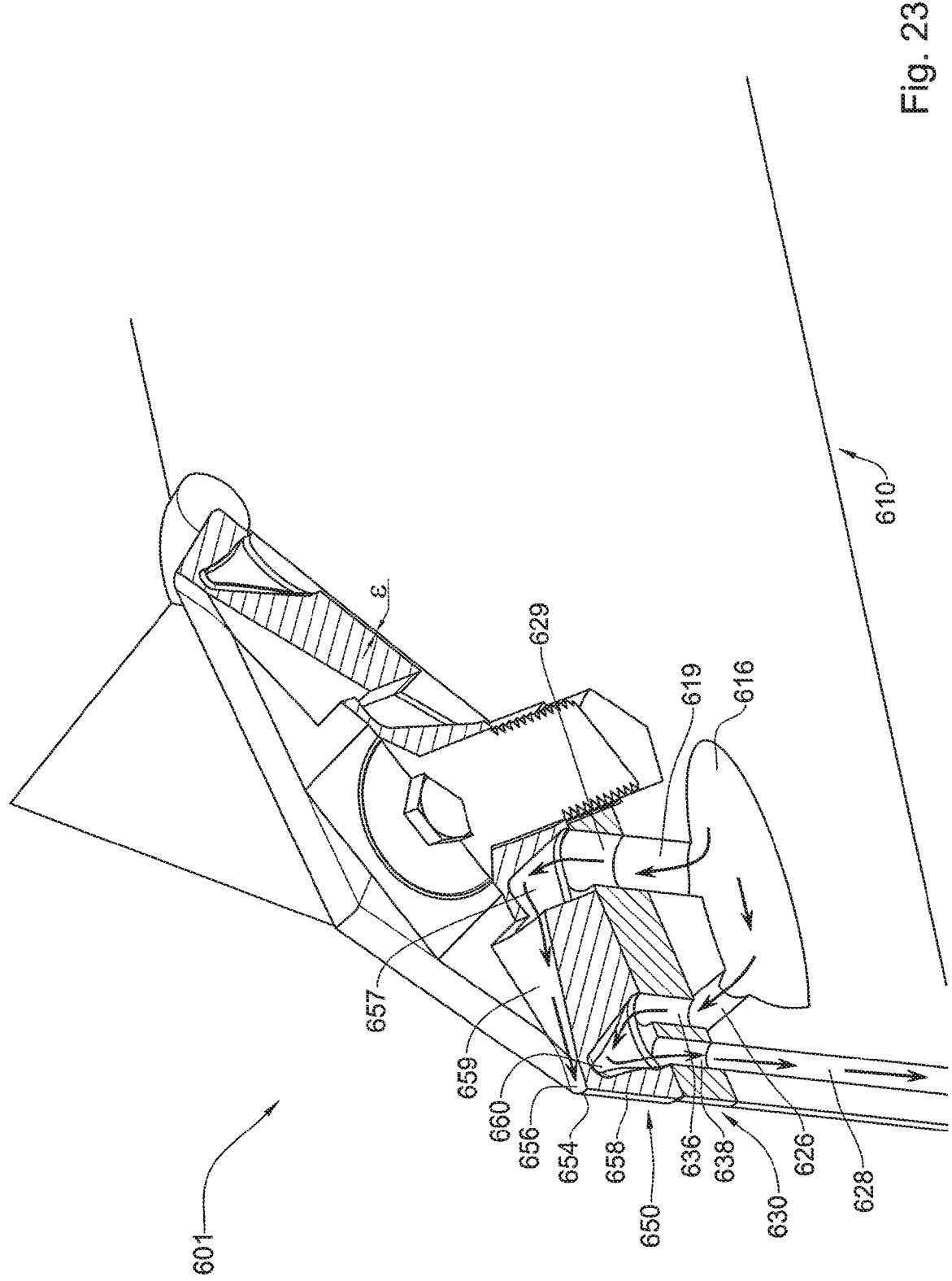

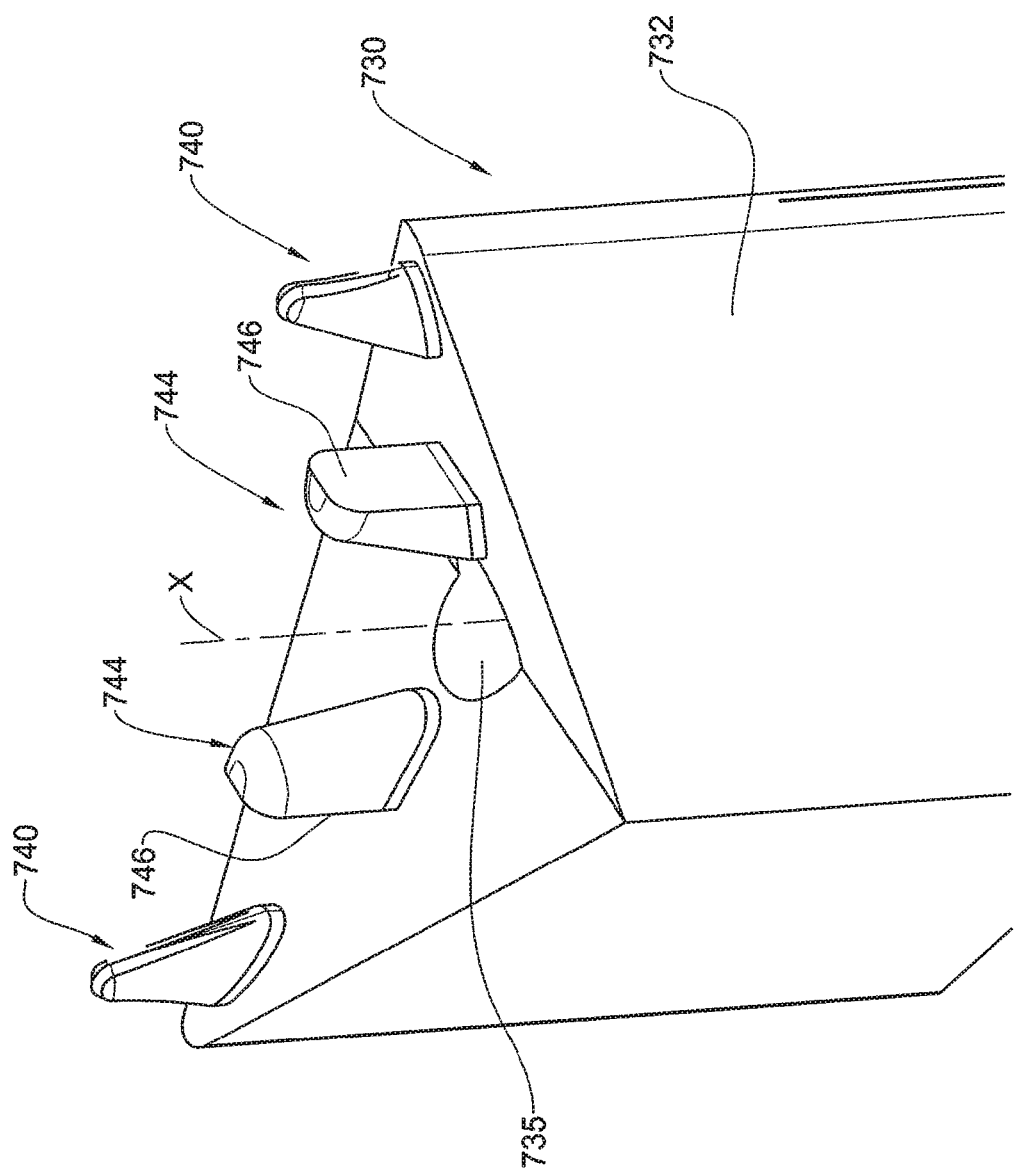

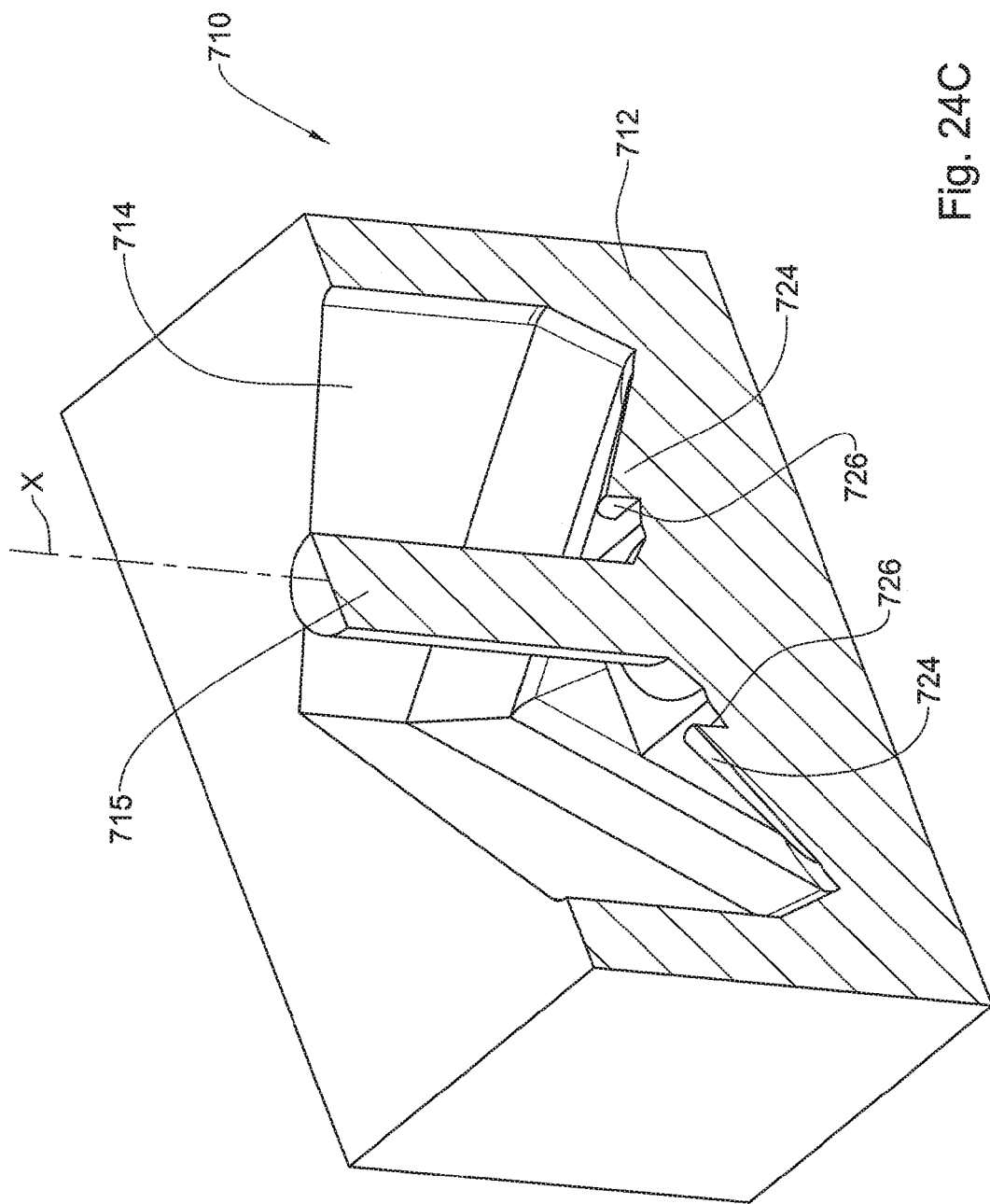

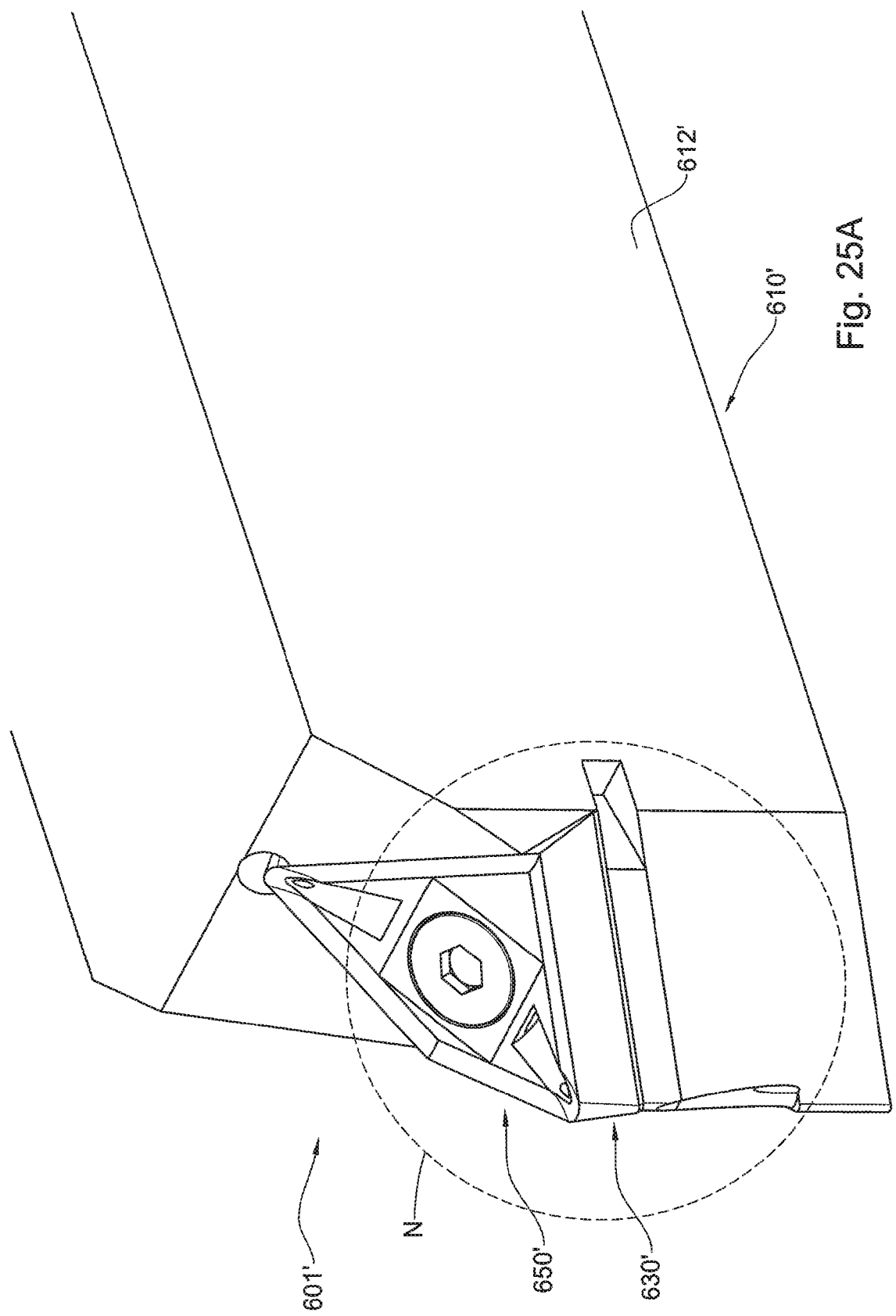

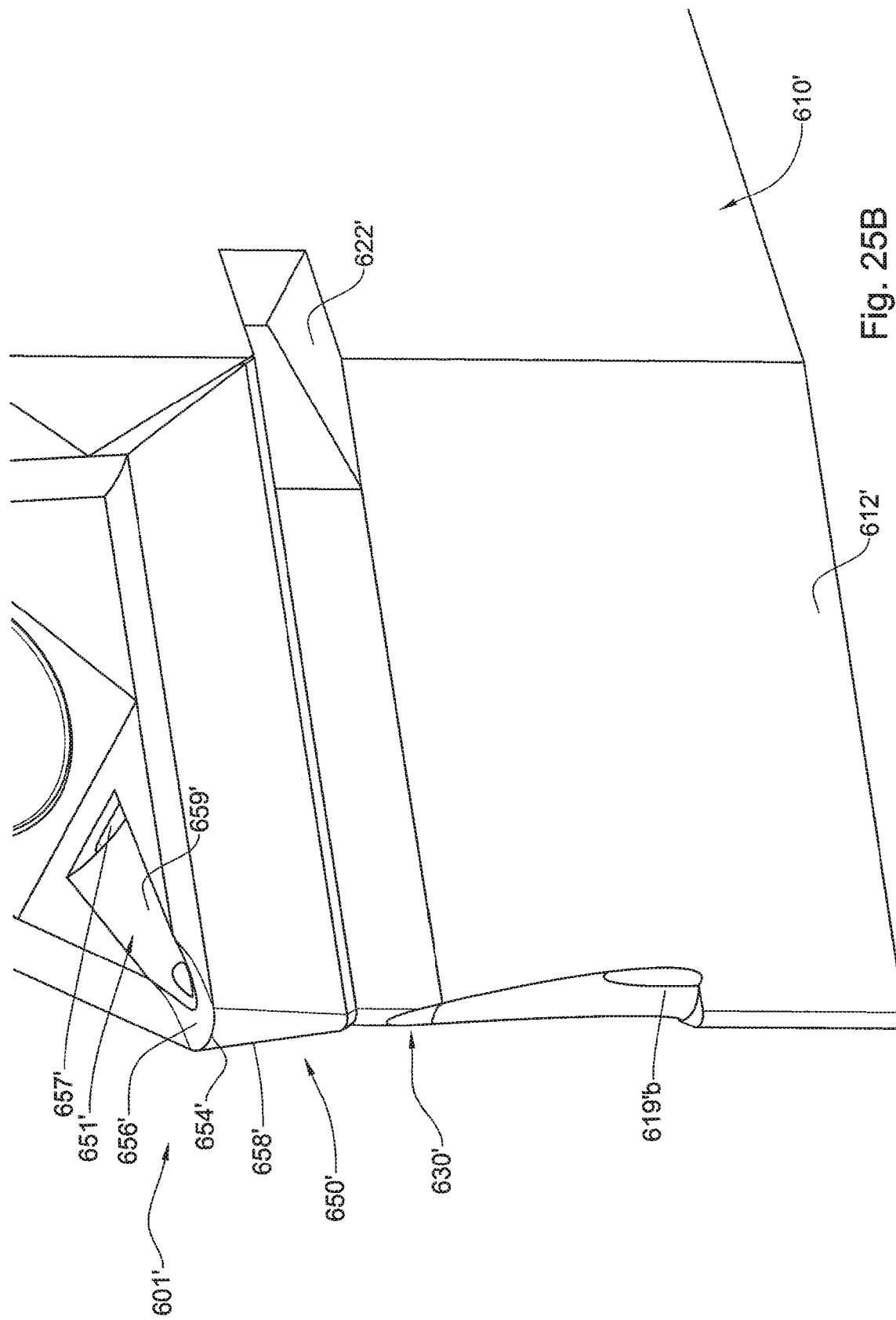

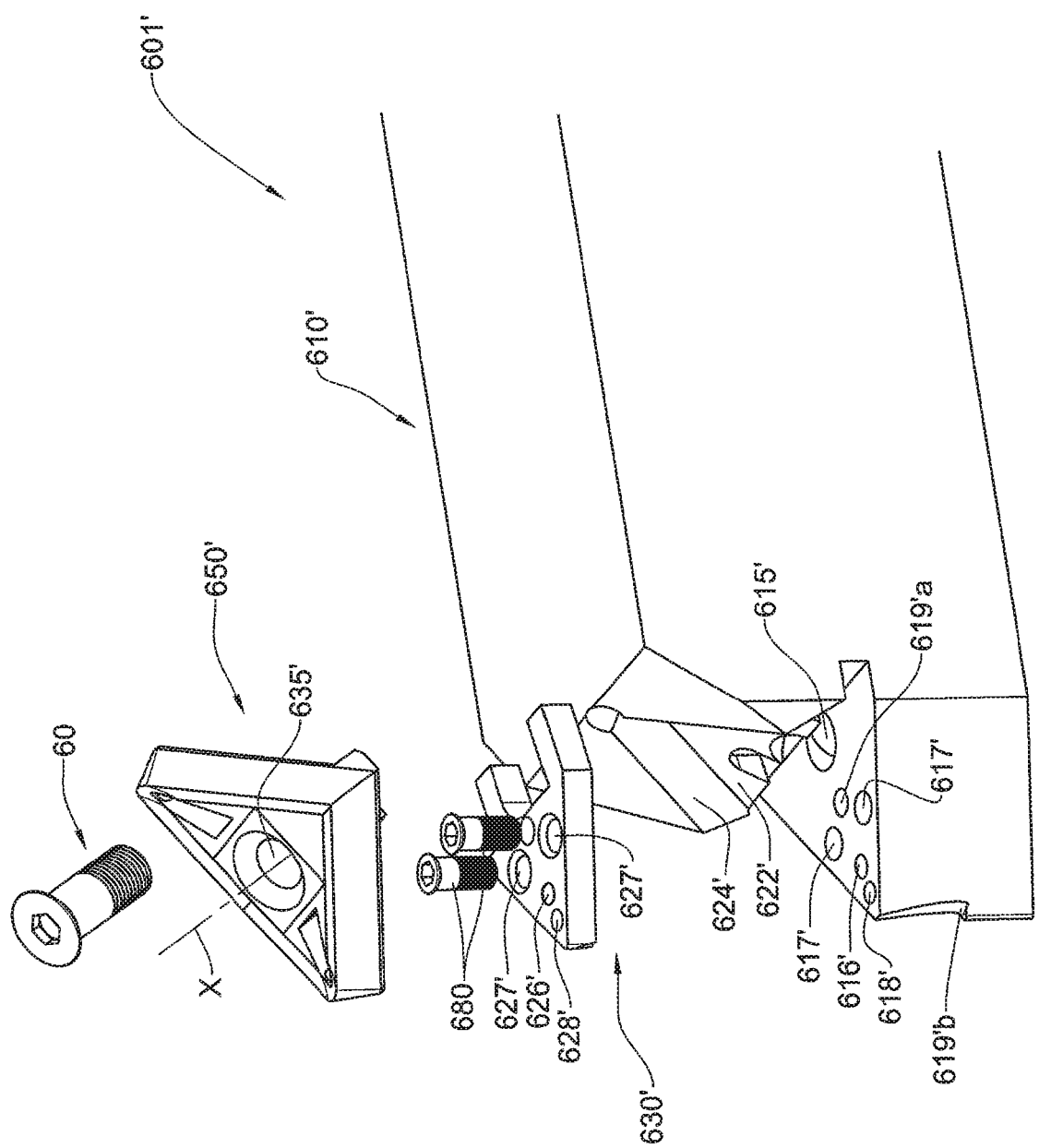

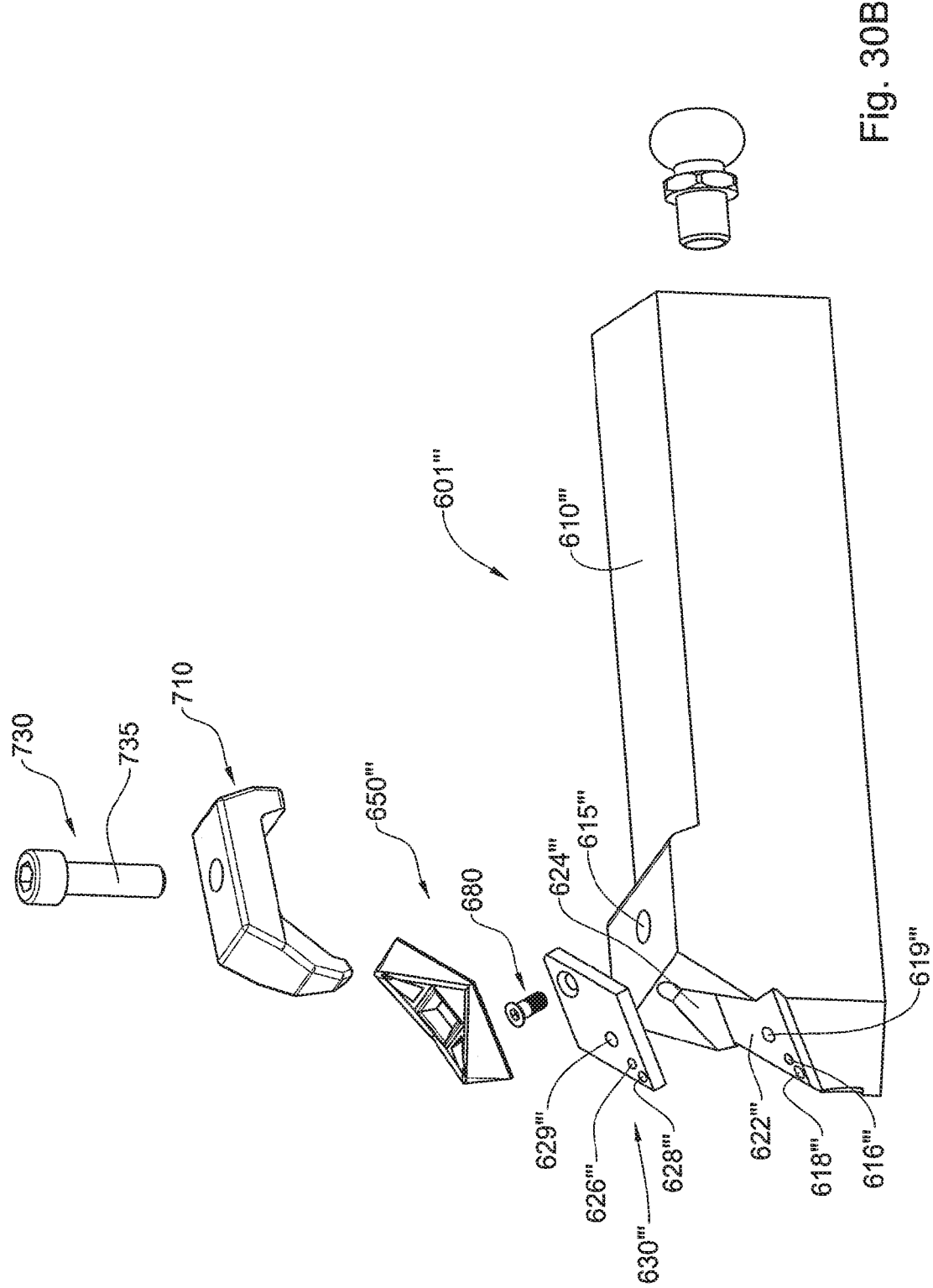

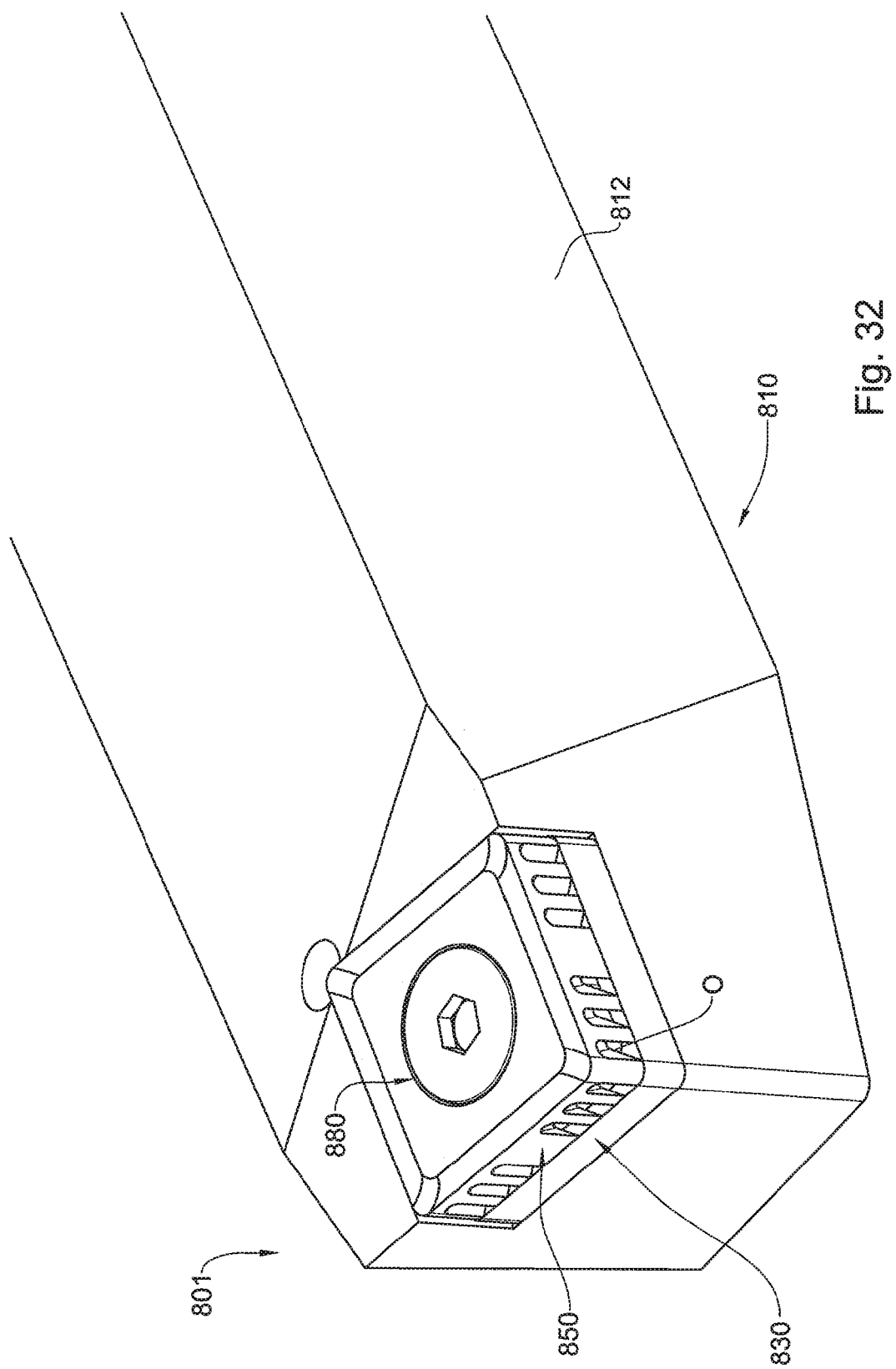

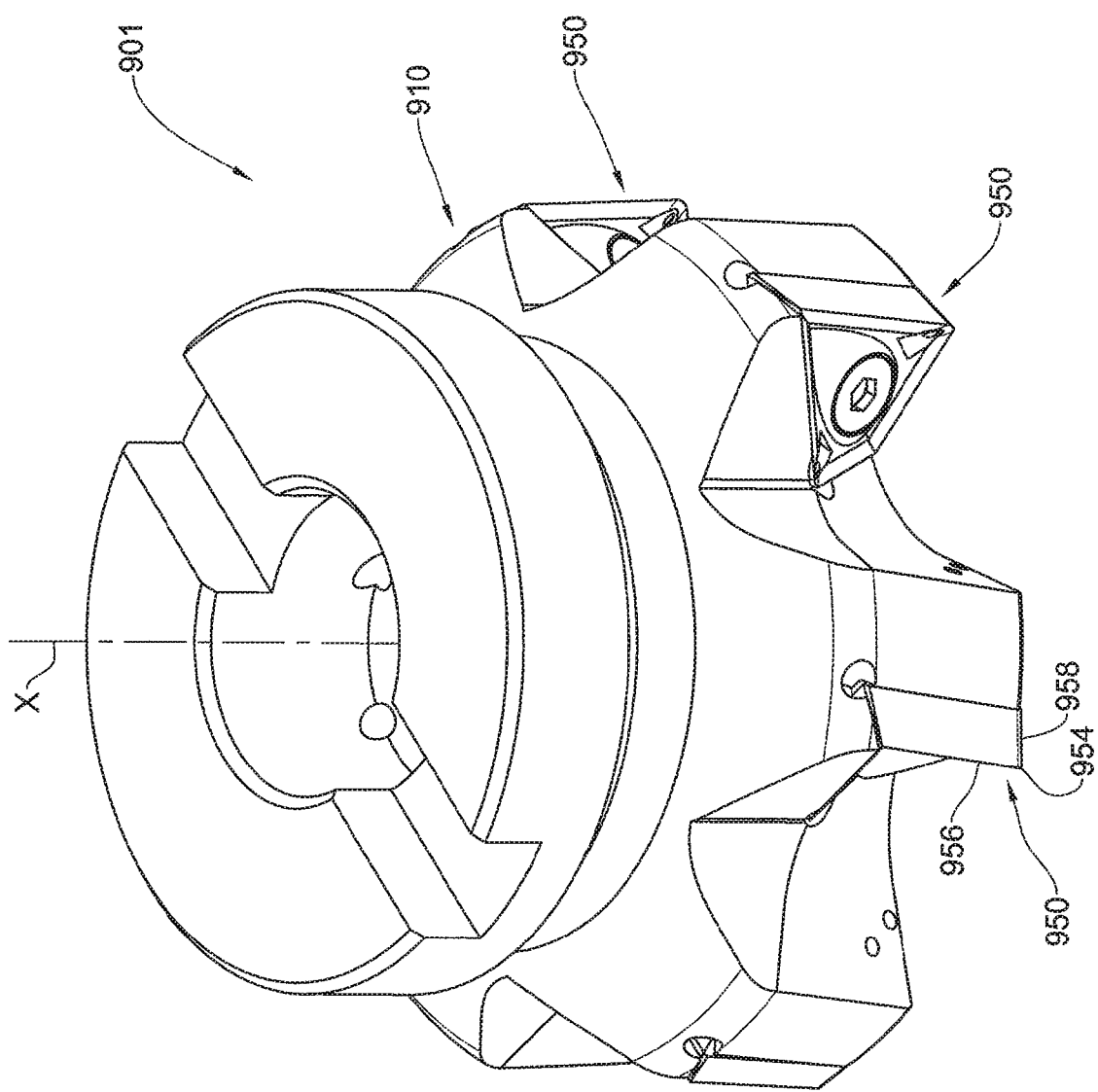

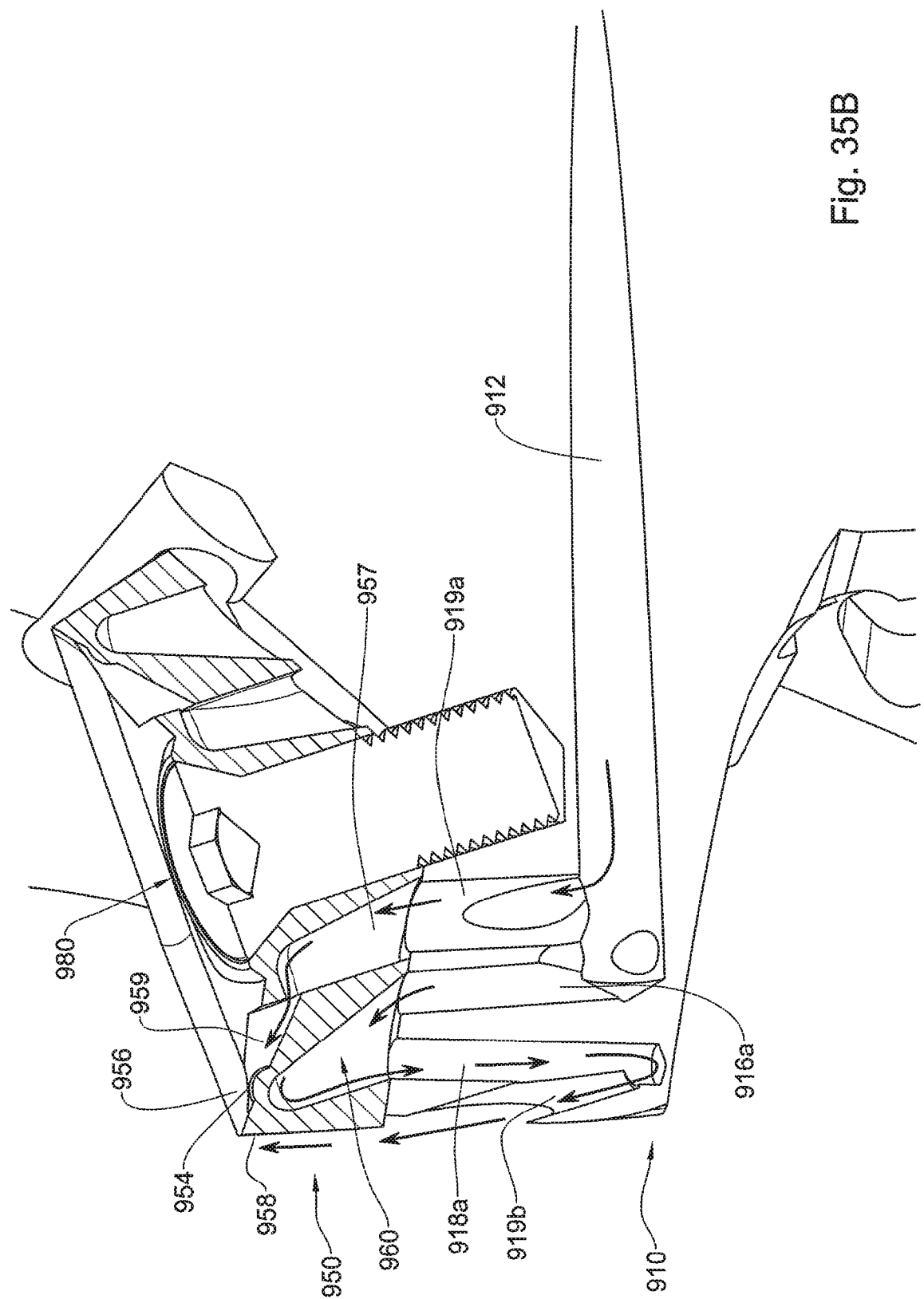

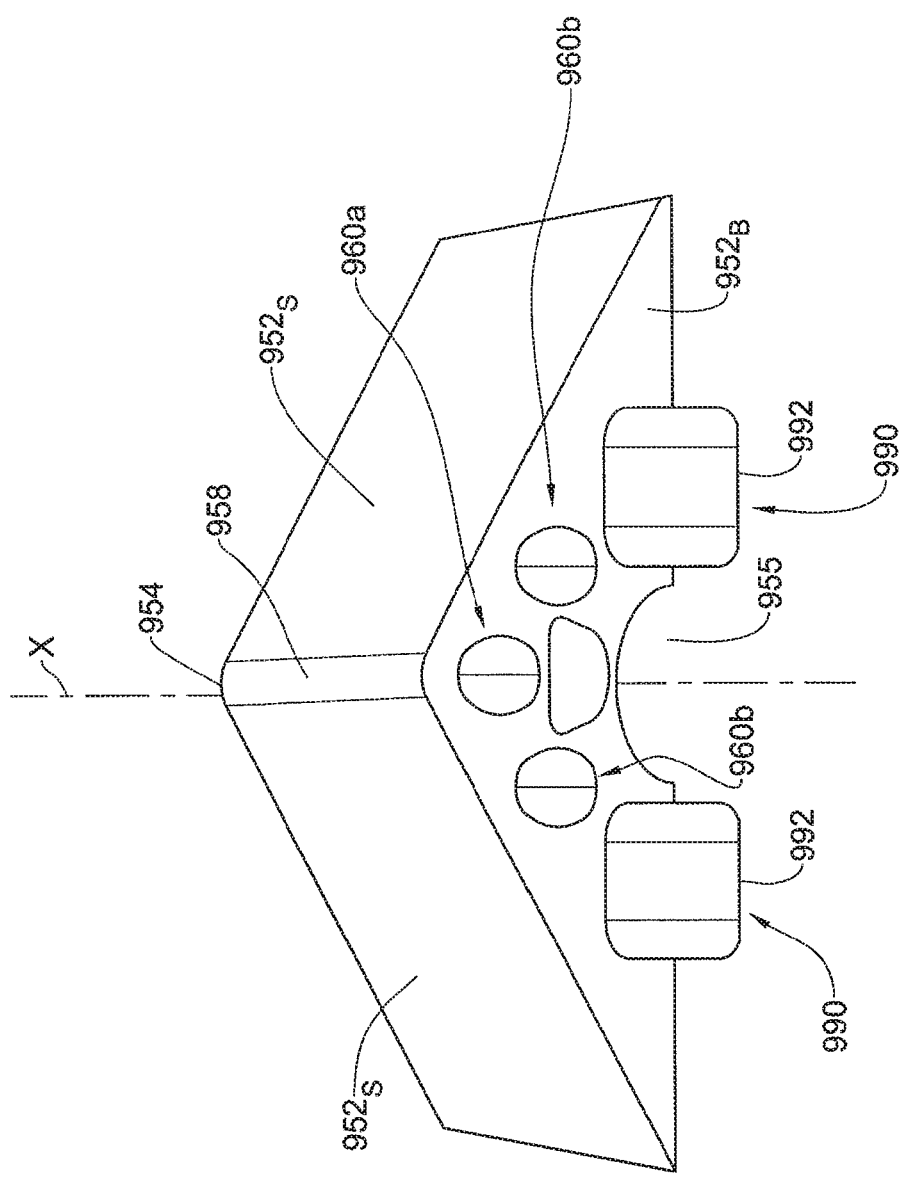

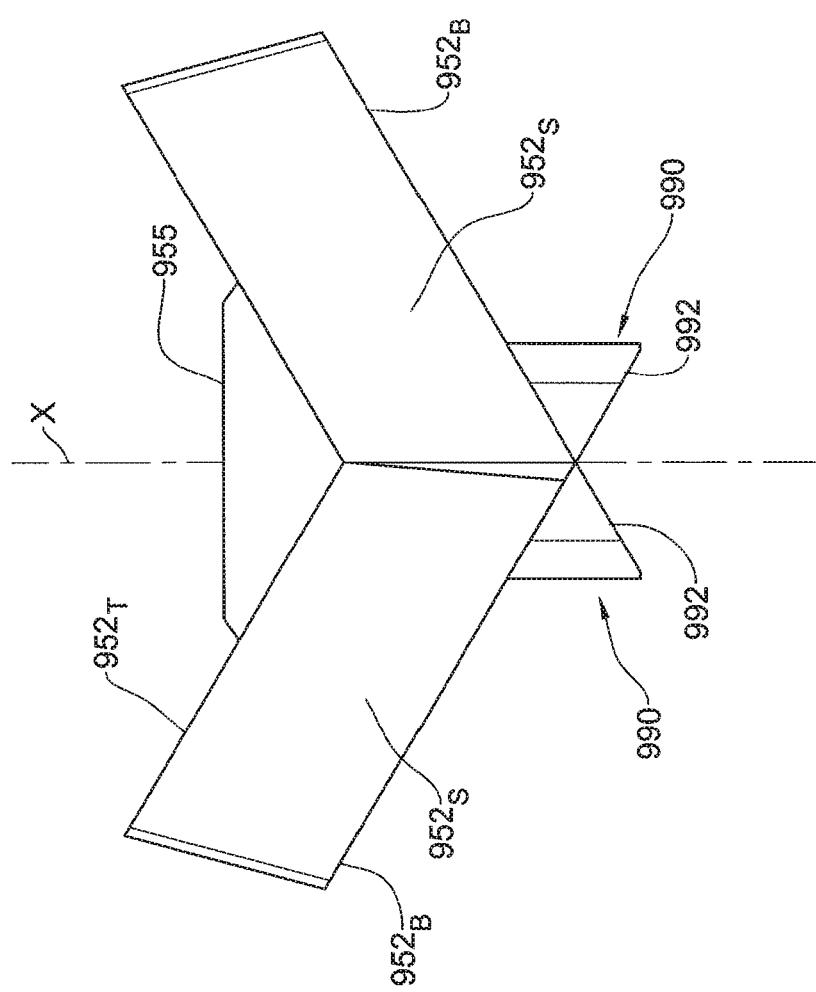

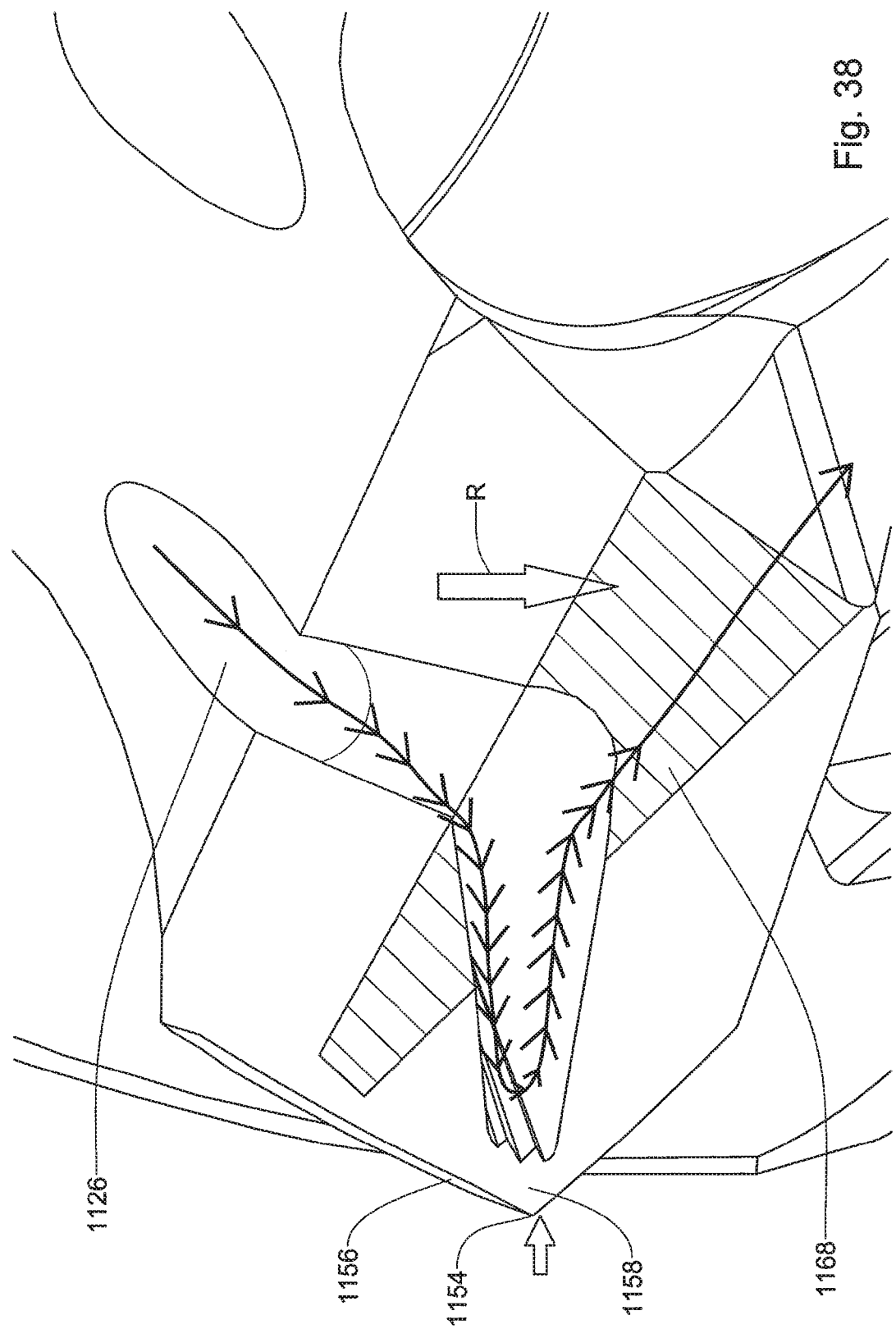

CUTTING INSERT WITH INTERNAL COOLING, MOLD AND METHOD FOR MANUFACTURE THEREOF

CROSS-REFERENCE TO RELATED APPLICATIONS

This application is a continuation-in-part of U.S. application Ser. No. 14/901,514 filed Dec. 28, 2015, which is a U.S. National Phase application filed under 35 U.S.C. § 371 of PCT International Application No. PCT/IL2014/050573 filed Jun. 26, 2014, which claims priority to Israel Patent Application No. 227228 filed Jun. 27, 2013, the contents of all of the foregoing applications are incorporated herein by reference in their entireties.

TECHNOLOGICAL FIELD

The present invention relates to cutting tools and inserts having an internal cooling mechanism.

BACKGROUND

It is known in the art to provide a cooling fluid to a cutting interface between a cutting tool and a workpiece during a cutting operation. The provision of the cooling fluid allows reducing the heat generated at the cutting interface during the cutting operation and thereby preventing damage to both the cutting edge and the workpiece.

In general, a cutting tool has a rake face and a relief face, defining at the intersection thereof a cutting edge of the cutting tool. Cooling fluid is generally provided directly to the cutting interface either from the side of the rake face or from the side of the relief face or from both.

In some examples, cutting inserts used in cutting tools are pre-formed with apertures configured for the provision of a cooling fluid. In other examples, cutting tools and/or cutting tool holders are provided with a cooling arrangement separate from the cutting insert, which is configured for provision of the cooling fluid.

SUMMARY

According to one aspect of the presently disclosed subject matter, there is provided a cutting insert comprising:
  a top surface, a bottom surface, and a plurality of side surfaces spanning therebetween;
  a cutting edge formed at an intersection of the side surface and a forwardly-disposed portion of the top the surface;
  a cooling cavity projecting into the insert and spanning between an open bottom end formed in the bottom surface and a top end, the top end of the cooling cavity being disposed further forwardly than a forward-most portion of the bottom end thereof, the cooling cavity defining one or more molding angles, with respect to the bottom surface, along which a molding axis may lie, wherein a solid element having the shape of the cooling cavity and completely inserted therein may be retracted intact therefrom along a linear path parallel to the molding axis; and
  a circumscribing portion formed on the side surfaces and encircling the cutting insert, wherein the circumscribing portion is formed parallel to the molding axis and has a non-zero height, in a direction parallel to the molding axis, along its entire extent, and wherein the cutting insert does not extend beyond the circumscribing portion.

The circumscribing portion may be continuous around the cutting insert.

The molding axis may be disposed at an angle of 45° with respect to the bottom surface.

The top and bottom surfaces may be parallel to each other.

The height of the circumscribing portion may vary along its extent.

At least one of the side surfaces may comprise a shelf extending along at least a portion of its length, the shelf defining a plane transverse to the molding axis and facing an area free of material of the cutting insert along any path parallel to the molding axis and intersecting the shelf.

The shelf may generally face towards the top surface.

At least two adjacent side surfaces may comprise a shelf.

The cutting insert may further comprise a second cooling cavity formed on an opposite side thereof, the second cooling cavity being formed correspondingly to the cooling cavity and inverted with respect thereto, and disposed such that it is open to the top surface.

According to another aspect of the presently disclosed subject matter, there is provided a mold for producing the cutting insert as per the above, the mold comprising a female mold portion and a male mold portion,
  the female mold portion comprising a cavity defined between parallely extending sidewalls and an open top end, and an upwardly facing first imprinting surface formed on a bottom end of the cavity;
  the male mold portion being configured to be snuggly and slidably received within the cavity of the female mold portion, and comprising a downwardly facing second imprinting surface;
  wherein the first imprinting surface has a shape corresponding to that of a first part of the cutting insert, when oriented such that its molding axis is parallel to the sidewalls of the female mold portion, demarcated by a first edge of the circumscribing portion, and the second imprinting surface has a shape corresponding to that of a second part of the cutting insert, when oriented such that its mold axis is parallel to the sidewalls of the female mold portion, demarcated by a second edge of the circumscribing portion.

According to a further aspect of the presently disclosed subject matter, there is provided a method of manufacture of a cutting insert as per the above, the method comprising:
  providing a mold according to as per the above;
  providing raw material in the cavity of the female mold portion;
  inserting the male mold portion into the cavity such that the first and second imprinting surfaces face one another; and
  forming the cutting insert, from the raw material, in the space between the imprinting surfaces.

The raw material may be a sintering material, the forming comprising providing sufficient pressure along the molding axis to form the insert from the sintering materiel.

The sintering material may comprise a ceramic powder.

The raw material may be provided in liquefied form, the forming comprising allowing the raw material to solidify.

According to a still aspect of the presently disclosed subject matter, there is provided a cutting insert comprising: a front face, an opposite rear face and at least one side face extending therebetween, said cutting insert comprising: a cooling cavity formed therein comprising a cavity surface and having an open end formed in the rear face of the cutting insert, and at least one shell-like cutting zone defined by an external surface and an internal surface, the external surface being constituted by a cutting edge defined at the intersection between the front face and the at least one side face and corresponding rake and relief surfaces constituted by portions of the front fact and at least one side face respectively, and the internal surface being constituted by a portion of the cavity surface, wherein the portion of the cutting zone between the cavity surface and the external surface at the cutting zone comprises a thin-walled structure, said cooling cavity being configured for receiving therein, via the open end, a cooling fluid for cooling said inner surface and thereby withdrawing heat from the cutting edge, and being further configured for directing the cooling fluid towards the open end for being emitted therefrom.

The term "shell-like" refers to the fact that the cutting zone is formed of a relatively thin shell owing to a hollow structure of the cutting insert. In particular, a through-thickness of the thickest portion of the thin-walled structure and the distance between the front face and its opposing rear face can be in the range of 1:5 to 1:10.

More specifically, the through-thickness of the thickest portion of the thin-walled structure ranges between 0.2-1 mm, more particularly between 0.3-0.9 mm, even more particularly between 0.4-0.8 mm and still more particularly between 0.5-0.7 mm.

It will be appreciated that herein the specification and appended claims, descriptions and/or recitations of a thin-walled structure between the cavity surface and the external surface at the cutting zone of the cutting insert (and other similar descriptions/recitations e.g., as clear from context) clearly convey to one having skill in the art a construction of the cutting insert in which the amount of material between the cavity and the external surface of the cutting insert is small enough such that introduction of a cooling medium, such as a liquid, gas, combination thereof, etc., into the cavity during a cutting operation significantly reduces the temperature of the cutting insert, for example in the vicinity of the cutting edge. The significance of the temperature reduction may be, e.g., such that the useful life of the cutting insert is increased thereby at least as much as it would be reduced owing to any loss in structural integrity which may result from providing a thin-walled structure in the vicinity of the cutting edge. For example, the thickness of the thin-walled structure, e.g., between a top cavity surface distal from the open end of the cavity and the cutting edge and/or between the at least one side surface and a front surface of the cavity proximate to the at least one side surface, may be no greater than half the height (i.e., the distance between the front and rear opposing surfaces of the cutting insert. According to some examples, it is no greater than one third. According to other examples, it is no greater than one quarter, one fifth, one tenth, or even less, of the height of the cutting insert.

According to one example, the cavity surface can be sloped towards the cutting zone in order to direct cooling fluid entering the cavity towards the cutting zone. The arrangement can be such that, in operation, cooling fluid entering the cavity is configured to impact the sloped cavity surface and directed to flow towards the cutting zone so as to cool down the cutting edge from its internal side.

According to one design embodiment, the cavity surface can be formed with a rib array extending along the cutting zone. In particular, said rib array can comprise rake ribs extending generally parallel to the rake surface and relief ribs extending generally parallel to the relief surface.

The ribs of the rib array can provide, inter alia, at least one of the following:

increased mechanical integrity (i.e., strength) to the cutting zone despite its shell-like configuration; and increased in surface area for increased heat dissipation (thereby leading to increased cooling) of the cutting edge.

In particular, it is appreciated that the ribs provide the shell-like structure of the cutting zone, which is considerably thinner than in a standard, non-hollow insert (full of material at the cutting zone) with the required mechanical integrity to withstand the loads exerted on the cutting insert during a cutting operation.

It is also appreciated that the jagged design of the ribs yields that some points of the cavity surface are closer to the cutting edge than others. Thus, while the average shell-thickness can be T (an average of the distances of all points on the cavity surface at the cutting zone from the cutting edge), some points along the cavity surface at the cutting zone are extremely close to the cutting edge, with a thickness t<T. This provides for considerable efficiency in the cooling of the cutting edge without deteriorating mechanical integrity of the cutting zone.

In other words, in a corresponding structure having a smoother cavity surface at the same average thickness T, the cooling efficiency would be lesser than in the above described example and the mechanical integrity may be lesser as well.

The arrangement can be such that the cooling fluid provided to the cavity is configured for cooling the cutting edge from the side of the cavity surface. In particular, cooling fluid provided into the cooling cavity is configured, by virtue of the geometry of the cavity so as not to come into direct contact with the cutting edge.

In some examples, there is at least one of a single rake rib and a single relief rib, i.e., each array if present comprises at least one rib. The rake rib or relief rib may be located centrally, e.g., symmetrically within the cavity, or may be located off-center, i.e., asymmetrically. The selection of location of the one or more ribs can be such as to optimize the provision of both cooling and strengthening of the cutting insert. Thus, for example, the provision of one or more ribs in an asymmetric manner may sufficiently strengthen the cutting insert, while ensuring also that the cooling medium can reach a major portion of the cavity proximate to the cutting edge, which can significantly reduce the temperature of the cutting insert in particular at the cutting edge. The significance of the temperature reduction may be, e.g., such that the useful life of the cutting insert is increased thereby at least as much as it would be reduced owing to any loss in structural integrity which may result from providing only a single rib asymmetrically on the thin-walled structure in the vicinity of the cutting edge. According to some examples, providing the rake and/or relief rib off-center may be useful wherein during use, an off-center portion of the cutting insert contacts the workpiece to perform the operation; accordingly, for example, the increased mechanical strength and/or surface area for heat dissipation may be provided as close as possible to the portion of the cutting edge engaged in the cutting operation.

According to one example, each cutting edge of the cutting insert can have a corresponding cooling cavity. Alternatively, the majority of said cutting insert can be hollow, comprising a single cooling cavity facilitating cooling for all cutting edges of the cutting insert.

In addition, it is appreciated that, on the one hand, the smaller the height of the cutting insert (i.e., the distance between the front face and the rear face), the stronger the cutting insert since the cutting edge is elevated over a smaller hollow area. On the other hand, the lesser the height of the cutting insert, the lesser the space for cooling fluid to flow. Thus, the geometry of the cutting insert and of the cavity can be such that meet the required cooling on the one hand while meeting mechanical integrity requirements on the other.

In particular, the following differences should be noted between different cutting operations:

Milling—the cutting edge keeps coming in and out of contact with the workpiece. As a result, when it is in contact with the workpiece the cutting edge heats up, whereas when it is out of contact, the cutting edge cools down. However, this constant motion in and out of the workpiece causes the milling insert to be repeatedly "impacted" by the workpiece, requiring sufficient mechanical robustness and stability. In such case, it may be beneficial to provide a more robust structure of the cutting insert by using a configuration in which each cutting zone is provided with its individual cooling cavity;

Turning—the cutting edge remains within the workpiece throughout the cutting operation, whereby the effect of "impact" by the workpiece, which occurs in milling, is eliminated. However, since the cutting edge is constantly in contact with the workpiece, it constantly heats up, requiring sufficient cooling to prevent mechanical damage to the cutting insert.

In addition, the front face of the cutting insert can be formed with at least one drainage outlet being in fluid communication with the cooling cavity, and wherein the drainage outlet is arranged such that cooling fluid discharged therethrough does not come in contact with the cutting edge.

According to a still aspect of the presently disclosed subject matter, there is provided a cutting tool comprising:
a cutting tool holder comprising an insert seat space defined between a base surface provided with a fluid inlet for providing cooling fluid to the insert seat space and a fluid outlet configured for removing cooling fluid from the insert seat space; and
a cutting insert according to any one of claims 1 to 8 positioned within the insert seat space of the cutting tool holder, over the base surface;
wherein, a cooling cavity of the cutting insert is aligned with said inlet and said outlet, whereby cooling fluid is configured for being provided into the cooling cavity via said inlet and be withdrawn therefrom via said outlet.

In reference to the above, the base surface can be provided with a ramp element configured, when the cutting tool is assembled and the cutting insert is mounted onto the base surface, to protrude into the cavity of the cutting insert to thereby define a fluid path. Specifically, the fluid path can be configured for receiving cooling fluid through said inlet, directing it towards the portion of the cavity surface at the cutting zone and then towards said outlet. According to a specific example, the cross-sectional area of the fluid path can decrease towards the cutting zone.

According to one design, the base surface can be unitary with the cutting tool holder. Alternatively, according to another design, the cutting tool holder can comprise an intermediate base plate formed with said base surface.

The intermediate base plate can be provided with an inlet bore aligned with the inlet of the cutting tool holder and the cooling cavity of the cutting insert and an outlet bore aligned with the outlet of the cutting tool holder and the cooling cavity of the cutting insert, to allow passage of cooling fluid therethrough.

The cutting tool can be a milling tool comprising a plurality of cutting inserts mounted thereto, wherein said outlet has an open end at a rear portion of the insert seat space, so as to direct cooling fluid discharged from the outlet towards a subsequent cutting insert of the milling tool.

According to a still aspect of the presently disclosed subject matter, there is provided a cutting tool holder for mounting thereon a cutting insert to form a cutting tool, said cutting tool holder comprising an insert seat space having a base surface onto which said cutting insert is to be mounted, said base surface being provided with a fluid inlet for providing cooling fluid to the insert seat space and a fluid outlet configured for removing cooling fluid from the insert seat space.

In addition, the following points should be noted:
the cutting insert can be manufactured by a pressing process within a mold, simplifying production thereof;
more efficient cooling of the cutting zone of a cutting insert can provide at least one of the following advantages: longer life span of the cutting insert under standard cutting conditions, an increased feed and/or increased revolution speed of the cutting tool or of a corresponding workpiece, thereby reducing the required time for performing a predetermined cutting operation;
the cooling fluid can be any know cooling fluid including water, air, nitrogen etc.; and
producing the cutting insert with a cavity saves valuable material (e.g., tungsten carbide).

The cavity of the cutting insert can be formed at an angle to the cutting edge. In particular, it can be angled at 45° to a top or bottom surface of the cutting insert. The insert bore, in turn, can be angled to a top and bottom surface thereof and configured for receiving therein a fastening member in a direction generally perpendicular to the top and bottom surface.

The cutting insert can have a first portion and a second portion, angled at about 135° with respect to each other.

The cutting insert can comprise a flow channel at the top surface thereof, configured for concentrating fluid flow towards the cutting edge. An outlet of the flow channel can be located below the top surface, and a top surface of the cutting insert can be of angled configuration while a bottom surface thereof is generally flat.

The cutting insert can be configured for performing a drilling operation or mounting onto a tool holder to form a drilling tool configured for performing a drilling operation.

Specifically, the drilling insert can comprise an outlet configured for emitting a cooling fluid to cool the cutting edge, wherein cooling is aided by centrifugal forces caused by rotation of the drilling tool itself.

In effect, centrifugal forces facilitate emission of the cooling fluid towards the cutting edge while rotation of the drilling tool with respect to a bottom surface of the workpiece allows the workpiece to remove cooling fluid away from the cutting edge.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 5A is a schematic bottom isometric view of a cutting insert used in the cutting tool shown in FIGS. 1A and 1B;

FIG. 7B is a schematic enlarged isometric view of a male part of the mold shown in FIG. 7A;

FIG. 8A is a schematic isometric view of a cutting tool according to another example of the subject matter of the present application;

FIG. 8B is a schematic bottom isometric view of the cutting tool shown in FIG. 8A;

FIG. 9C is a schematic isometric view of the cutting tool shown in FIG. 9A, demonstrating the flow of a cooling fluid;

FIG. 9D is a schematic isometric view of the cutting tool shown in FIG. 9, with a cutting insert thereof being removed;

FIG. 10 is a schematic bottom isometric view of the cutting insert shown in FIG. 9C;

FIG. 12 is a schematic isometric view of a cutting tool according to still another example of the subject matter of the present application;

FIG. 13A is a schematic isometric view of a cutting insert used in the cutting tool shown in FIG. 12;

FIG. 13B is a schematic bottom isometric view of the cutting insert shown in FIG. 13A;

FIG. 14 is a schematic isometric view of a male part of a mold for the manufacture of the cutting insert shown in FIG. 13B;

FIG. 15C is a schematic isometric view of the insert seat space shown in FIG. 15B, demonstrating the flow of a cooling fluid;

FIG. 17B is a schematic isometric view of a male part of the mold shown in FIG. 17A;

FIG. 18A is a schematic isometric view of a cutting tool according to still another example of the subject matter of the present application;

FIG. 18B is a schematic top isometric view of a cutting insert used in the cutting tool shown in FIG. 18A;

FIG. 18C is a schematic bottom isometric view of the cutting insert shown in FIG. 18B;

FIG. 19 is a schematic isometric section view of the cutting tool shown in FIG. 18A, taken along plane I-I shown in FIG. 18A, demonstrating the flow of cooling fluid;

FIG. 21B is a schematic isometric view of the cutting tool shown in FIG. 21A, with a cutting insert thereof being removed;

FIG. 22A is a schematic isometric view of a cutting insert used in the cutting tool shown in FIG. 21A;

FIG. 23 is a schematic isometric longitudinal section view of the cutting tool shown in FIG. 21A;

FIG. 24B is a schematic isometric enlarged view of a male part of the mold shown in FIG. 24A;

FIG. 24C is a schematic section view of a female part of the mold shown in FIG. 24A;

FIG. 25A is a schematic isometric view of a cutting tool according to still another example of the subject matter of the present application;

FIG. 25B is a schematic enlarged view of detail N of the cutting tool shown in FIG. 25A;

FIG. 25E is a schematic exploded isometric view of the cutting tool shown in FIG. 25A;

FIG. 30B is a schematic exploded isometric view of the cutting tool shown in FIG. 30A;

FIG. 32 is a schematic isometric view of a cutting tool according to still another example of the subject matter of the present application;

FIG. 34A is a schematic isometric view of a milling tool according to still another example of the subject matter of the present application;

FIG. 35B is a schematic isometric section view of the milling tool shown in FIG. 34A, demonstrating the flow of cooling fluid;

FIG. 36D is a schematic view of the milling insert shown in FIG. 36A;

FIG. 36E is a schematic side view of the milling insert shown in FIG. 36A;

FIG. 38 is a schematic isometric section view of the drilling tool shown in FIG. 37A, demonstrating the flow of cooling fluid;

DETAILED DESCRIPTION

Figure 1A:
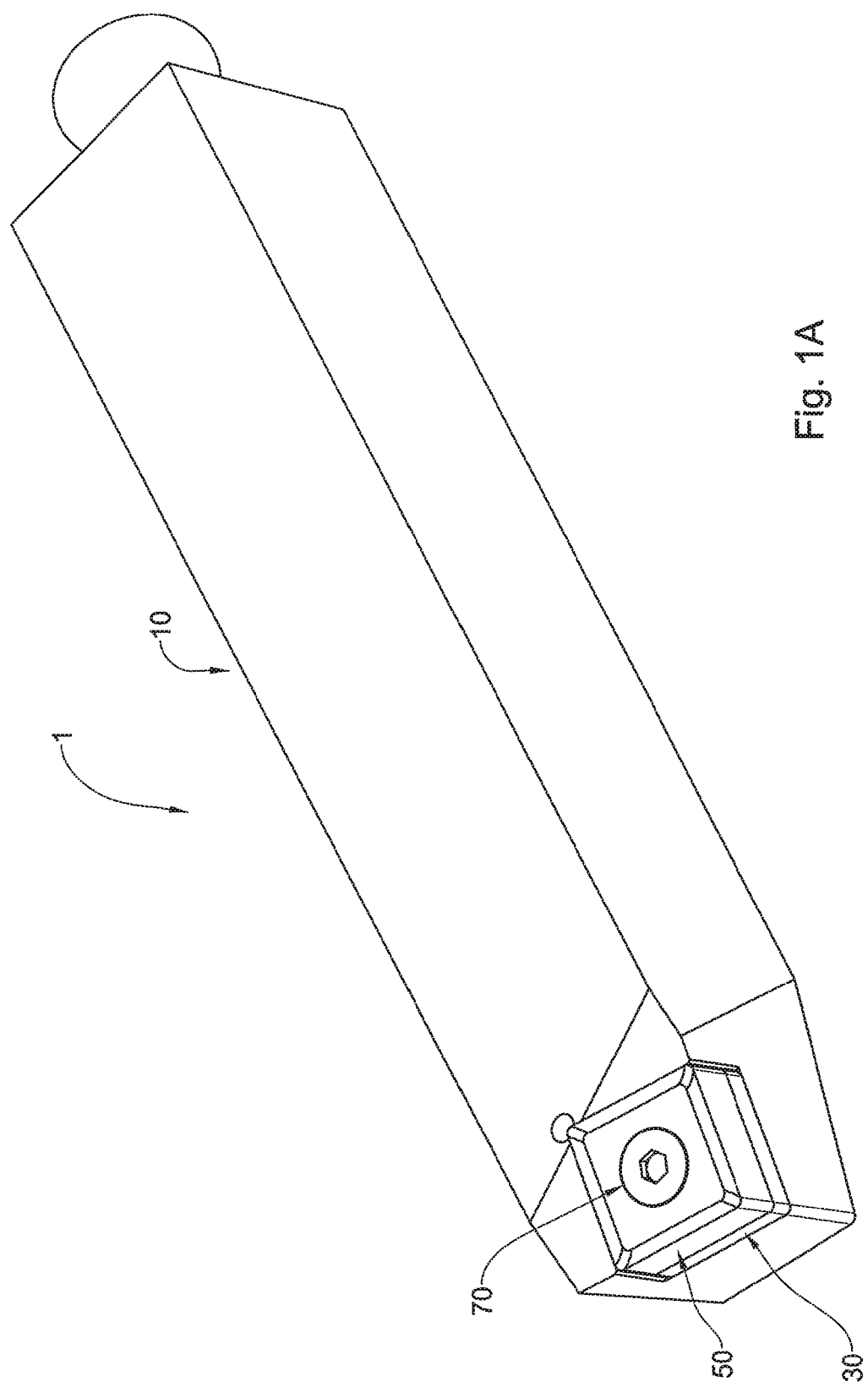
FIG. 1A is a schematic isometric view of a cutting tool according to the subject matter of the present application.
Figure 1B:
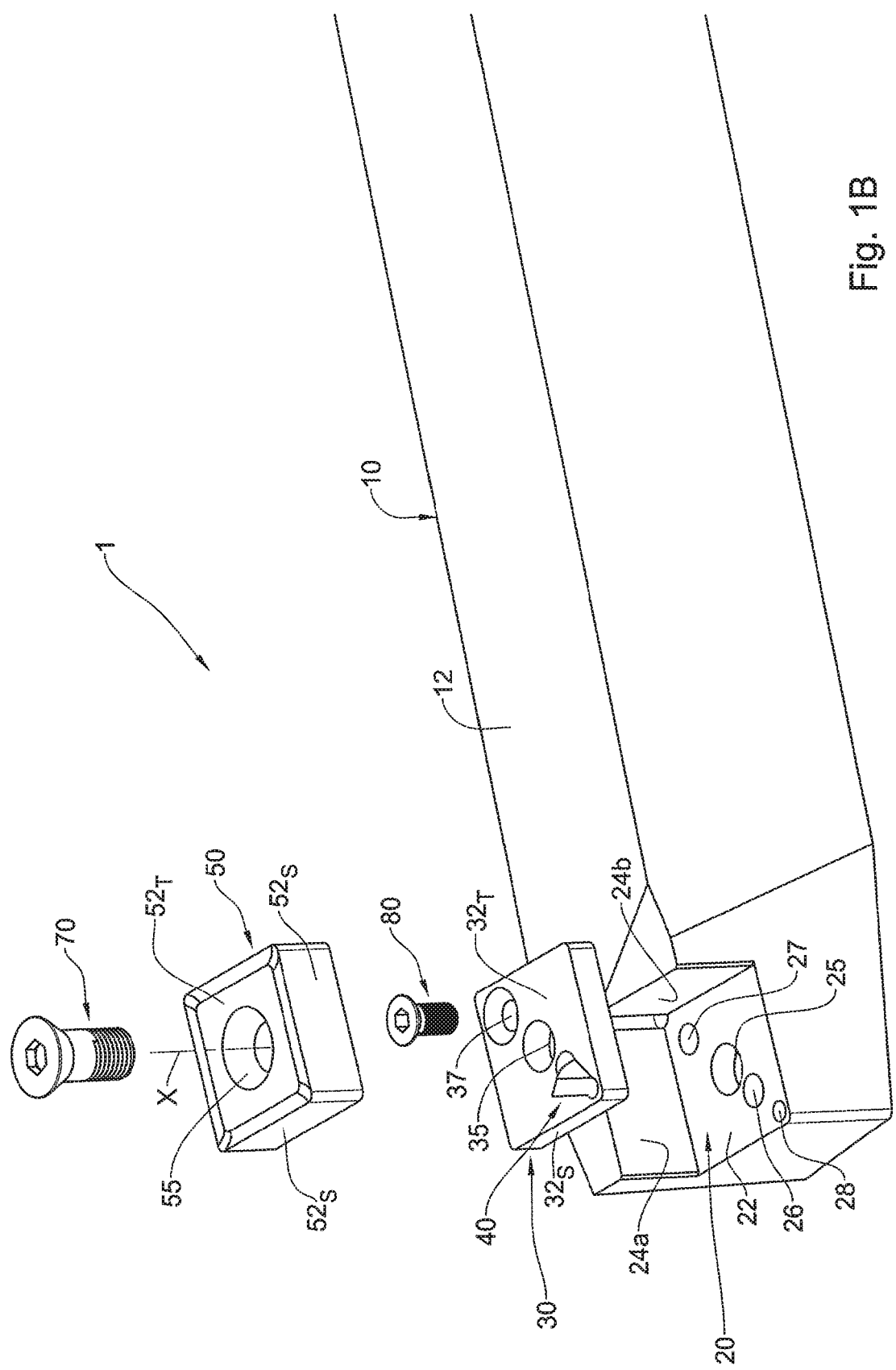
FIG. 1B is a schematic exploded isometric view of the cutting tool shown in FIG. 1B.

As illustrated in FIGS. 1A and 1B, a cutting tool according to the presently disclosed subject matter, generally designated as 1, comprises a tool holder 10, a base plate 30 (for example made of widia), a cutting insert 50, a securing bolt 70 for clamping the cutting insert to the tool holder, and an auxiliary securing bolt 80 for clamping the base plate to the tool holder, below the cutting insert. As will be described herein below, the cutting tool 1 is designed so as to allow cooling of the area of the cutting edge thereof during a cutting, e.g., a turning, operation.

Figure 2:
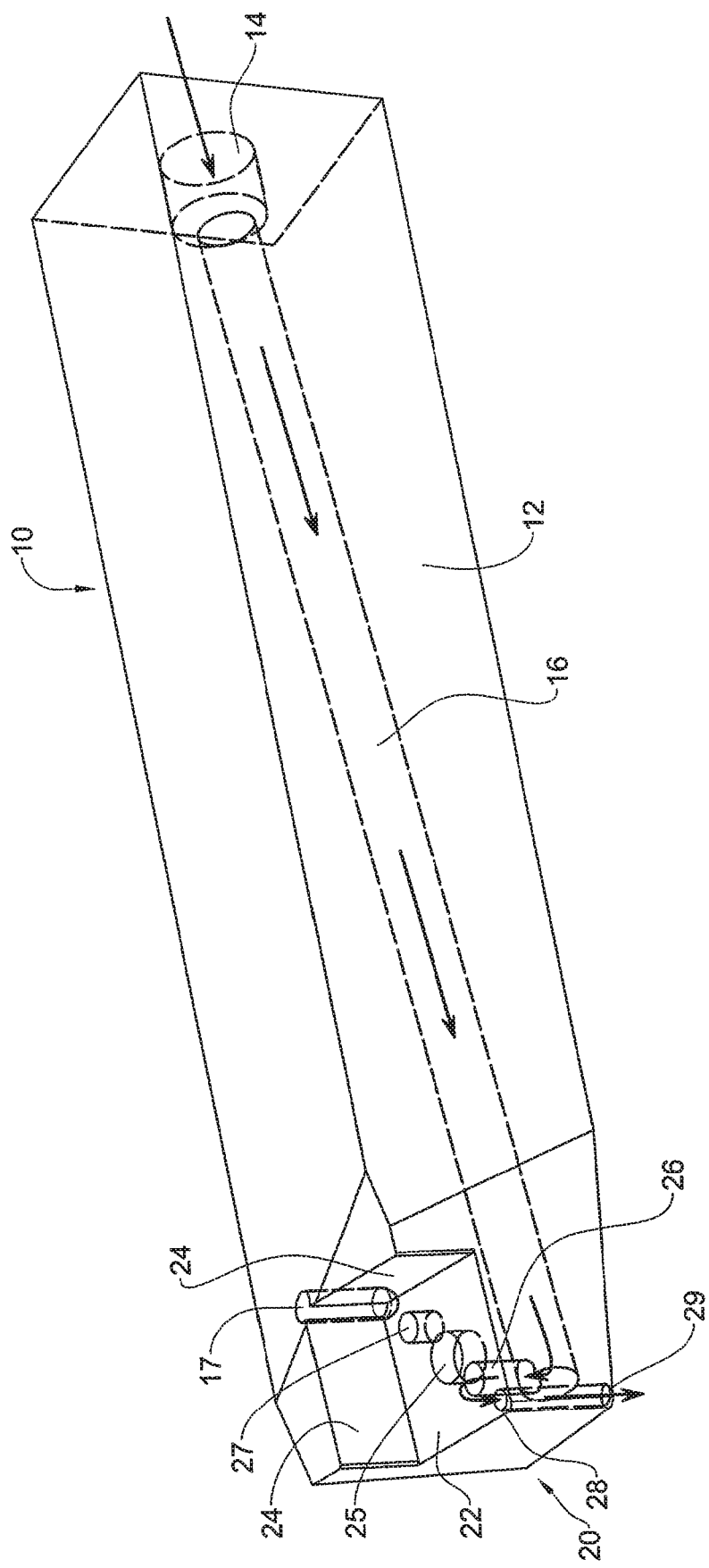
FIG. 2 is a schematic isometric view of a tool holder used in the cutting tool shown in FIGS. 1A and 1B.

As seen in FIG. 2, the cutting tool holder 10 comprises a main body 12 formed with an insert seat space 20 for mounting thereon the base plate 30 and the cutting insert 50. The body 12 is provided with a cooling fluid provision channel 16 passing therethrough and configured for providing a cooling fluid to the insert seat space 20. The insert seat space 20 is defined between a bottom face 22, configured for positioning thereon of the base plate 30, and, e.g., two side walls 24. The bottom face 22 is formed with an auxiliary bore 27 configured for receiving therein the auxiliary securing bolt 80 to facilitate fastening the base plate 30 to the bottom face within the insert seat space 20, and a main bore 25 configured for receiving therein the securing bolt 70 to facilitate fastening the cutting insert 50 to the bottom face within the insert seat space.

The tool holder 20 is further formed with an cooling inlet 26 configured for emitting the cooling fluid provided through the channel 16, and an outlet 28 configured for removal of the cooling fluid from the area of the insert seat space 20.

Figure 3:
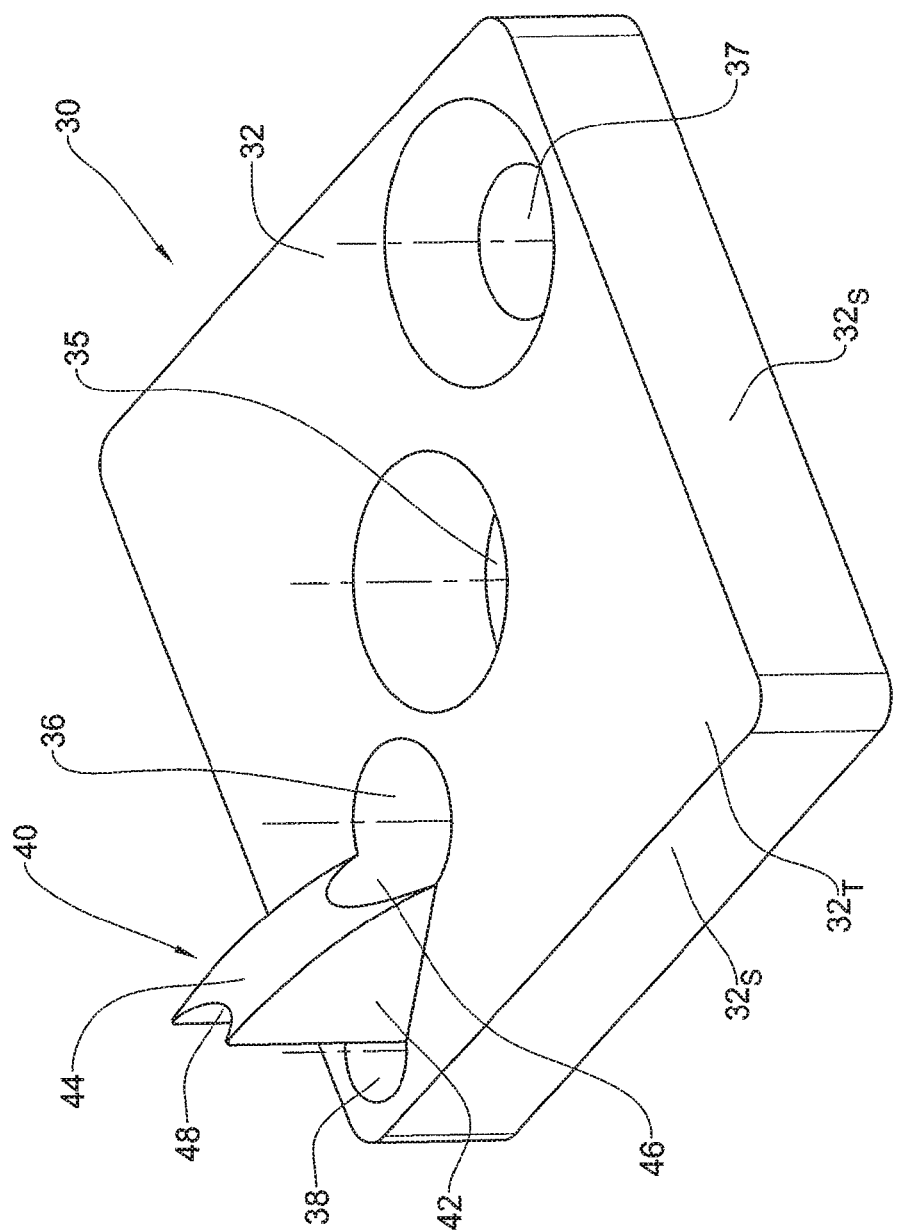
FIG. 3 is a schematic isometric view of a base plate used in the cutting tool shown in FIGS. 1A and 1B.
Figure 4:
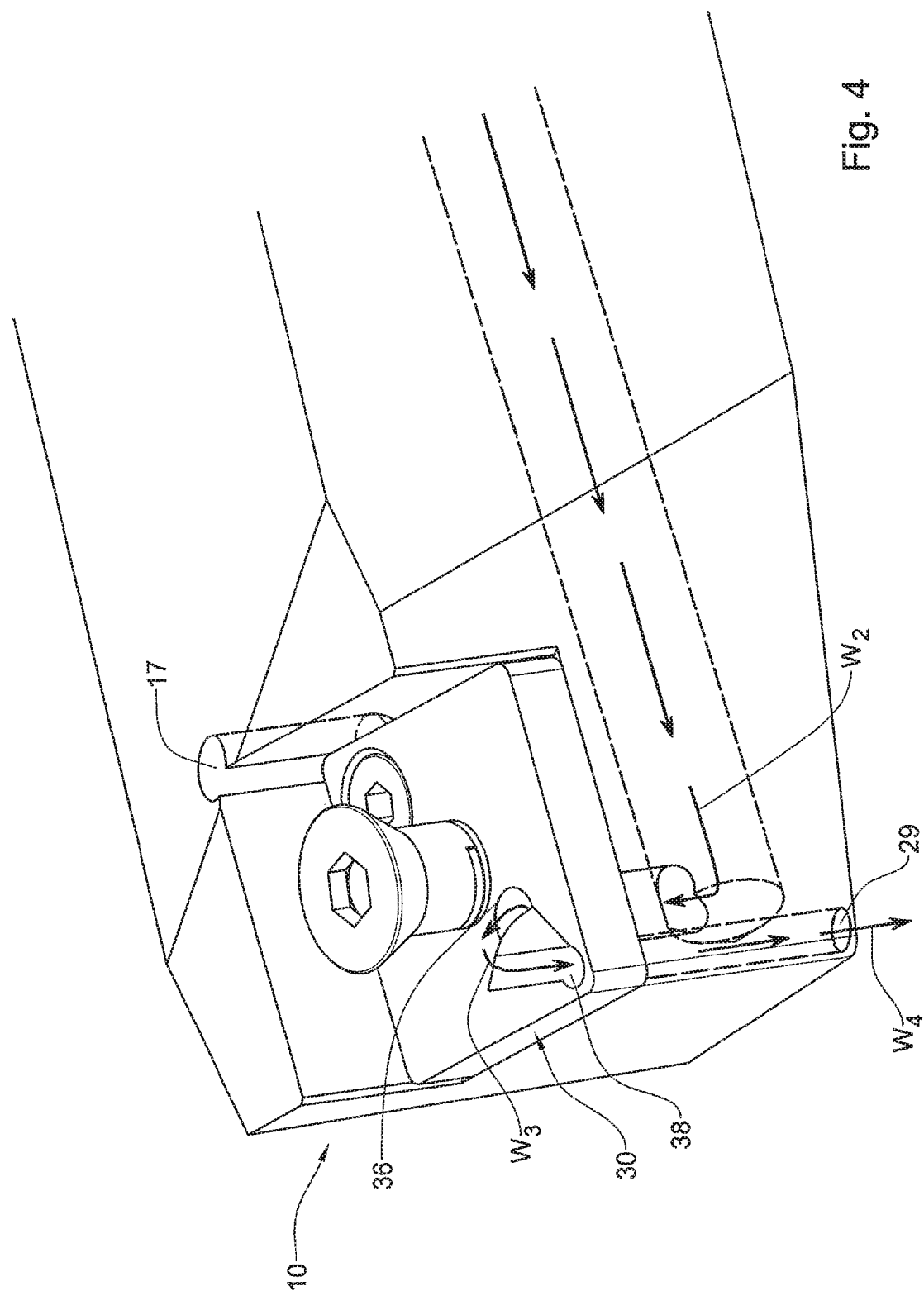
FIG. 4 is a schematic enlarged view of the base plate of FIG. 3 when mounted onto the tool holder of FIG. 2.

As illustrated in FIGS. 3 and 4, the base plate 30 comprises a main body 32 having a top face $32_T$, a bottom face 32B and side faces $32_S$ extending therebetween. The main body 32 comprises a main bore 35 for passing therethrough of the main securing bolt 70 and an auxiliary bore 37 for passing therethrough of the auxiliary securing bolt 80.

The base plate 30 further comprises an inlet hole 36 and an outlet hole 38 which, when the base plate 30 is mounted into the insert seat space 20 of the cutting tool holder 10, are aligned with the respective inlet and outlet 26, 28 of the cutting tool holder 10.

The base plate 30 further comprises a fluid ramp 40 projecting from the top surface $32_T$ thereof, disposed between the inlet 36 and the outlet 38, and configured for directing the flow of the cooling fluid towards a designated area of the cutting insert 50.

In particular, as shown in FIG. 4, cooling fluid incoming through the channel 16 is emitted through the inlet 26 and immediately through inlet 36. As will be explained in detail later with respect to FIG. 6, fluid flow is restricted by the geometry of the cutting insert 50 and is directed towards the outlet 38 and subsequently 28 to be emitted from the cutting tool 1.

Figure 5B:
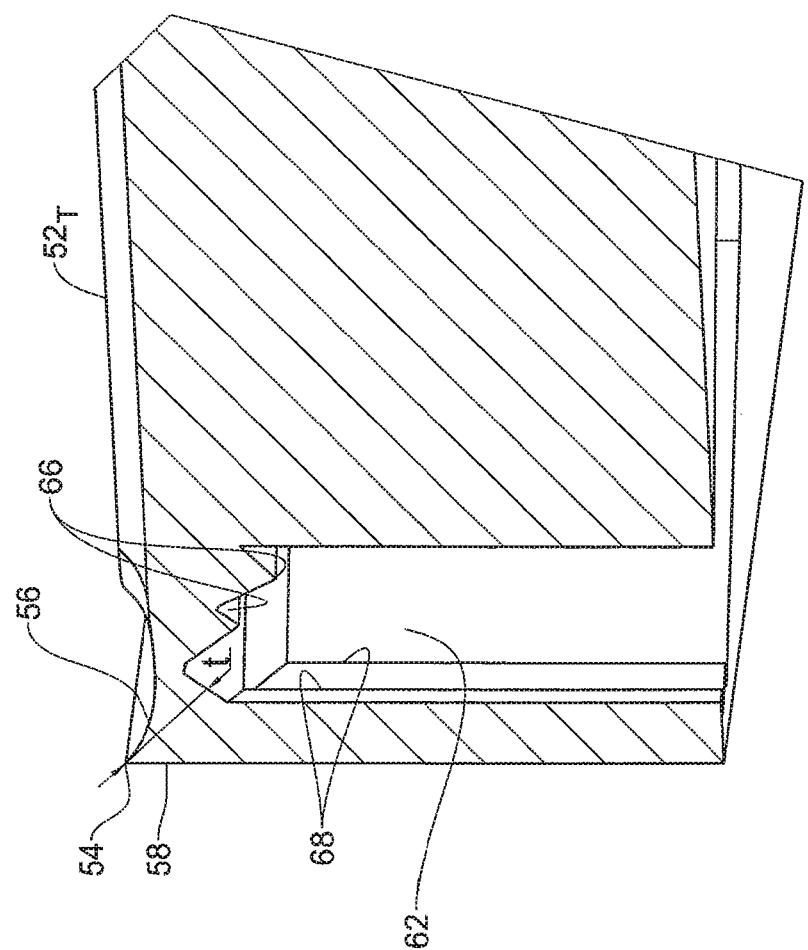
FIG. 5B is a schematic isometric section view of the cutting insert shown in FIG. 5A.

Attention is now drawn to FIGS. 5A and 5B in which a cutting insert 50 is shown, comprising a body 52 with a top surface $52_T$, bottom surface $52_B$ and side surfaces $52_S$ extending therebetween. The cutting insert 50 has four cutting edges 54 defined at the respective four corners of the insert at the intersection between the top surface $52_T$ and the side surfaces $52_S$. Each cutting edge 54 is delimited by a rake surface 56 and a relief surface 58 located on opposite sides of the cutting edge 54. The cutting edge 54, rake surface 56 and relief surface 58 constitute together the external surface of the cutting zone of the cutting insert 50.

In addition, the cutting insert 50 comprises four cooling cavities 60, each associated with a respective cutting edge 54. Each cooling cavity has an inner space 62 delimited by side walls and a slope 64, tapering away from the cutting edge 54. The inner surface of the cavity provides each cutting corner of the cutting insert 50 with a shell-like geometry (a thin-walled structure) which has an external, operational surface (comprising the cutting edge 54) and an internal, cooling surface constituted by the surface of the cavity 60.

It is observed that the cooling surface is formed with an array of ribs, including rake ribs 66 which extend generally parallel to the rake surface 56 and relief ribs 68 which extend generally parallel to the relief surface 58. With particular reference to FIG. 5B, the rib array allows the shell-like geometry to be of relatively small thickness t, reaching extremely close to the cutting edge 54. In other words, the arrangement is such that the cavity surface at the cutting zone is much closer to the cutting edge 54 than to the bottom surface $52_B$ of the cutting insert 50.

It will be appreciated that a cutting insert 20 may comprise a single rib, which may be a rake rib 66 or relief rib 68 such as described, or a single rib a portion of which is generally parallel to the rake surface 56, and a portion of which is generally parallel to the relief surface 58. The single rib may be disposed centrally within the cavity 60, or off-center.

Figure 6:
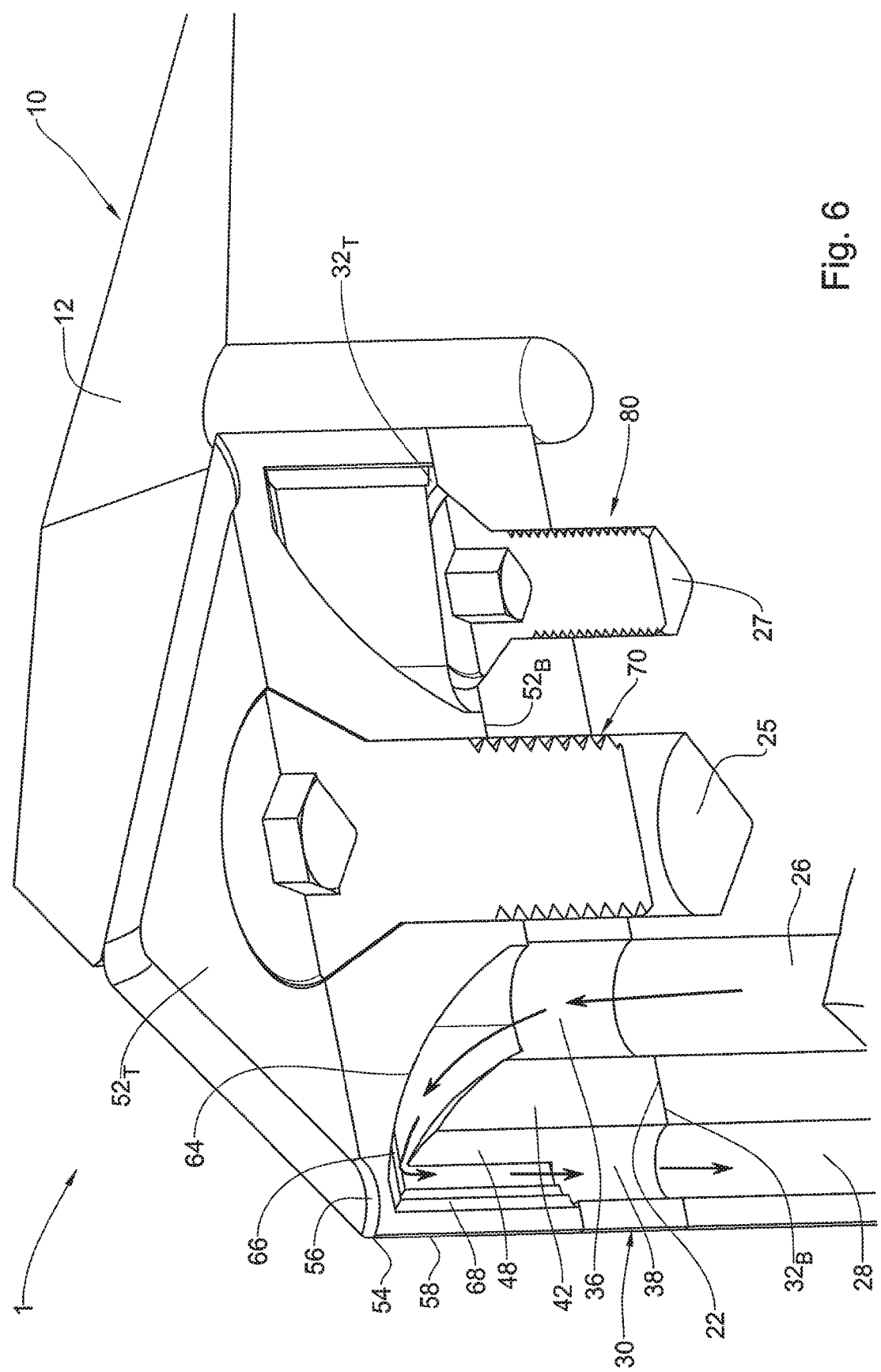
FIG. 6 is a schematic section view of a portion of the cutting tool shown in FIGS. 1A and 1B.

Turning to FIG. 6, a section of the cutting tool 1 is shown, demonstrating how the cutting insert 50 is positioned on the base plate 30. It is observed that since the cavities 60 are only at the vicinity of the cutting corners, the majority of the bottom surface $52_B$ of the cutting insert 50 rests on the base plate 30 and thus provides sufficient stability and support to the cutting insert 50.

It is also noted that the geometry of ribs (as opposed to a straight wall) provides for a much stronger construction, allowing the cavity 60 to be even closer to the cutting edge 54, i.e., provide a smaller thickness between the external, operative surface and internal, cooling surface (as small as 0.5 mm).

In operation, during cutting of a workpiece (not shown), the cutting edge 54 heats up due to constant friction with the workpiece. This heat, reduction of which is usually facilitated by providing a cooling fluid directly to the cutting edge, propagates towards the center of the cutting insert 50 so that the body 52 of the cutting insert 50 becomes a heat accumulator.

In order to mitigate this effect, the arrangement according to the subject matter of the present application allows cooling the inner portion of the cutting zone of the cutting insert 50 thereby facilitating both increased cooling of the cutting edge 54 (external cooling is used anyway, though not shown here) and cooling of the body 52 of cutting insert 50 itself.

With additional reference being made to FIG. 4, in operation, cooling fluid W is provided to the insert seat space 20. Reaching the insert seat space 20 (position $W_2$), the cooling fluid is emitted from the inlet 36 and is urged into the cavity 60 of the cutting insert 50. There (position $W_3$), the slope 64 and a ramp 44 define together a gradually tapering channel, with a gradually reducing cross-sectional area, in which the velocity of the cooling fluid is increased. The cooling fluid is thus pushed towards the inner surface of the cutting edge 54, in between the ribs 66, 68 which maximize heat dissipation between the cutting edge 54 and the cooling fluid W by increasing surface area. The cooling fluid W is then emitted (position $W_4$) from the cutting insert 50 through the open end of the cavity 60 and is discharged from the cutting tool holder 10 via inlets 36 and 26 respectively.

The above described cutting insert 50 is configured for both milling and cutting, or turning, operations. In this regards, the following differences should be noted between these two operations:

Milling—the cutting edge keeps coming in and out of contact with the workpiece. As a result, when it is in contact with the workpiece the cutting edge heats up, whereas when it is out of contact, the cutting edge cools down. However, this constant motion in and out of the workpiece causes the milling insert to be repeatedly "impacted" by the workpiece, requiring sufficient mechanical robustness and stability;

Turning—the cutting edge remains within the workpiece throughout the cutting operation, whereby the effect of "impact" by the workpiece, which occurs in milling, is eliminated. However, since the cutting edge is constantly in contact with the workpiece, it constantly heats up, requiring sufficient cooling to prevent mechanical damage to the cutting insert.

The above described cutting insert 50 provides both for sufficient mechanical integrity to withstand a milling operation as well as sufficient heat removal space for the cooling fluid.

Figure 7A:
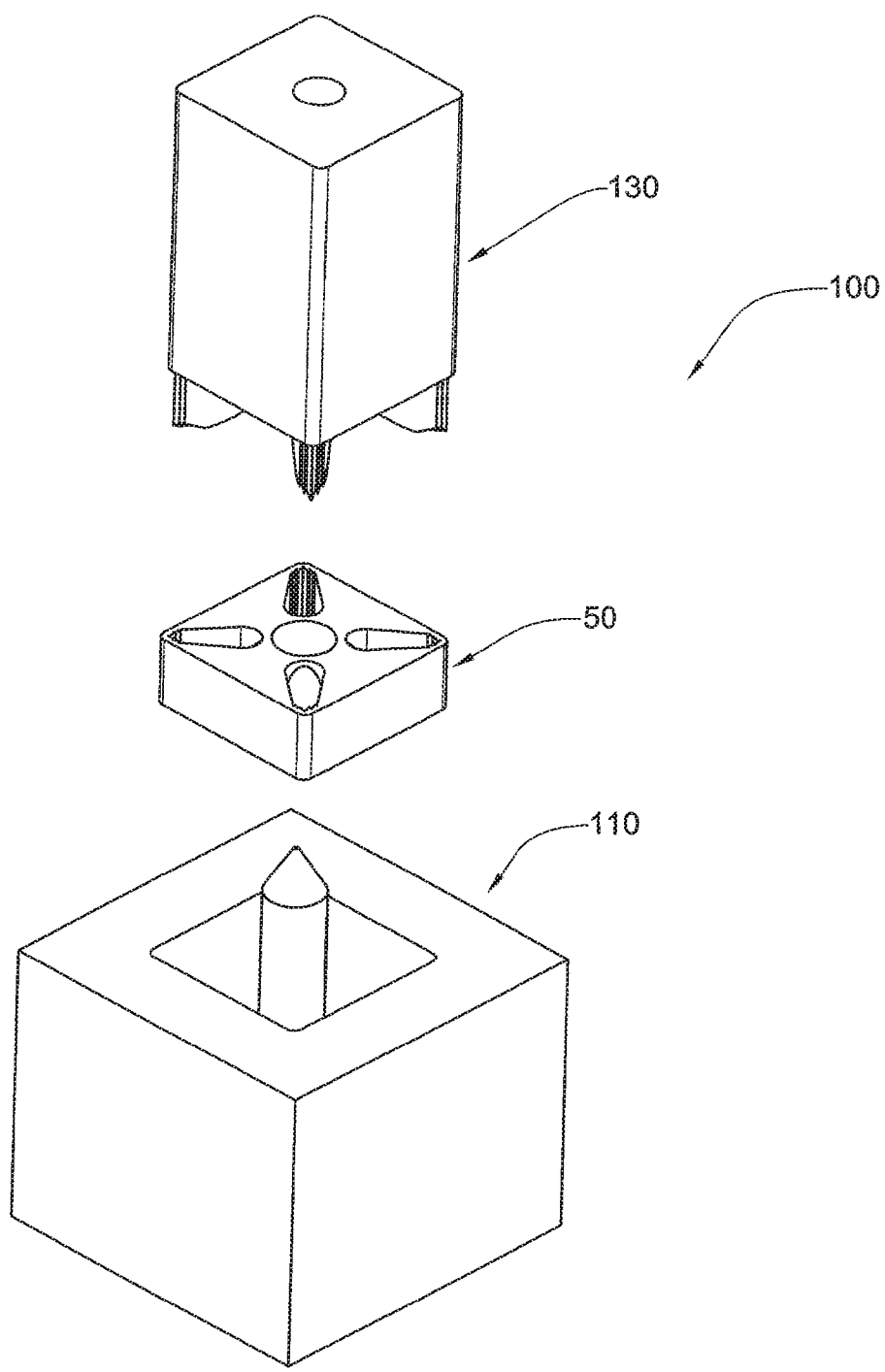
FIG. 7A is a schematic exploded isometric view of a mold for the manufacture of the cutting insert shown in FIGS. 5A and 5B.

Turning now to FIGS. 7A and 7B, the cutting insert 50 is manufactured in a press mold 100 comprising a female part 110 and a male part 130. The male part 130 comprises a body 132 formed on a surface thereof with four projections 140 which correspond in shape and size to the required cavities 60 to be formed within the cutting insert 50. Each projection 140 comprises a body 142 formed with a ramp portion 144, rake ribs 146 and relief ribs 148.

Figure 8C:
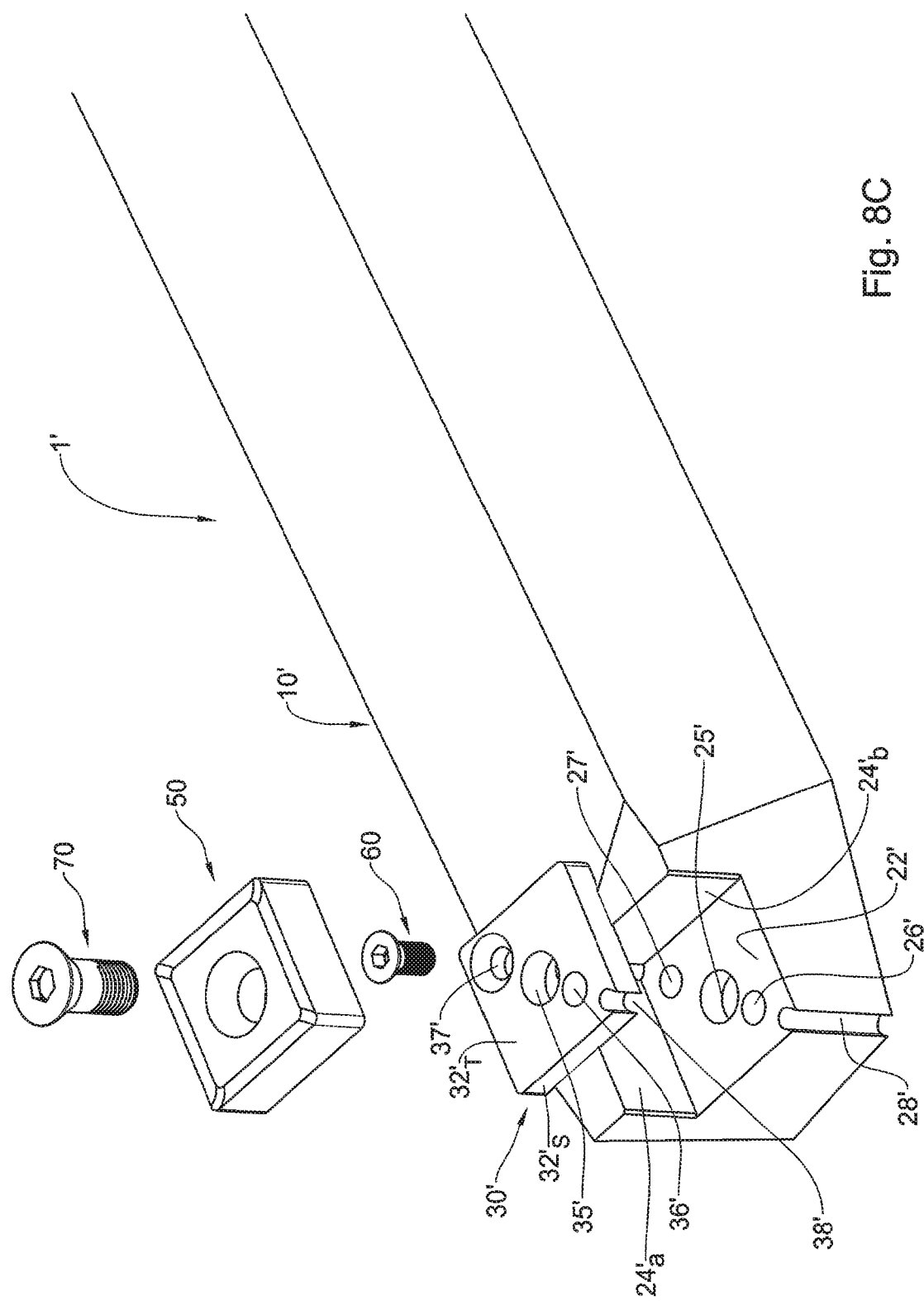
FIG. 8C is a schematic exploded isometric view of the cutting tool shown in FIG. 8A.

Attention is now drawn to FIGS. 8A to 8C, in which a variation of the above cutting tool is shown, generally designated as 1'. Similar designation numbers have been used with the addition of a prime ('), i.e., cutting tool holder 10' is equivalent to cutting tool holder 10 and so on.

The only difference between the cutting tool 1' and cutting tool 1 lies in that the outlets 28', 38' of the cutting tool holder 10' and base plate 30' respectively, are in the shape of open channels.

Specifically, the heated cooling fluid emitted from the cavity 60' of the cutting insert 50' does not pass through a closed channel as shown in cutting tool 1, but rather through an open channel 38', 28' as shown in the above Figs.

The open channel configuration allows increasing the flow rate of the cooling fluid W by increasing the drainage rate of the cooling fluid.

Figure 9A:
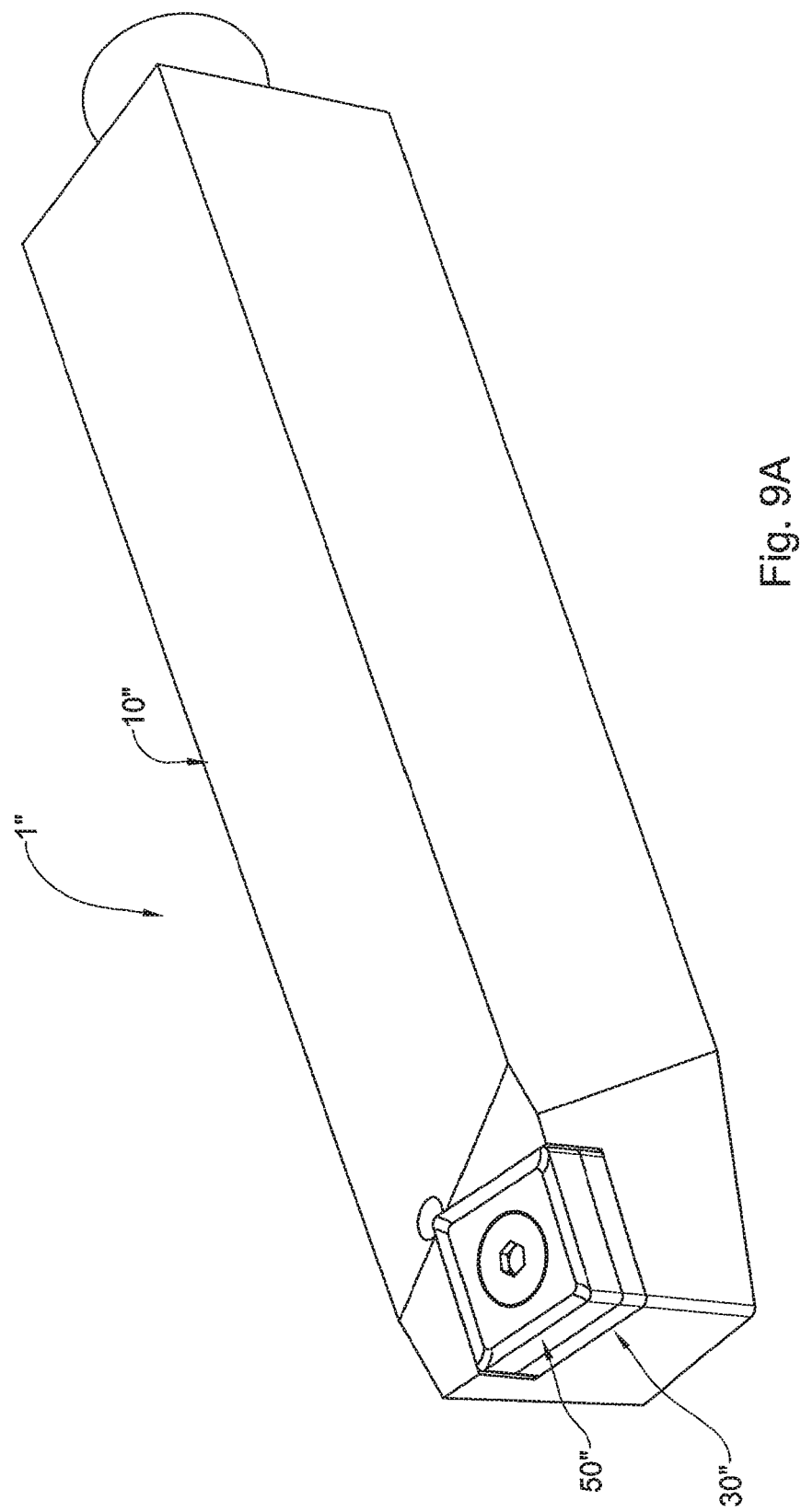
FIG. 9A is a schematic isometric view of a cutting tool according to another example of the subject matter of the present application.
Figure 9B:
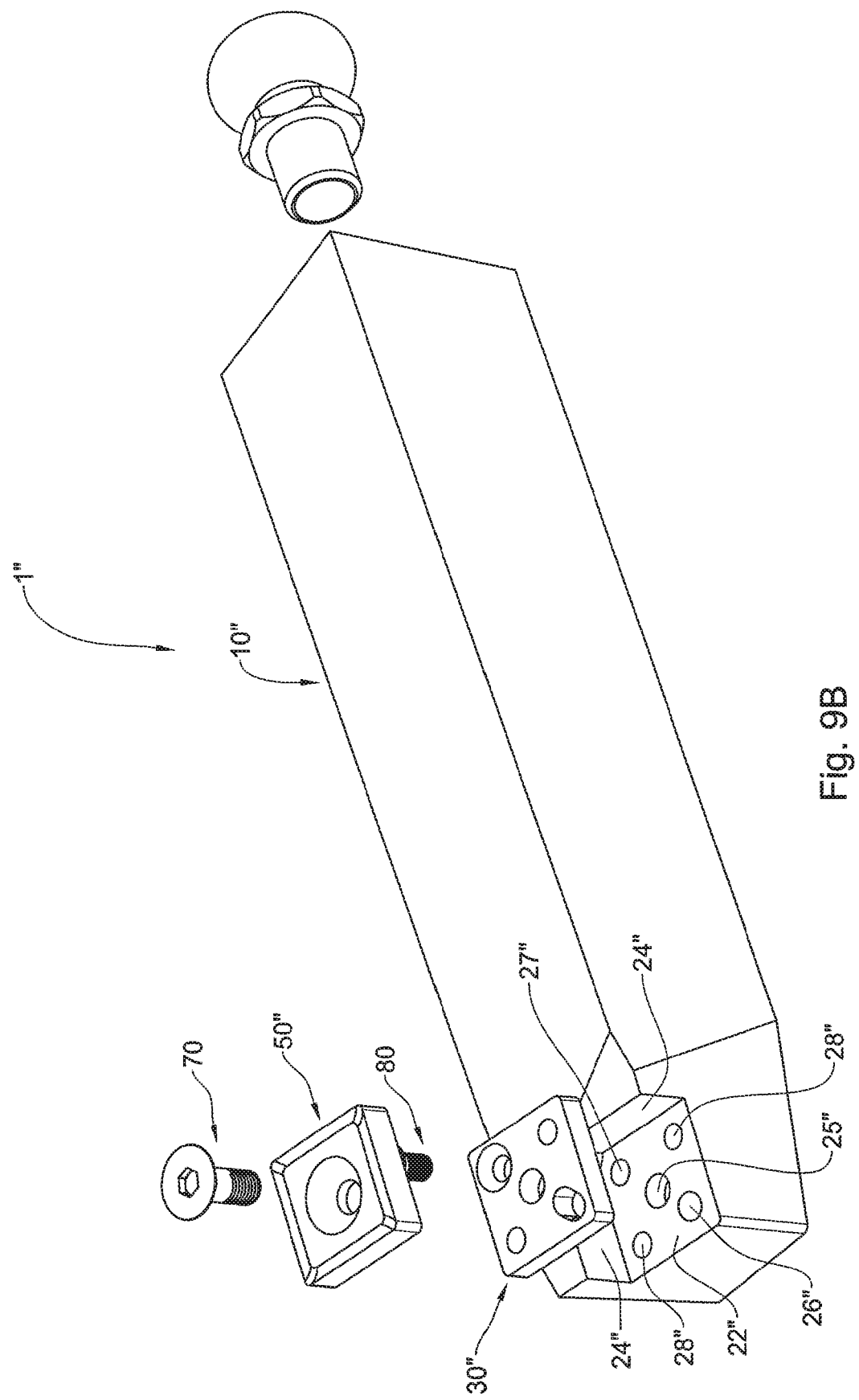
FIG. 9B is a schematic exploded isometric view of the cutting tool shown in FIG. 9A.
Figure 11:
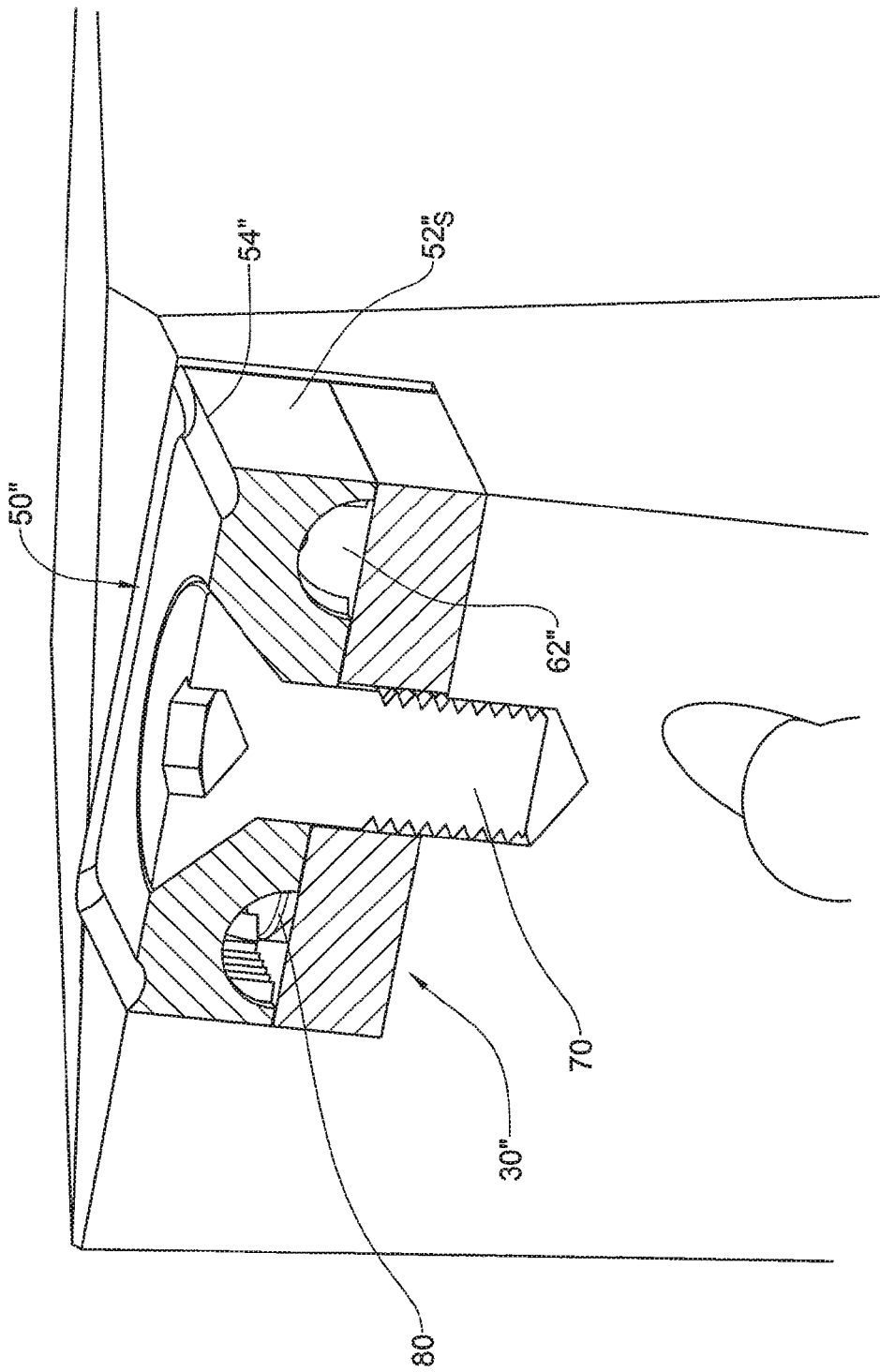
FIG. 11 is a schematic section view of the cutting tool shown in FIG. 9A.

Turning now to FIGS. 9A and 9B, another example of a cutting tool is shown, generally designated 1", and comprising a cutting tool holder 10", a base plate 30", a cutting insert 50" and securing bolts 70", 80".

In the present example, the insert seat space 20" of the cutting tool holder 10" comprises one inlet 26" located at the proximity of the working corner and two outlets 28" located spaced therefrom.

Respectively, the base plate 30" comprises an inlet 36" configured to be aligned with the inlet 26" and two outlets 38" spaced therefrom and configured for being aligned with the outlets 28". Contrary to the previously described example, the base plate 30" does not comprise a fluid ramp.

Turning to FIG. 10, the cutting insert 50" comprises a main body 52" with a top surface $52_T{''}$, a bottom surface $52_B{''}$ and side surfaces $52_S{''}$ extending therebetween. However, whereas in the previous examples the cavities 60 were individual for each cutting corner, in the present example, the cutting insert 50" has a main cavity 60", so that the entire cutting insert is shell-like (i.e., in the form of a thin-walled structure).

Reverting to FIGS. 9C and 9D, under the above configuration, cooling fluid W is provided through an internal channel 16" (position $W_1$) and is urged towards the insert seat space 20". There, the cooling fluid enters through the inlets 26", 36" (position $W_2$) and is emitted into the cavity 60" of the cutting insert 50" and spreads sideways (position $W_3$), filling the entire cavity 60". The cooling fluid W is then emitted through the discharge outlets 38" and away from the cutting tool 1".

It is observed that, as opposed to the previously described example, the cutting insert 50" of the present example comprises much less material, and is therefore less robust. As a result, it may be that the above cutting insert 50" is more suitable for turning operation rather than milling.

However, it is noted that the above cutting insert may also be used in milling, in particular, in milling operations in which three corners of the cutting insert 50" come into contact with the workpiece. In this case, it is appreciated that the cooling fluid W facilitates cooling not only of the main corner towards which the fluid is discharged but also to the adjacent cutting corners due to flow of the cooling fluid towards the discharge outlets 38".

Attention is now drawn to FIG. 12, in which another example of a cutting tool is shown, generally designated 1'''. This tool is generally similar to previously described tool 1" with the difference being in two features:

Reduced corner—the cutting insert 50''' has a chipped-away portion 59''' at each corner proximal to the bottom surface 520', which provides an additional drainage outlet for the cooling fluid during operation, via a formed gap g; and Additional holes—the top surface $52_T'''$ of the cutting insert 50''' is provided with four through going drainage holes 57''' which are configured for facilitating greater removal of cooling fluid from the cutting insert 50'''.

It is noted that the drainage holes 57''' are not directed to the cutting corner as they are not intended for providing cooling fluid to the external surface of the cutting edge 54'''. On the contrary—the drainage holes 57''' are only configured for allowing increased evacuation of cooling fluid from the cutting insert 50'''. Thus, it can be posited that the majority of the cooling fluid emitted from the drainage holes 57''' does not reach the operative cutting corner at all.

Turning to FIG. 14, a male part 130''' is shown constituting part of a mold (not shown) for the manufacture of the cutting insert 50'''. It is noted that the male part 130''' comprises four corner projections 140''', each being formed with a hole 147''' configured for receiving therein a corresponding projection from the female part (not shown) in order to form the drainage holes 57'''.

The male part 130''' also comprises eight mid-projections 150''' which are configured for the forming of the ribs disposed along the side of the cutting insert 50''', between two neighboring corners.

Figure 15A:
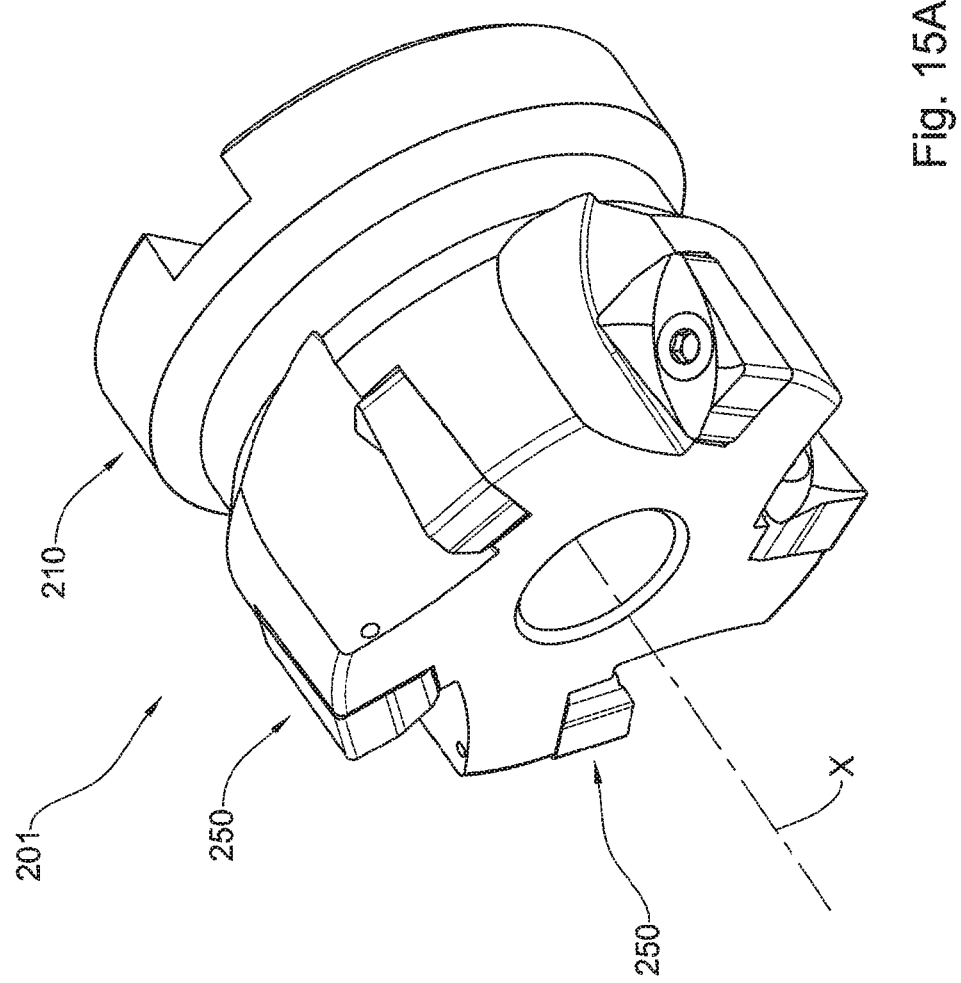
FIG. 15A is a schematic isometric view of a milling tool according to another example of the subject matter of the present application.

Turning now to FIG. 15A, a milling tool is shown, generally designated as 201 and comprising a tool holder 210 formed with a plurality of insert seat spaces 220, each being configured for receiving therein a cutting or milling insert 250.

Figure 15B:
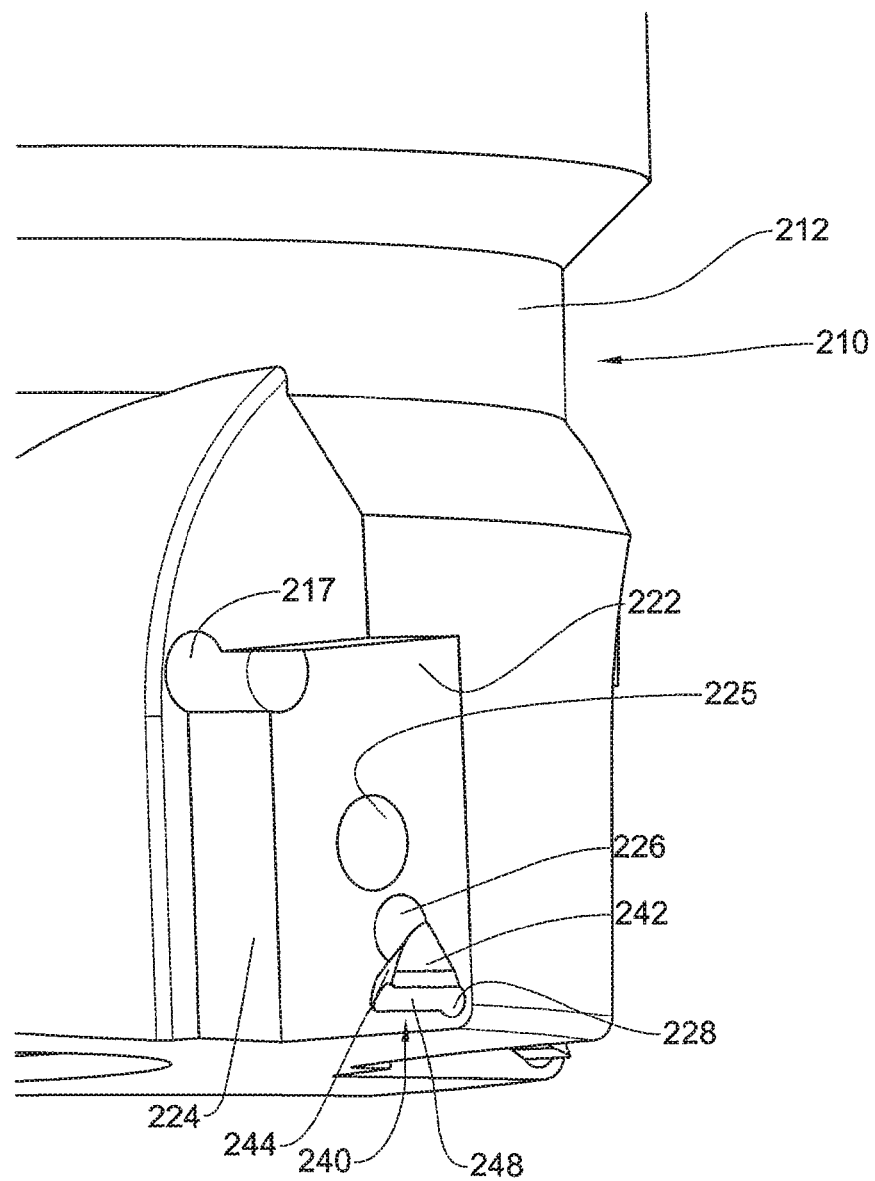
FIG. 15B is a schematic enlarged view of an insert seat space of the milling tool shown in FIG. 15A.

With particular reference being made to FIGS. 15B and 15C, each insert seat space 220 comprises a securing bore 225 configured for receiving therein a securing bolt 270 for fixing the cutting insert 250 into the insert seat space 220.

In addition, each insert seat space 220 comprises an inlet 226 configured for provisional cooling fluid into the insert seat space 220 and an outlet 228 configured for removal of cooling fluid therefrom. As opposed to the cutting tool 1 previously described, in this case there is no base plate 30, and the insert seat space 220 itself serves as a base plate.

Thus, the seat surface 222 is formed with a ramp element 240 projecting from the insert seat space 220 and has a body 242 with a ramp surface 244, an inlet channel 246 and an outlet channel 248 merging with respective inlet and outlet 226, 228. It is also noted that the outlet 228 extends along the insert seat space 220 and has a discharge opening 229 at the rear side of the insert seat space 220, the purpose of which will not be explained.

Figure 15D:
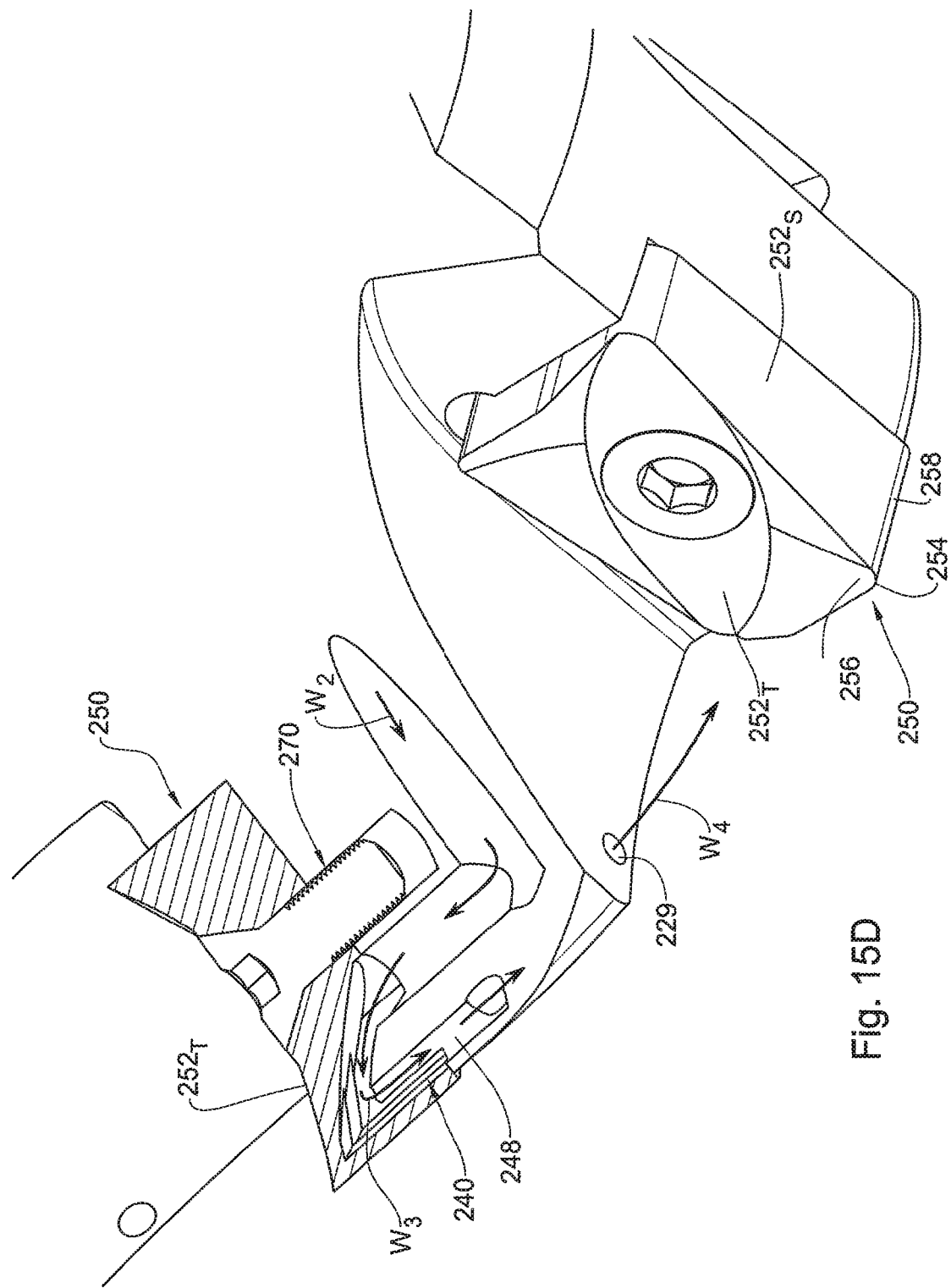
FIG. 15D is a schematic isometric section view of the milling tool shown in FIG. 15A, demonstrating the flow of cooling fluid.

Turning to FIG. 15D, when the cutting insert 250 is mounted onto the insert seat space 220, a configuration similar to that shown in FIG. 1A is achieved. Thus, during operation, cooling fluid W passes through the tool holder 210, enters the insert seat space 220 via the inlet 226 and is discharged into the cavity 260 of the cutting insert 250. From there, owing to the ramp 240 and slope 264, the fluid is directed to the outlet 228.

In this case, the cooling fluid is discharged from the insert seat space 220 via discharge opening 229. It is noted here that the discharge opening 229 is arranged such the discharged fluid is aimed at the cutting corner of the subsequent cutting insert 250, so it also serves as an addition to the standard external cooling. However, it is noted that the cooling fluid passing through the insert seat space 220 is not used for external cooling of the cutting edge of the cutting insert mounted into that insert seat space.

Figure 16A:
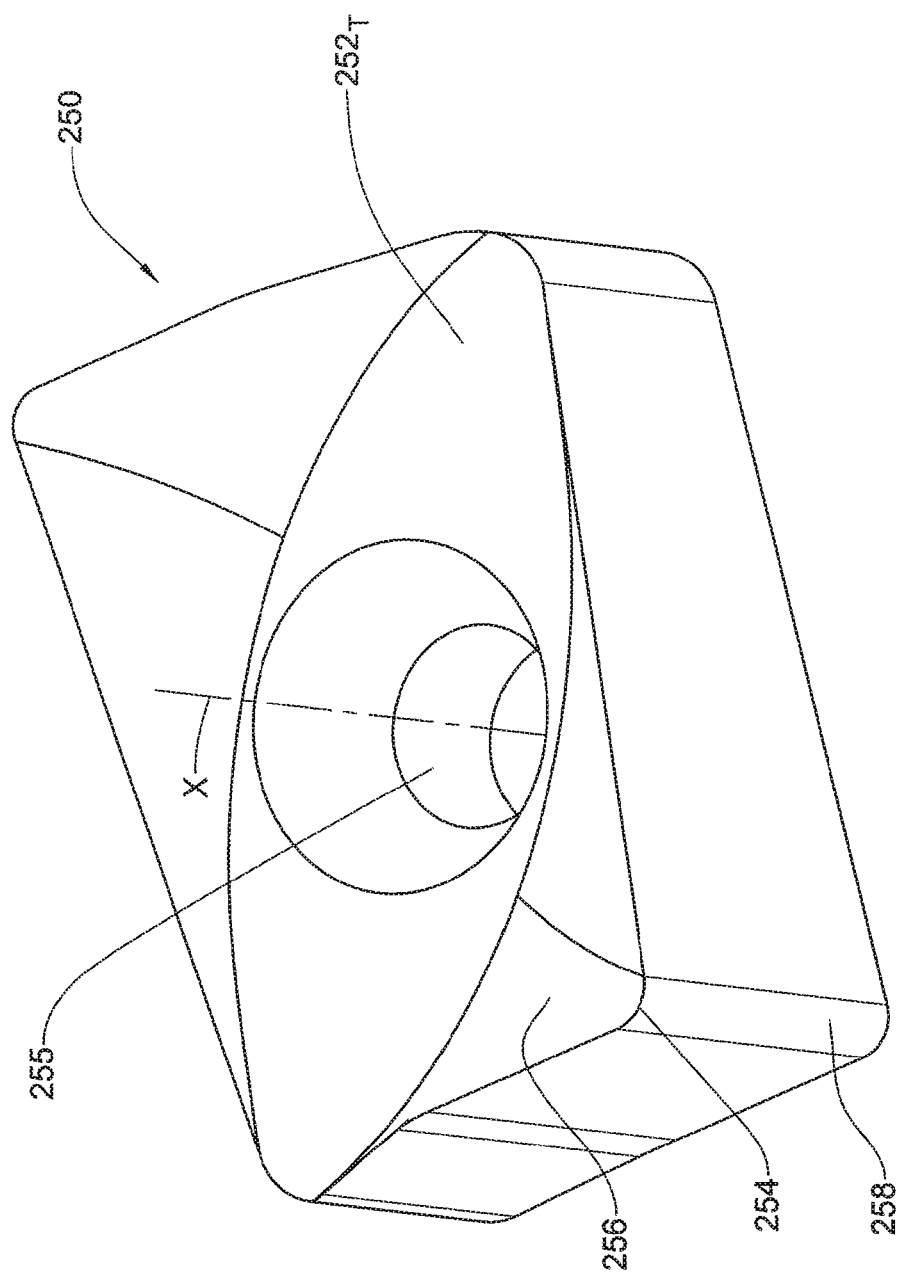
FIG. 16A is a schematic isometric view of a milling insert used in the milling tool shown in FIG. 15A.
Figure 16B:
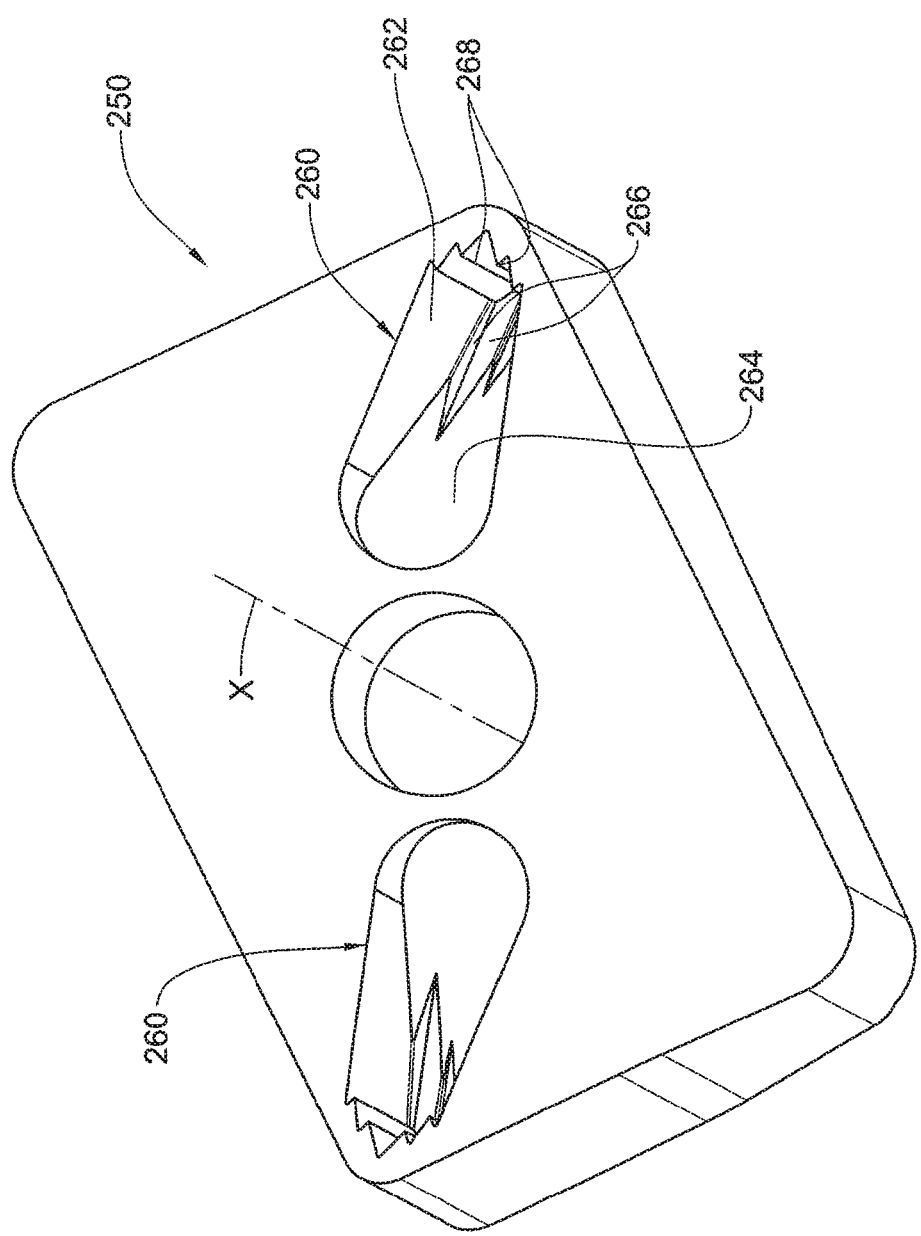
FIG. 16B is a schematic bottom isometric view of the milling insert shown in FIG. 16A.

Reference is now made to FIGS. 16A and 16B, in which a cutting or milling insert 250 is shown. In principle, the milling insert 250 is generally similar to the cutting insert 50 previously described with the difference being it has two cutting corners and two corresponding cavities 260.

Figure 17A:
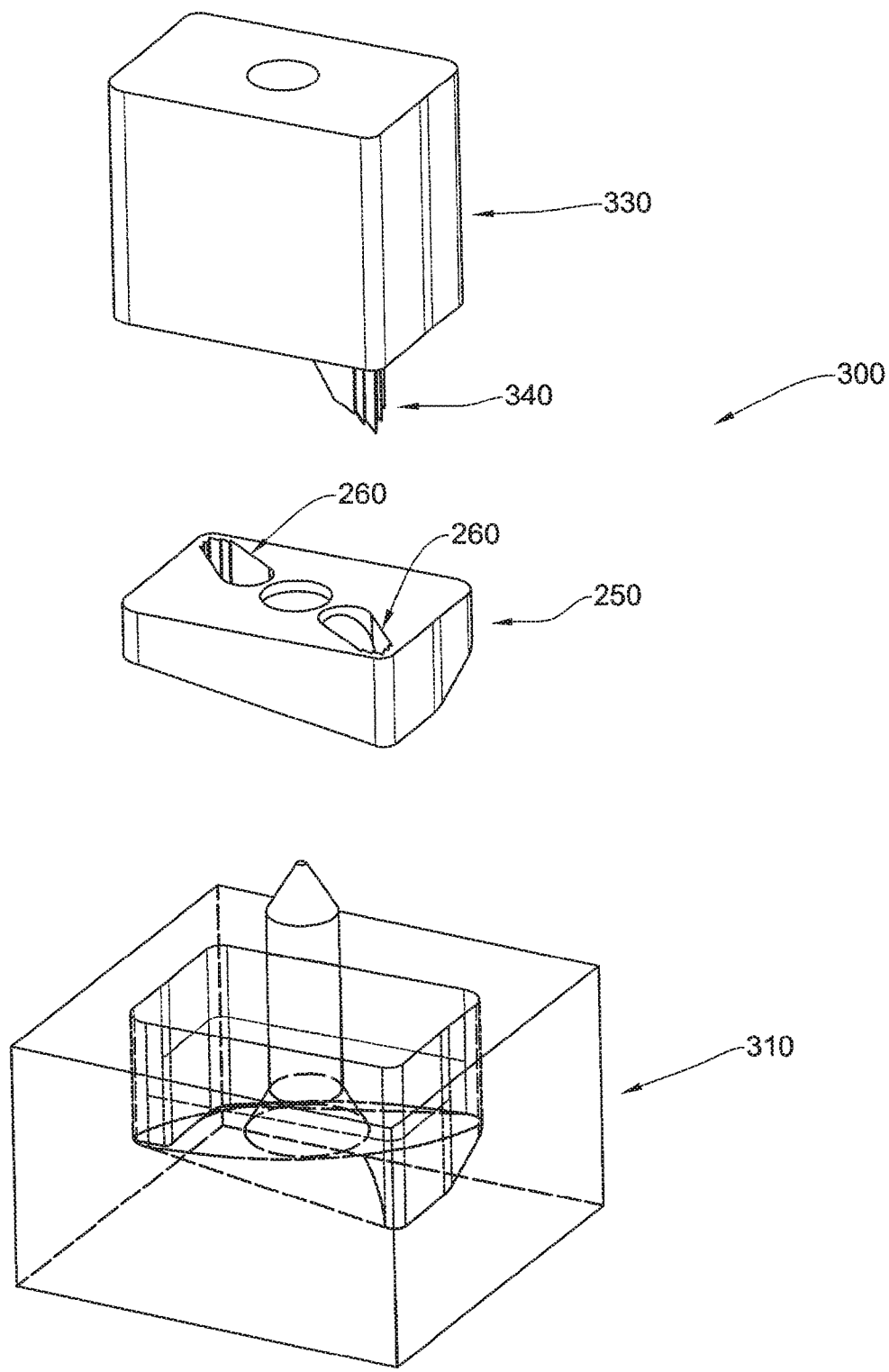
FIG. 17A is a schematic exploded isometric view of a mold for the manufacture of the milling insert shown in FIGS. 16A and 16B.

With reference to FIGS. 17A, 17B, the milling insert 250 is manufactured in a pressing process within a mold 300 comprising a male part 330 and a female part 310.

With regards to all of the above cutting inserts 50, 50, 50, 50''' and 250—all can be manufactured in a pressing/sintering process, allowing for convenient mass production of the cutting inserts.

Attention is now drawn to FIGS. 18A to 20C, in which another example of a cutting tool is shown, generally designated 401, and a mold for the manufacture of its cutting insert 450.

As seen in FIGS. 18B and 18C, the cutting insert 450 comprises an insert bore 455 which is diagonally oriented with respect to the top and bottom surfaces $452_T$, $452_B$ respectively.

Such an orientation of the insert bore allows forming the cooling cavities 460 closer to the cutting edge 454, since the diagonal orientation leaves more material area to be worked with. This, in turn, allows for a more robust structure of the cutting insert, the mechanical integrity of which is not greatly deteriorated due to the forming of the cooling cavity 460.

It is observed that the cooling cavity 460 is of conical shape spanning between an open bottom end $460_B$ and a top end $460_T$, facilitating concentrating the flow of cooling fluid therewithin towards an area of the cutting insert 450 directly adjacent and behind the cutting edge 454 (the flow being designated by arrows 428). In particular, for example as best seen in FIG. 19, a front side of a wall 461 defining each of the cavities 460 is disposed such that at least a portion thereof (e.g., at least that portion adjacent the bottom end $460_B$) forms an angle α with respect to the bottom surface $452_B$, in a direction toward the relief surface 458, which is less than 90°, i.e., the top end $460_T$ of each cavity 460 is disposed farther forward (i.e., toward the cutting edge/relief surface) than is any part of the bottom end $460_B$.

It will be appreciated that owing to the disposition of the top end $460_T$ of each cooling cavity 460 forward of the open bottom end $460_B$ thereof, a portion of the cavity is above material of the cutting insert 450 (i.e., a straight path perpendicular from the bottom surface $452_B$ to at least some of the cavity passes through material of the insert; along an axis parallel to the top and bottom surfaces $452_T$, $452_B$, the top end $460_T$ of the cooling cavity 460 is closer to the respective cutting edge than is any part of the open bottom end $460_B$). Accordingly, a molding process to manufacture the cutting insert 450 must be performed so as to produce it at an angle, as will be described below.

Figure 18D:
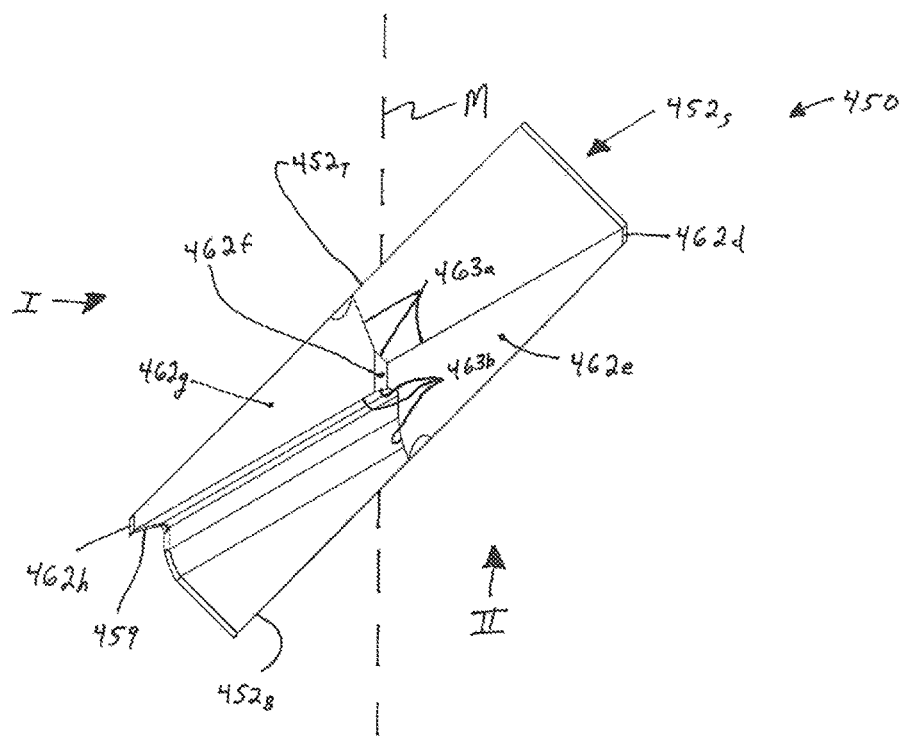
FIG. 18D is a schematic side view of the cutting insert shown in FIG. 18B.

The geometry of the cooling cavity 460 therefore defines one or more (e.g., a range) molding angles, with respect to the bottom surface $452_B$, along which a solid element having the shape of the cooling cavity and completely inserted therein (such as part of a mold) may be retracted therefrom along a linear path. Accordingly, the cutting insert 450 is associated with a molding axis M (for example as indicated in FIG. 18D), which is oriented along one of the angles defined by the cooling cavities 460. According to some examples, the molding axis M is disposed at an angle of 45° with respect to the bottom surface $452_B$, for example within a plane bisecting the cutting edge 454.

As illustrated in FIGS. 18D-18G, side surface $452_S$ of the cutting insert, spanning between the top and bottom surfaces $452_T$, $452_B$, comprise a circumscribing portion 462, constituted by segments 462a through 462h, and demarcated by first and second edges 463a, 463b (for clarity, only some of the first and second edges are indicated; it will be appreciated that some of the edges 463a, 463b may be formed between the circumscribing portion 462 and one of the top and bottom surfaces $452_T$, $452_B$, the side surface $452_S$, or a combination thereof). The circumscribing portion 462 is, along its entire extent, parallel to the molding axis M, i.e., in any plane in which the molding axis lies, an intersection line between the plane and the circumscribing portion is parallel to the molding axis.

The circumscribing portion 462 has a non-zero height, in a direction parallel to the molding axis M, along its entire extent (i.e., the entire way around the circumscribing portion). The significance of the non-zero height will be explained below with respect to the molding process; it will be understood that such explanation will inform one having skill in the art the scope of the term "non-zero height" in the presently disclosed subject matter and appended claims. As illustrated, the height of the circumscribing portion 462 may vary along its extend around the cutting insert 450), or it may be constant thereabout.

Figure 18E:
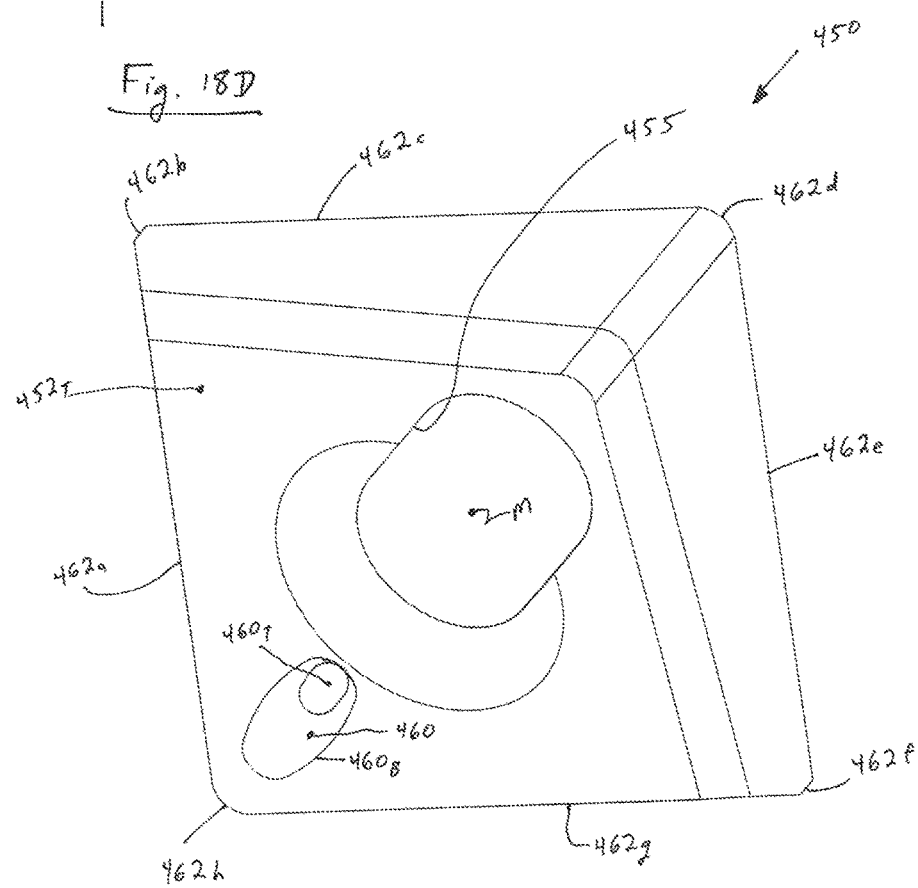
FIG. 18E is a top plan view of the cutting insert shown in FIG. 18B, perpendicular to axis M illustrated in FIG. 18D.
Figure 18F:
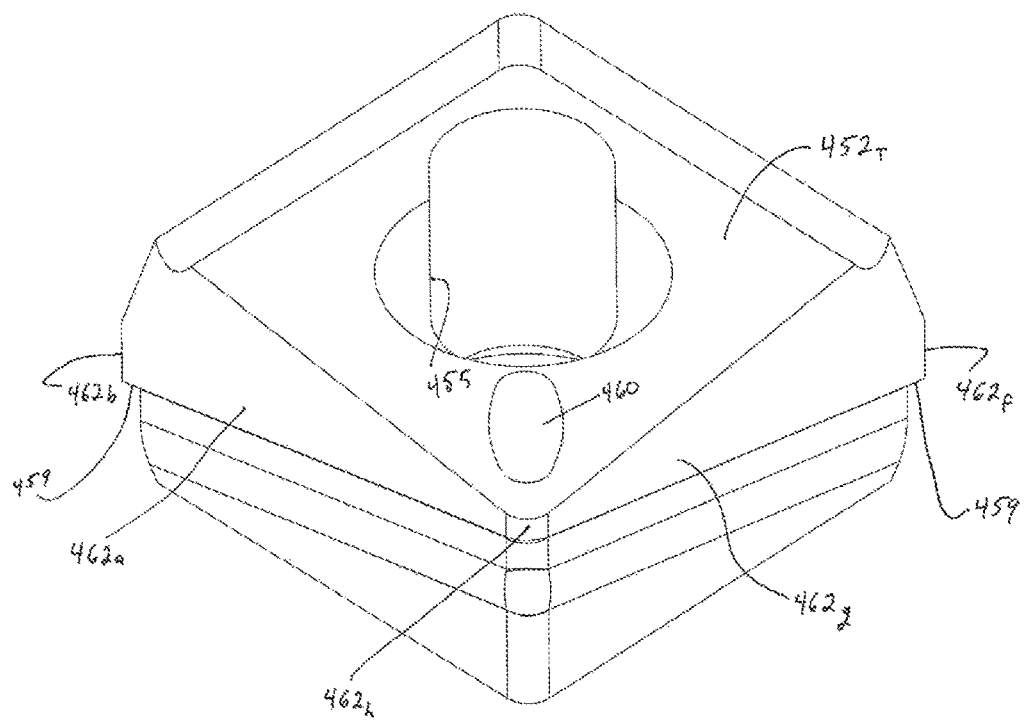
FIG. 18F is a side view of the cutting insert shown in FIG. 18B, viewed as indicated by arrow I in FIG. 18D.
Figure 18G:
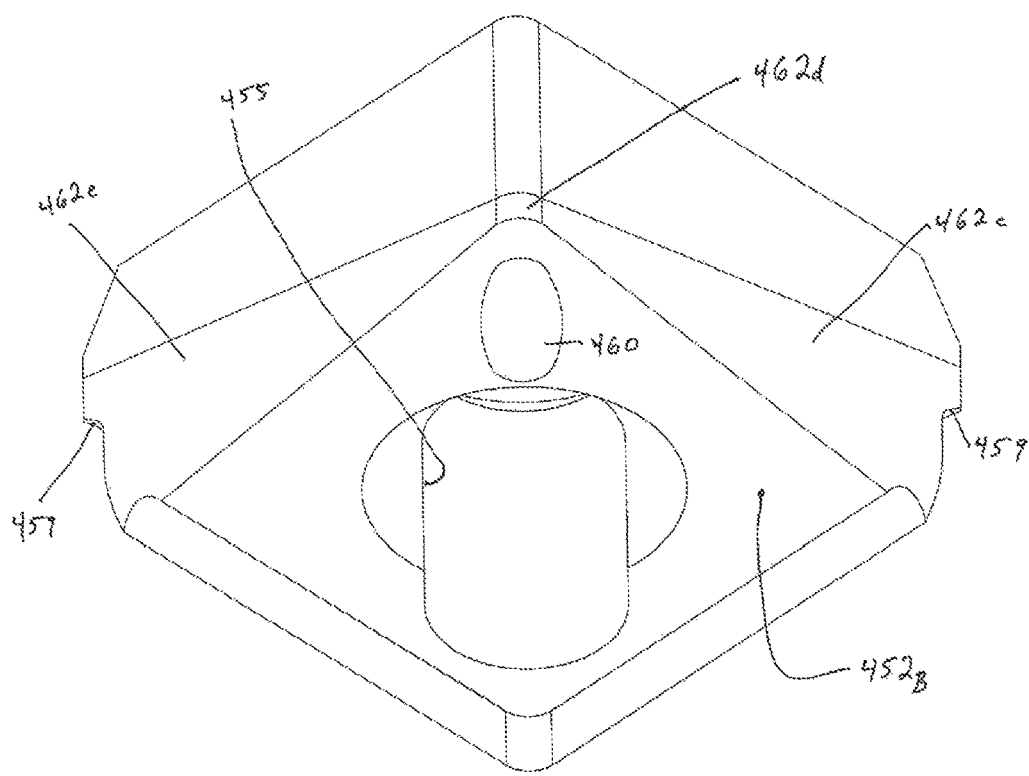
FIG. 18G is a side view of the cutting insert shown in FIG. 18B, viewed as indicated by arrow II in FIG. 18D.

Furthermore, the cutting insert 450 does not extend beyond the circumscribing portion 462, i.e., in any plane in which the molding axis lies, there is no material of the cutting insert beyond the circumscribing portion. Accordingly, for example as best seen in FIG. 18E, in a plan view perpendicular to the molding axis M, the circumscribing portion 462 defines the outer perimeter of the cutting insert 450.

As seen for example in FIGS. 18C and 18D, at least one of the side surfaces $452_S$ is formed with a shelf 459 extending therealong. The shelf 459 is disposed transverse to the molding axis M, for example perpendicular thereto. The area above the shelf 459 is free of material of the cutting insert 450, i.e., for each point of the shelf 459, a path extending thereabove (i.e., in the direction in which the shelf faces) and which is parallel to the molding axis M does not contain any material of the cutting insert.

The shelf 459 may be formed such that it generally faces (i.e., it is disposed so as to face the general direction of) either the top surface $452_T$ or the bottom surface $452_B$. It will be appreciated that while the cutting insert 450 is described herein with reference to and illustrated in the accompanying figures as being formed with shelves 459 on two of its sidewalls $452_S$, and in particular two adjacent sidewalls between which one of the cooling cavities 460 is disposed, a cutting insert 450 may be provided according to the presently disclosed subject matter having one or more shelves as described above with reference to and as illustrated in the accompanying drawings being formed on fewer or more of the sidewalls, including, but not limited to, on all of the sidewalls, mutatis mutandis.

Figure 20A:
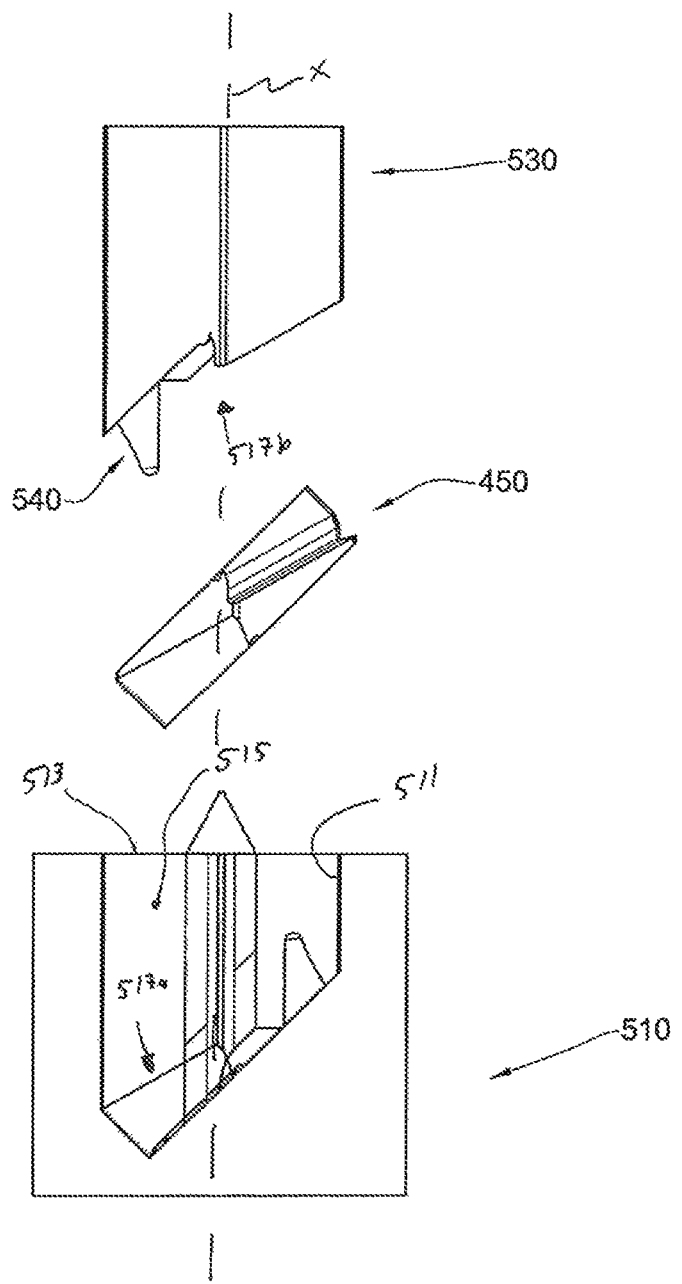
FIG. 20A is a schematic exploded isometric view of a mold for the manufacture of the cutting insert shown in FIGS. 18B and 18C.
Figure 20B:
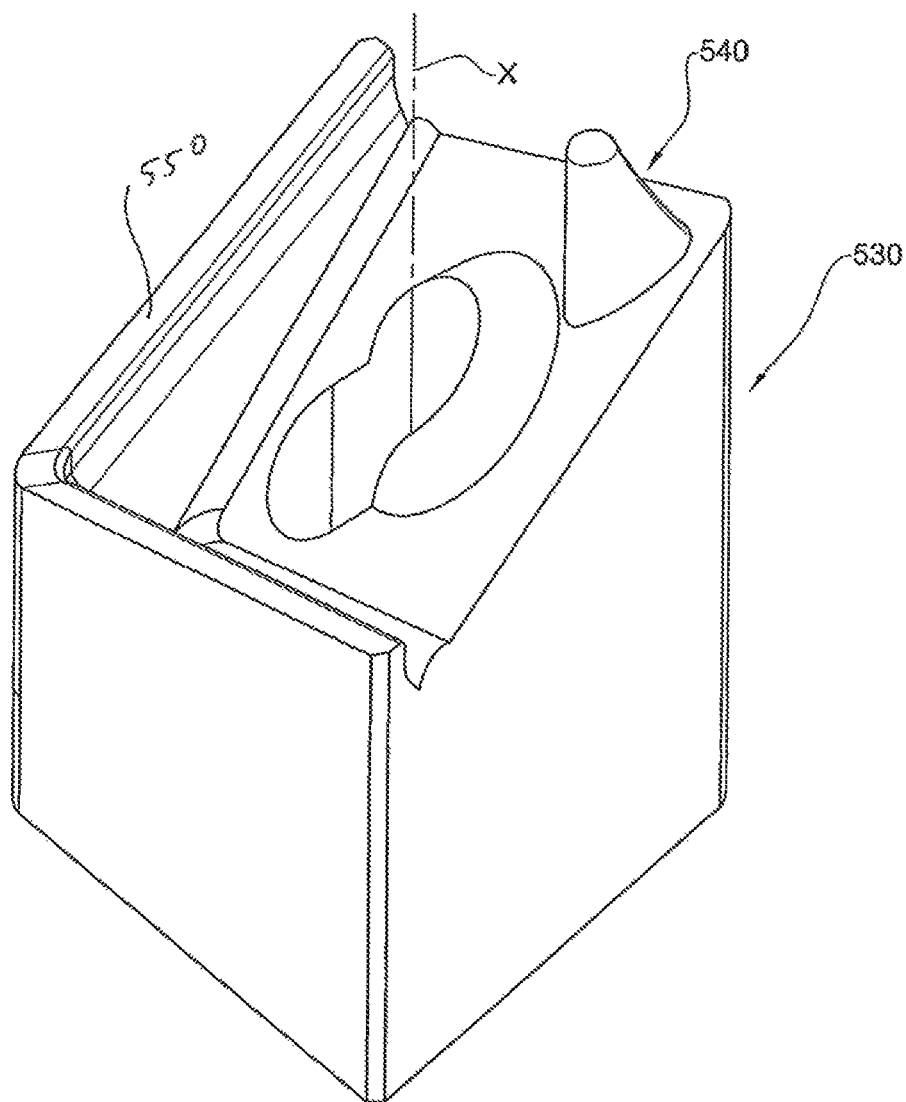
FIG. 20B is a schematic isometric view of a male mold portion of the mold shown in FIG. 20A.
Figure 20C:
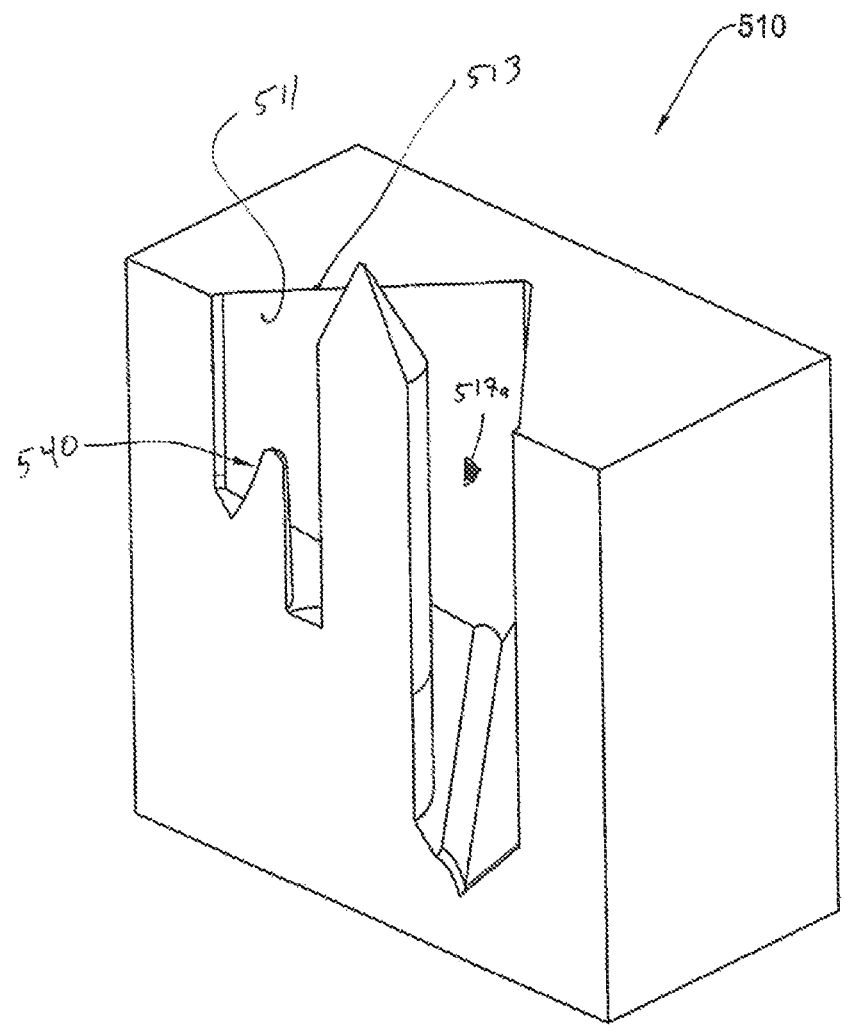
FIG. 20C is a schematic section view of a female mold portion of the mold shown in FIG. 20A.

Turning now to FIGS. 20A to 20C, a mold 501 for the manufacture of the cutting insert 450 is shown, comprising a female mold portion 510 and a male portion 530. The female mold portion 510 comprises parallely extending sidewalls 511 and an open top end 513 defining therebetween a cavity 515, and a upwardly-facing first imprinting surface 517a disposed at the bottom of the cavity. The male mold portion 530 is configured to be snuggly received within the cavity 515 of the female mold portion 510 and slidable along longitudinal axis X of the mold 501, and comprises a downwardly-facing second imprinting surface 517b on a bottom side thereof.

Each of the imprinting surfaces 517a, 517b has a shape which corresponds to that of a respective part of the cutting insert 450 when it is oriented such that its molding axis M is parallel to the sidewalls 511 of the female mold portion 510, each of the parts being demarcated by one of the edges 463a, 463b of the circumscribing portion 462. In particular, each of the imprinting surfaces 517a, 517b comprises a protrusion 540 corresponding to a respective cooling cavity 460. Accordingly, when the cutting insert 450 is produced within the mold 501, the circumscribing portion 462 is defined by the portion of the sidewalls 511 of the female mold portion 510 between the first and second imprinting surfaces 517a, 517b, i.e., it is formed abutting them. Thus, the cavity 515, when the first and second imprinting surfaces 517a, 517b are suitably spaced from one another, has the shape of the cutting insert 450 described above with reference to and illustrated in FIGS. 18A-18G. As best seen in FIG. 20B, one or both of the imprinting surfaces 517a, 517b may be formed with one or more ledges 550, which are configured to form the shelf 459 described above.

It will be appreciated that the cutting insert 450 is produced by the mold 501 oriented such that its molding axis M is parallel to the longitudinal axis X of the mold 501, i.e., the top and bottom surfaces $452_T$, $452_B$ of the cutting insert are oriented) at an angle with respect to the longitudinal axis X of the mold (the axis along which the mold portions 510, 530 are displaced when pressing) corresponding to the molding angle M. This permits the protrusions 540 to be withdrawn from their respective cooling cavities 460 without being damaged or causing damage to the cutting insert 450. As a result, the cooling cavities 460, which are formed generally along the longitudinal axis, are eventually angled to the cutting edge 454 of the cutting insert 450 at the desired angle.

It is important to note that while the pressing is performed along a pressing axis which extends generally along the longitudinal direction of the male and female member, the operative surfaces of the latter, the ones used to form the top and bottom surfaces of the cutting insert are angled at 45° to the pressing axis, allowing the forming of the cavity at the desired angle.

Figure 20D:
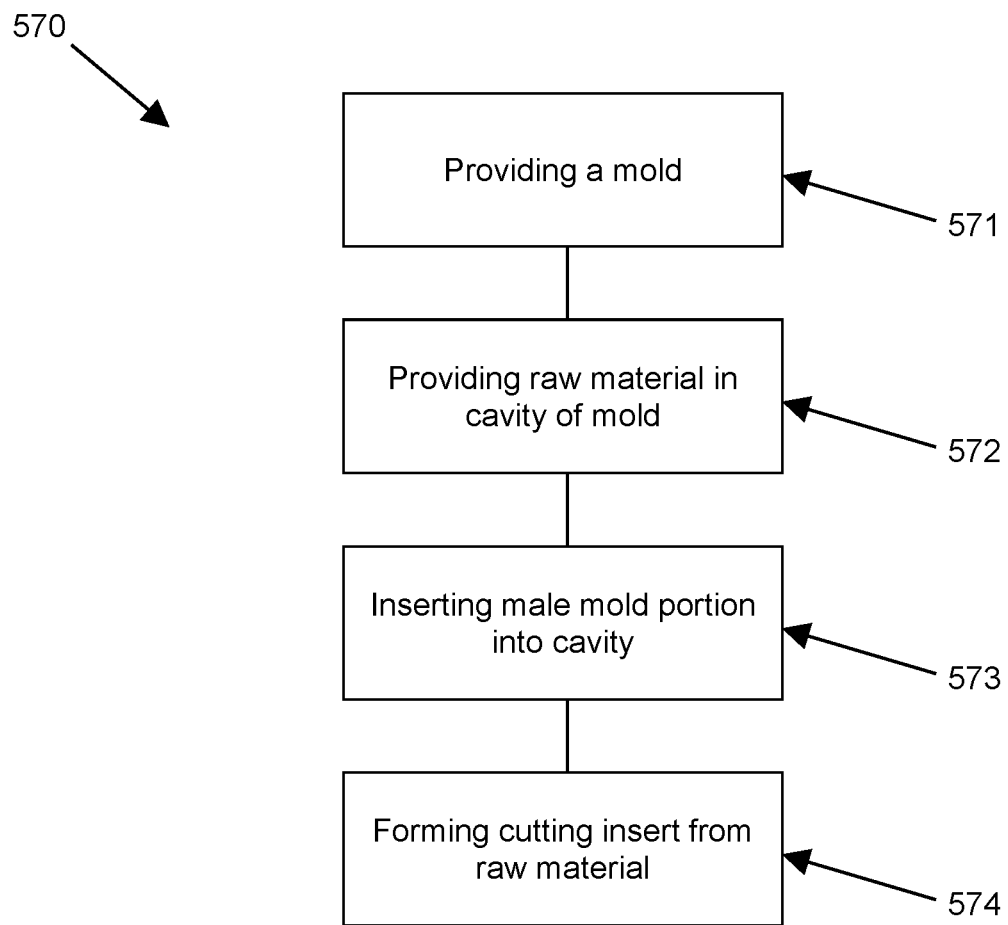
FIG. 20D illustrates a method of forming the cutting insert shown in FIG. 18B, using the mold illustrated in FIG. 20A.
Figure 21A:
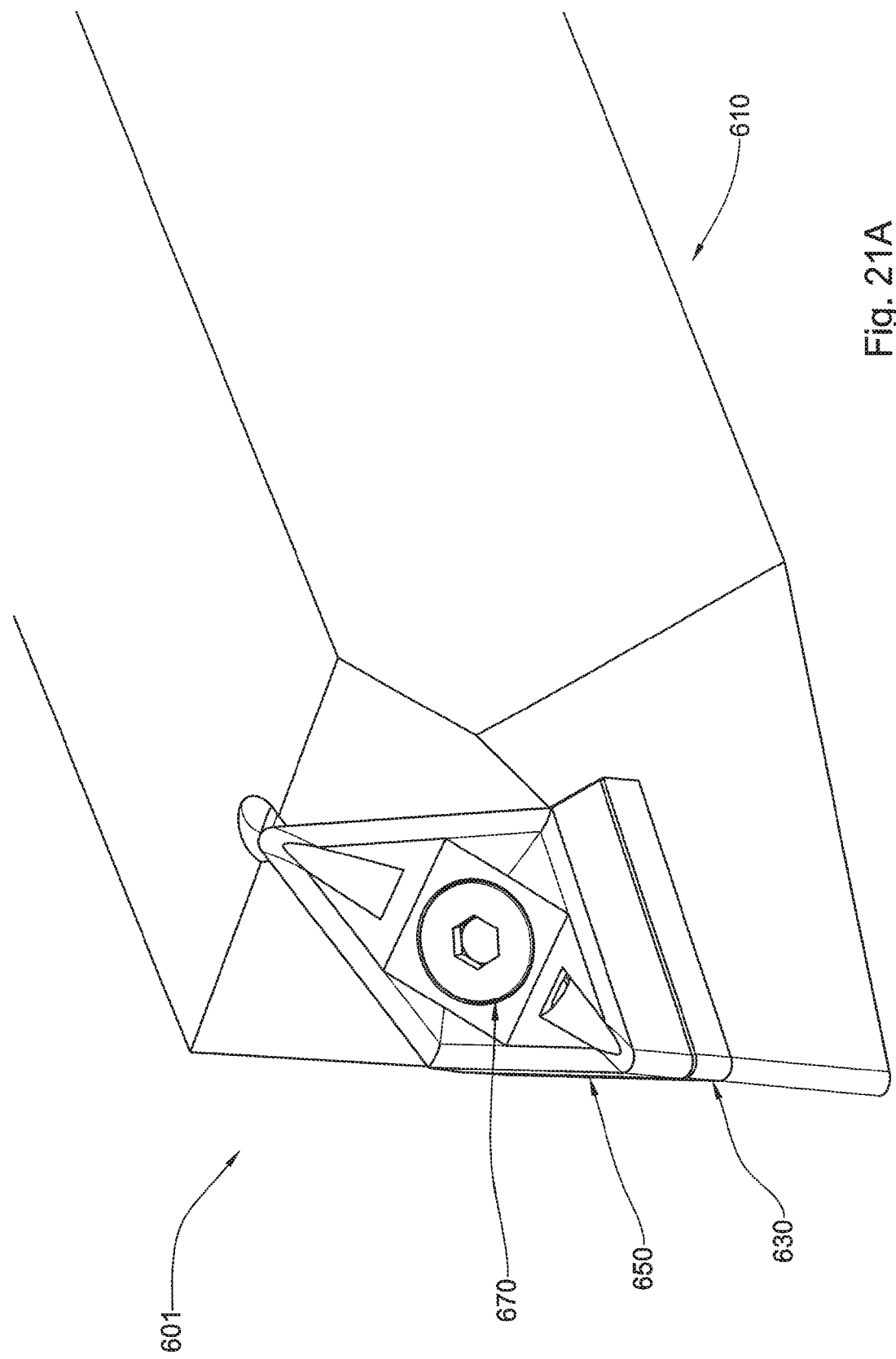
FIG. 21A is a schematic isometric view of a cutting tool according to still another example of the subject matter of the present application.
Figure 21C:
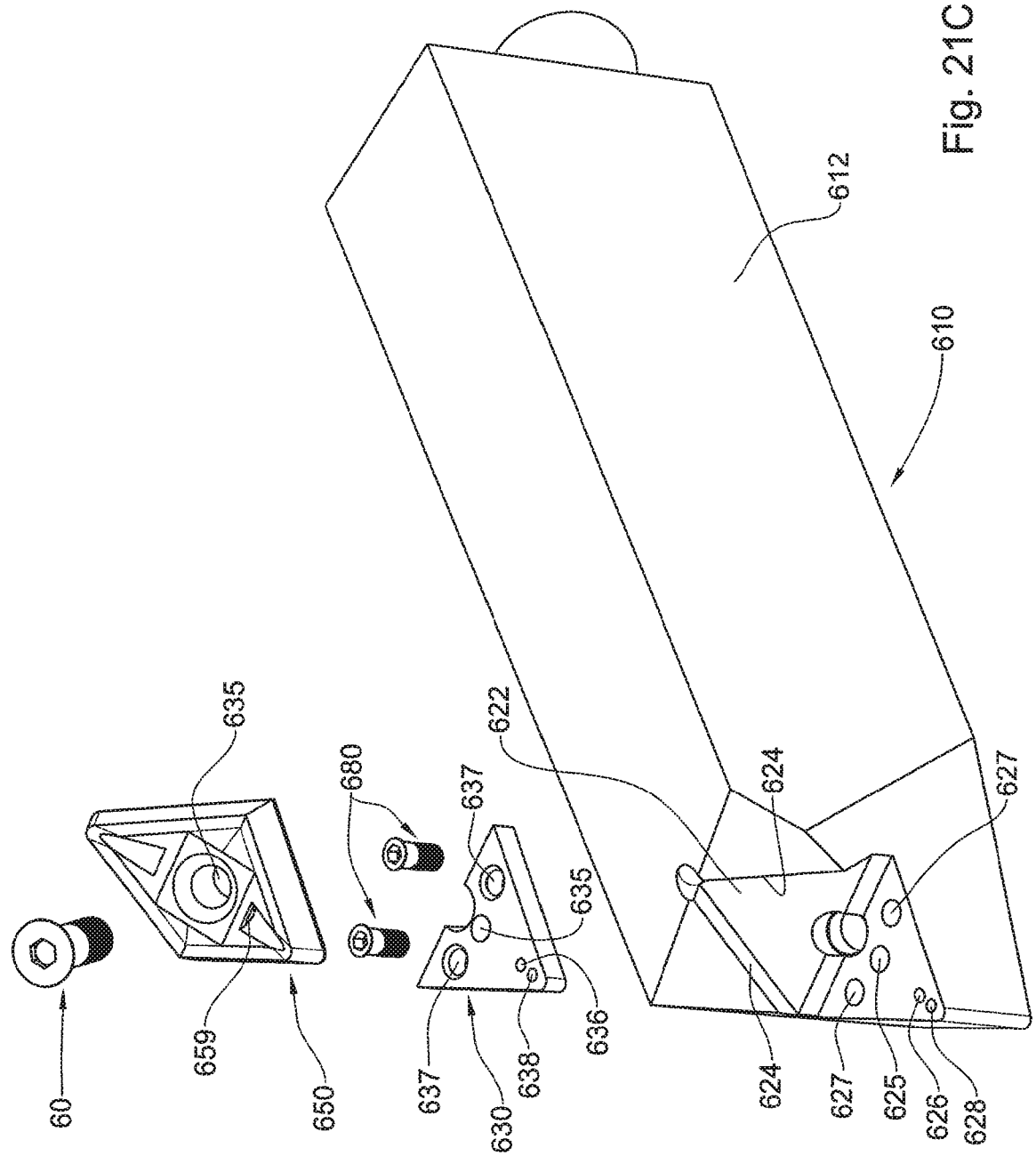
FIG. 21C is a schematic exploded isometric view of the cutting tool shown in FIG. 21A.

As illustrated in FIG. 20D, there is provided a method 570 for producing a cutting insert 450, for example as described above with reference to and illustrated in FIGS. 19A-18G, using a mold 501.

In a first step 571 of the method 570, a mold 501, for example as described above with reference to and illustrated in FIGS. 20A-20C, is provided.

In a second step 572 of the method 570, raw material is provided in the cavity 515 of the female mold portion 510 of the mold 501. The amount of raw material is suitable for forming one cutting insert 450, i.e., its volume after the molding process is equal to that of the cutting insert.

In a third step 573 of the method 570, the male mold portion 530 is inserted into the cavity 515, such that the first and second imprinting surfaces 517a, 517b face one another.

In a fourth step 574 of the method 570, the cutting insert 450 is formed, in the space of the cavity 515 between the first and second imprinting surfaces 517a, 517b, from the raw material.

It will be appreciated that during molding of the cutting insert 450, the first and second imprinting surfaces 517a, 517b are spaced from one another, which gives rise to the non-zero height of the circumscribing portion 462. Accordingly, molding the cutting insert 450 having a circumscribing portion 462 as described above with a non-zero height, allows the female and male mold portions 510, 530 to be pressed toward one another without contacting each other, which could result in damage thereto. Similarly, the shelf 459 further facilitates pressing the female and male mold portions 510, 530 toward one another without contacting one another.

The raw material provided in the second step 572 may be any suitable material, and the forming of the fourth step 574 may be by any process suitable to the raw material. According to some examples, the raw material is a sintering material, for example comprising a ceramic powder, and the forming comprises providing suitable pressure for sintering. According to other examples, the raw material comprises one or more metals, for example provided in liquid form, and the forming comprises allowing the raw material to solidify, e.g., by cooling.

Turning now to FIGS. 21A to 22D, there is provided another example of a cutting tool designated 601, and comprising a cutting insert 650 mounted on a tool holder 610. Similar to the previous example, the cutting insert 650 is formed with two opposite cutting edges 654, each comprising a cooling cavity angled to the top surface at 45°.

Similar elements have been designated with similar reference numbers, with the addition of 600 (i.e., cutting insert 650 uses a similar reference number as cutting insert 450, both having cutting edge 454, 654 etc.)

However, contrary to the previous example, the cutting insert 650 comprises two portions which are angled to one another at 135°, yielding that the cooling cavities 660 are generally parallel to one another.

This provides a very important advantage with respect to the pressing process. In particular, contrary to the previous example which required forming the cutting insert 450 at an orientation angled to the pressing axis, in this example, the cutting insert 650 can be formed symmetrically with the pressing axis as the projections forming the cooling cavities 660 extend generally along the pressing axis.

Figure 22B:
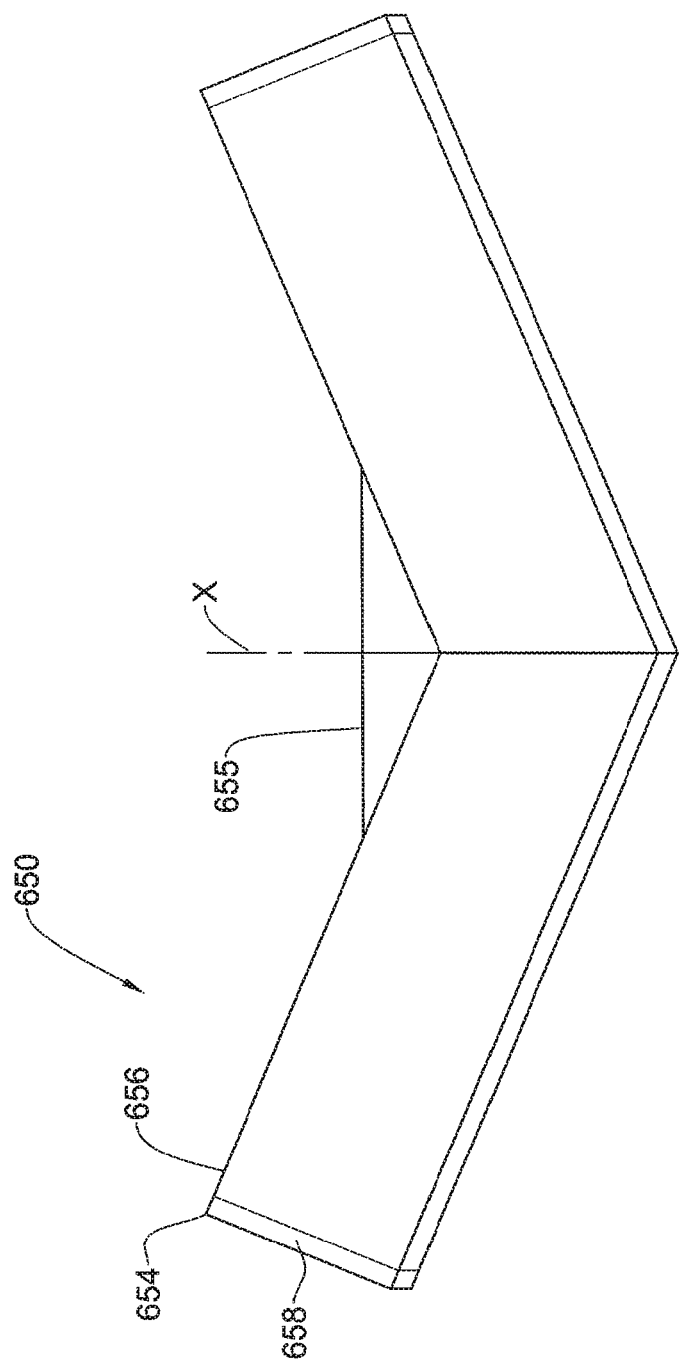
FIG. 22B is a schematic front view of a cutting insert used in the cutting tool shown in FIG. 21A.
Figure 22C:
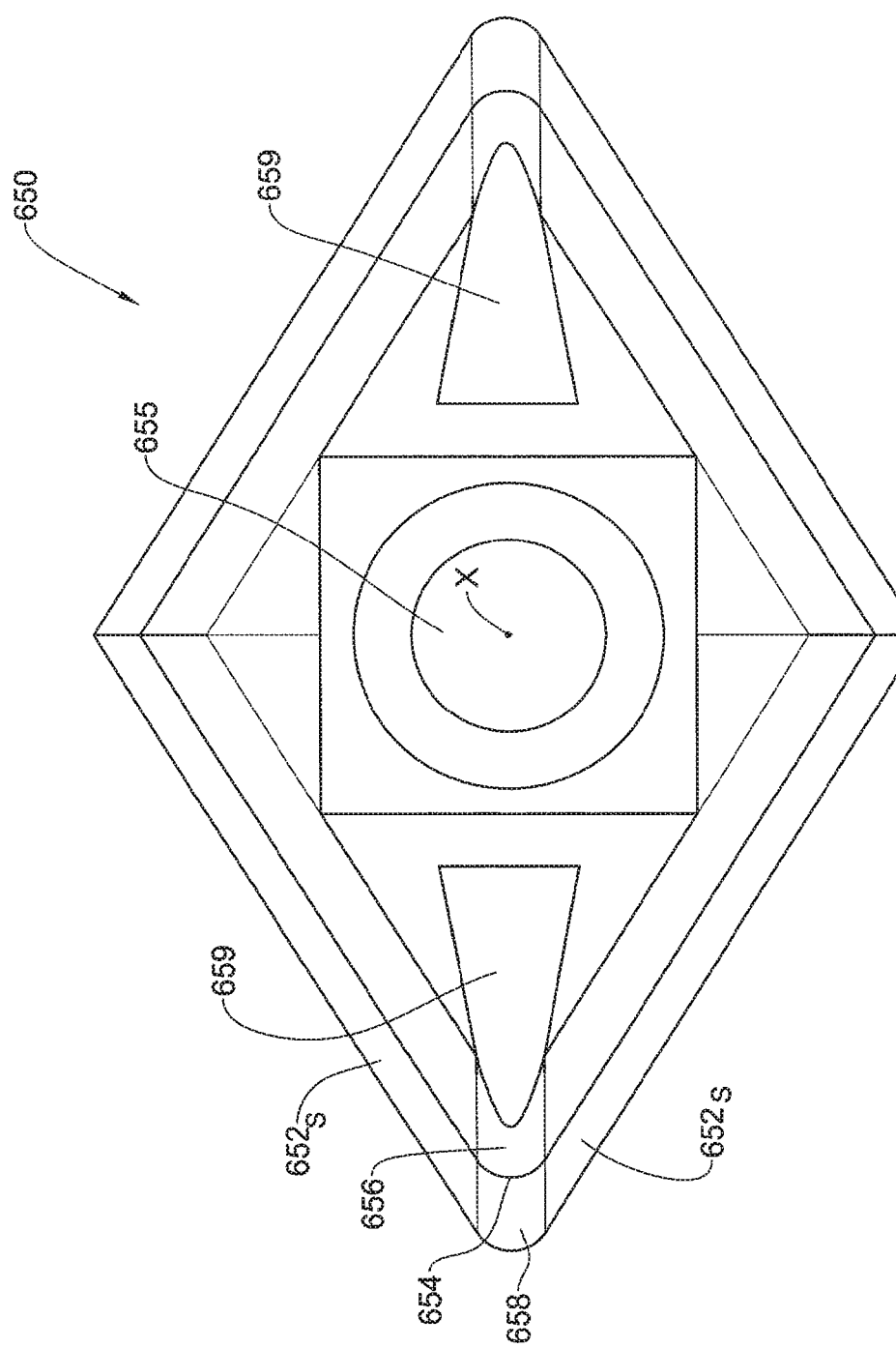
FIG. 22C is a schematic top view of a cutting insert used in the cutting tool shown in FIG. 21A.
Figure 22D:
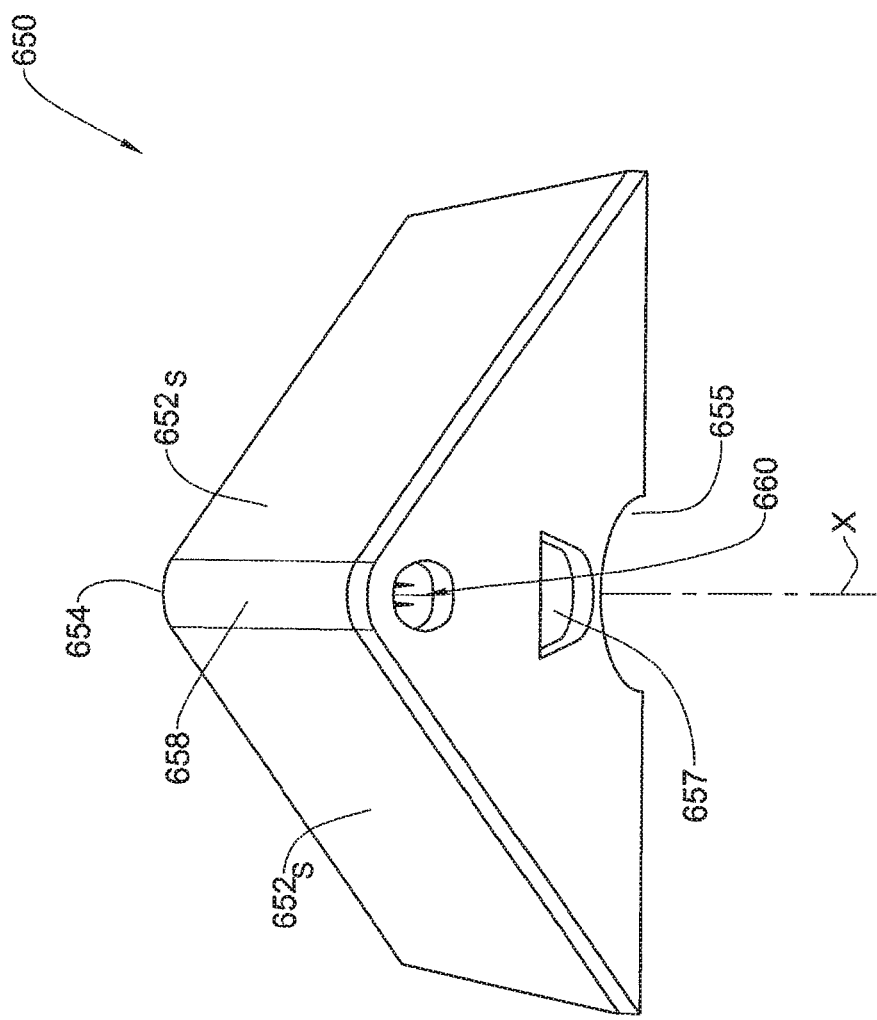
FIG. 22D is a schematic side view of a cutting insert used in the cutting tool shown in FIG. 21A.
Figure 24A:
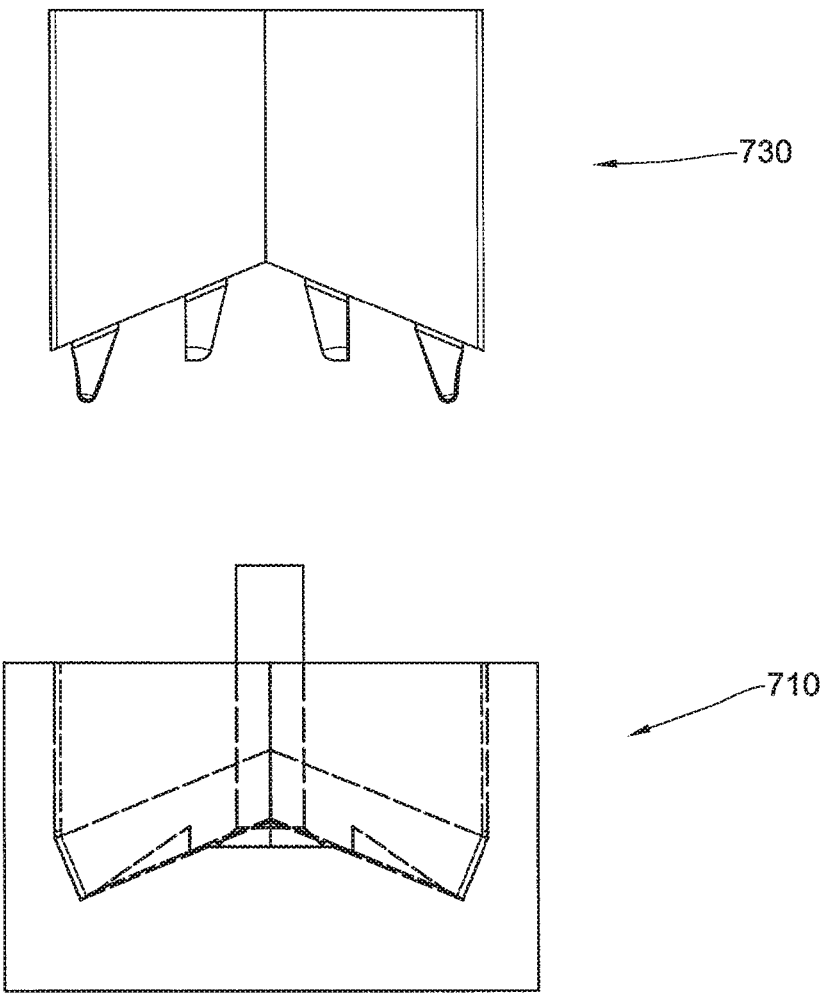
FIG. 24A is a schematic exploded isometric view of a mold for the manufacture of the cutting insert shown in FIGS. 22A-22D.

The above yields an angled configuration of the cutting insert itself 650, in this particular example, each portion of the cutting insert is of a triangular shape, the portions being angled to one another, as shown in FIG. 22B.

In addition, with particular reference being made to FIG. 23, it is noted that the cutting insert, when mounted onto the cutting tool holder 610, is supported by three different surface—a base surface provided by an intermediary plate 630 and two side surfaces 624 of the cutting tool holder 610. It is noted that the bottom surface of the other portion of the cutting insert 650, does not come into contact with a base surface of the holder 610, as shown by the gap E.

Reverting back to FIGS. 22A to 22D, the cutting insert 650 is shown to have an additional flow outlet 657 at the top surface of the cutting insert, and is provided with a flow channel 659 configured for directing the flow of the cooling fluid towards the cutting edge 654. It is also noted that the outlet 657 is located below the top surface $652_T$ of the cutting insert 650.

The flow channel 659 merges with the chip breaking channel 656 of the cutting insert 650, allowing fluid flow to reach very close to the cutting edge 654 and, at the same time, lift chips removed from the workpiece during a cutting operation.

Attention is now drawn to FIGS. 25A to 27, in which another example of a cutting tool is shown, generally designated 601', which is generally similar to the previously described cutting tool 601. Similar elements have been designated with similar reference numbers, with the addition of a prime (i.e., cutting insert 650 uses a similar reference number as cutting insert 650', both having cutting edge 654, 654' etc.).

Figure 25C:
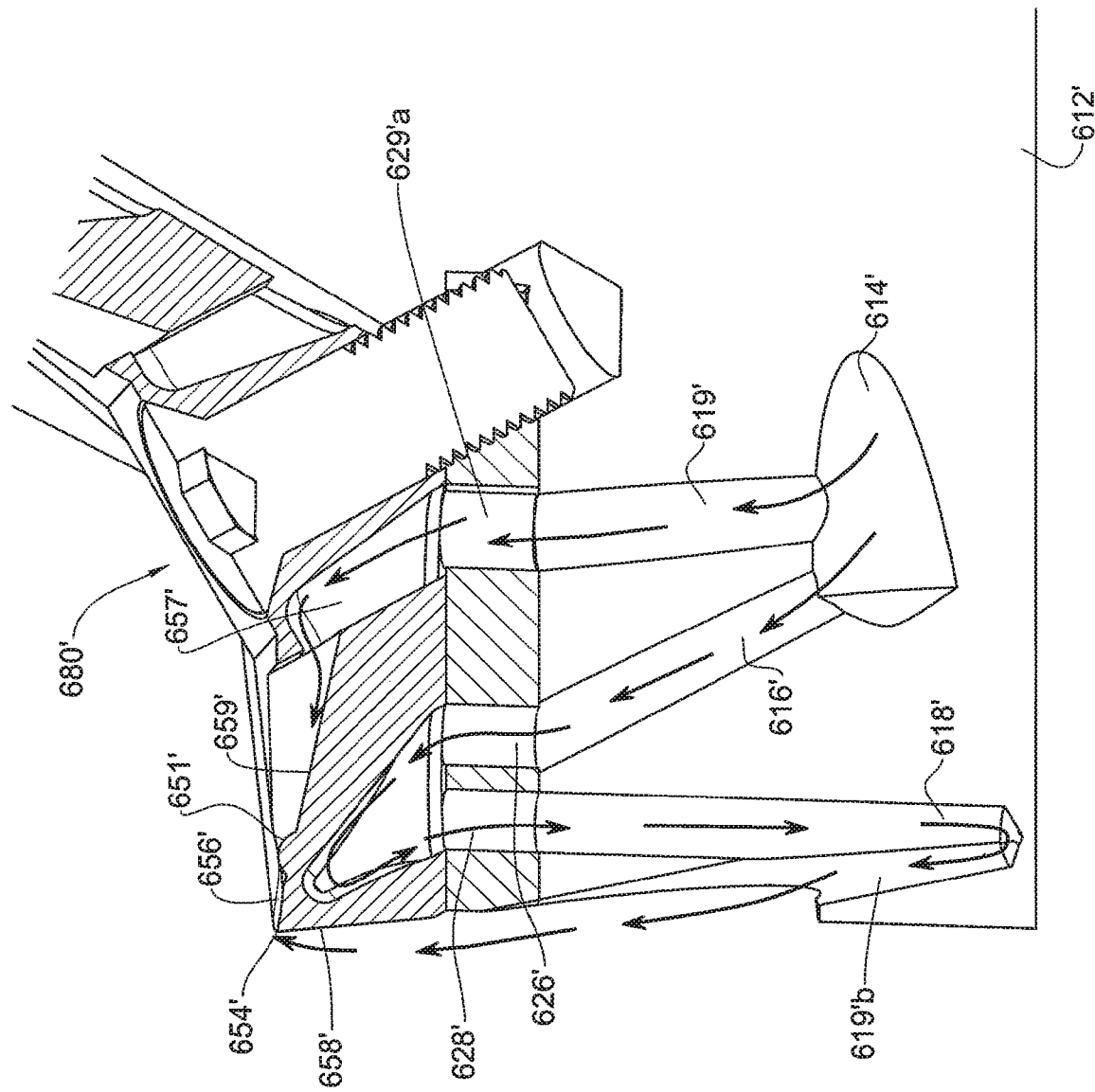
FIG. 25C is a schematic isometric longitudinal section view of the cutting tool shown in FIG. 25A, demonstrating the flow of cooling fluid.
Figure 25D:
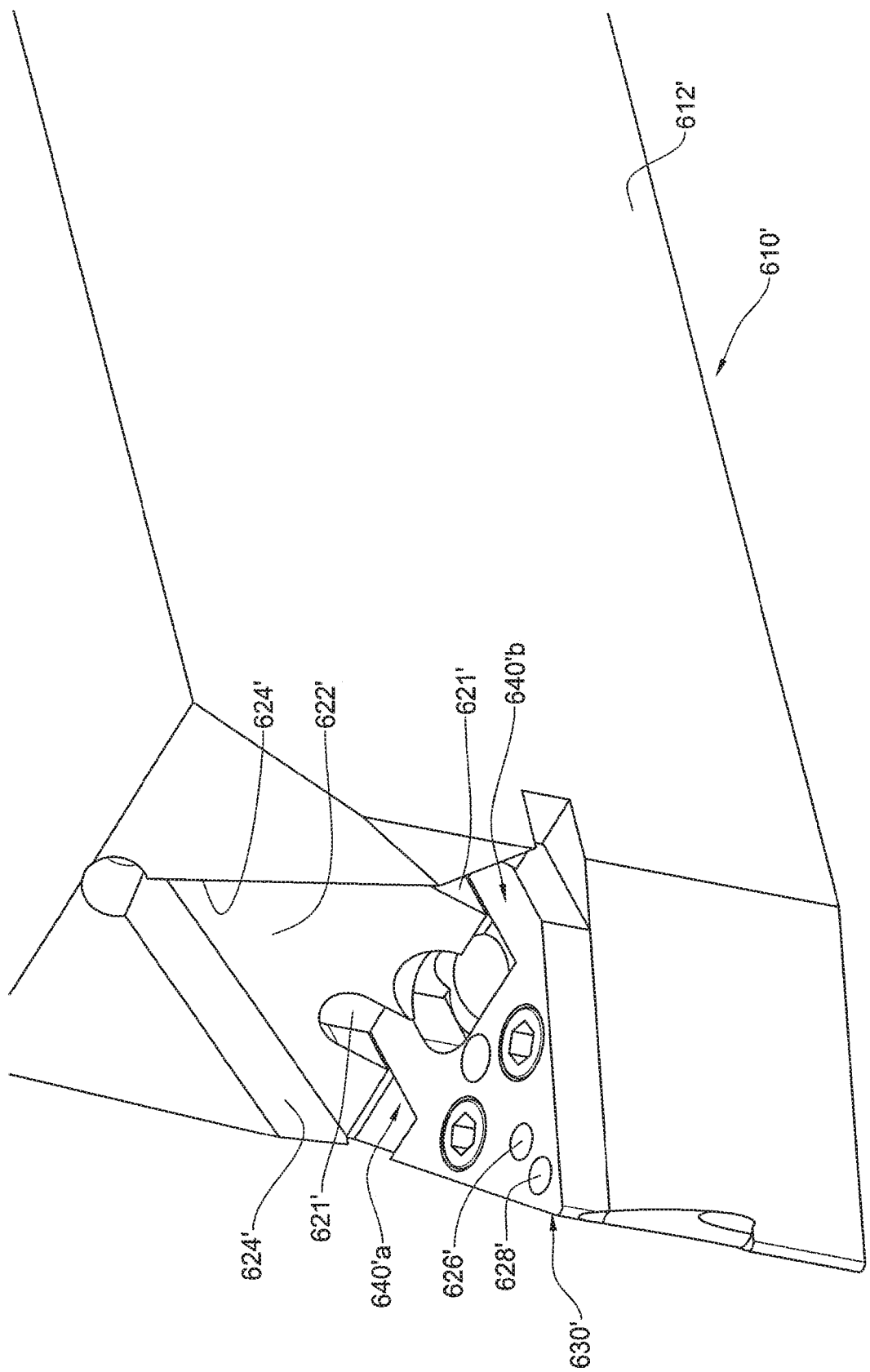
FIG. 25D is a schematic isometric view of the cutting tool shown in FIG. 25A, with a cutting insert thereof being removed.
Figure 26A:
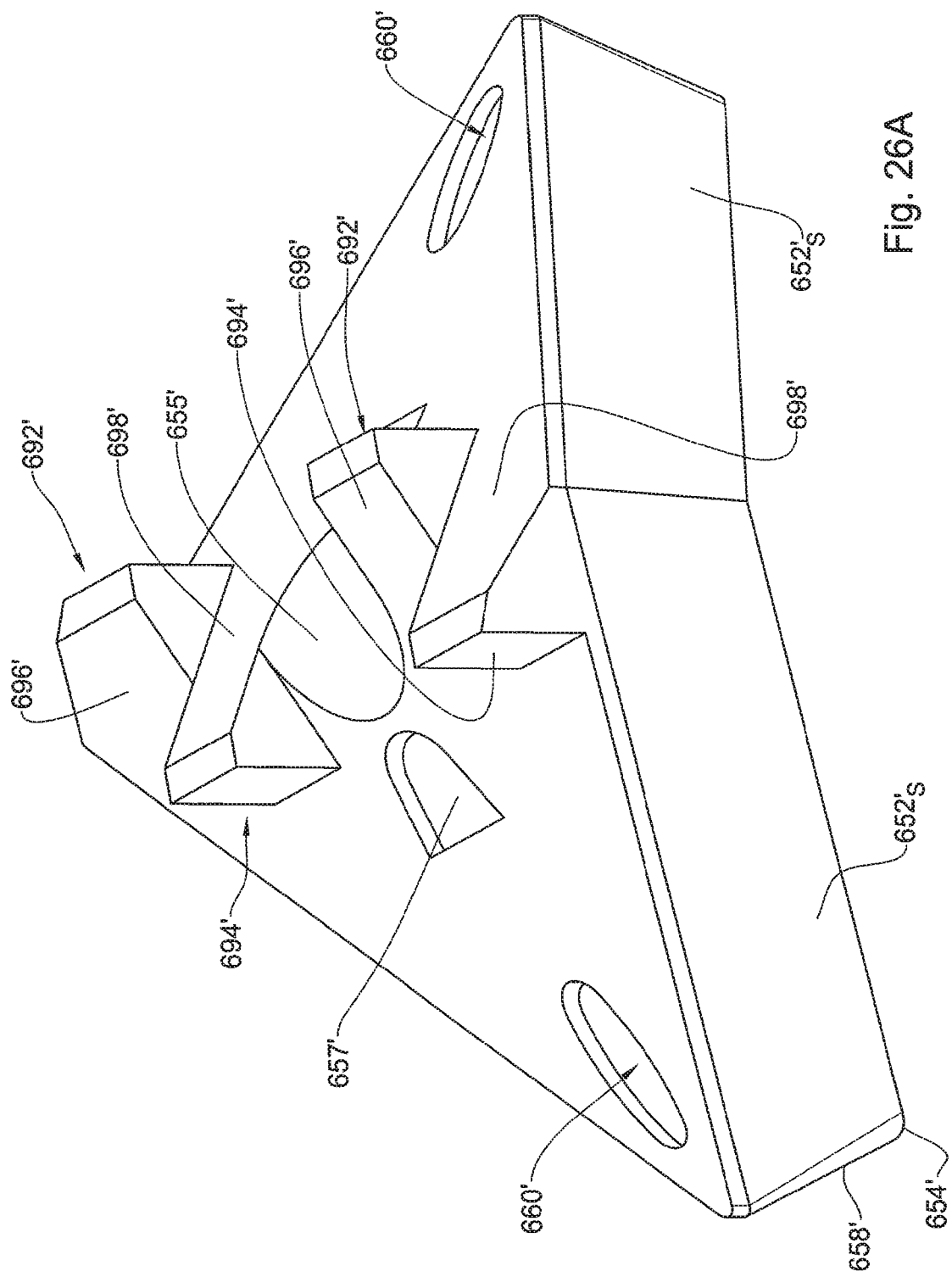
FIG. 26A is a schematic bottom view of a cutting insert used in the cutting tool shown in FIG. 25A.
Figure 26B:
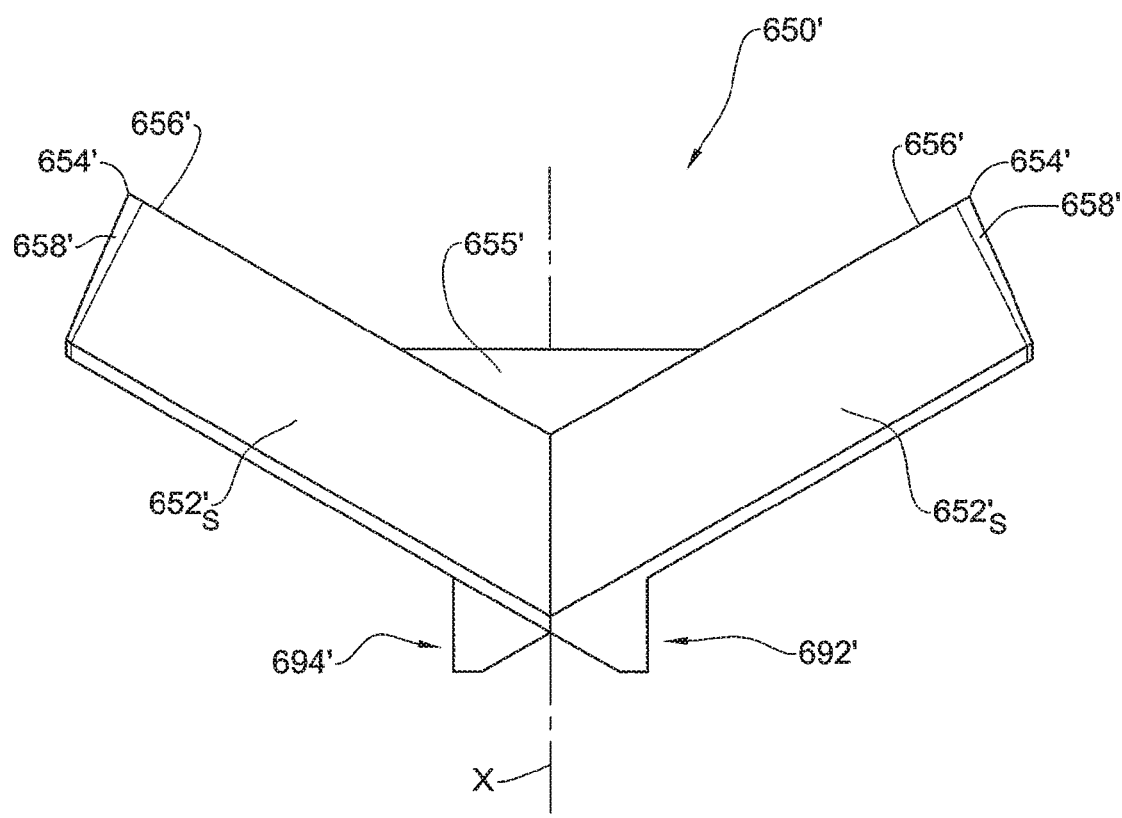
FIG. 26B is a schematic side view of a cutting insert used in the cutting tool shown in FIG. 25A.
Figure 27:
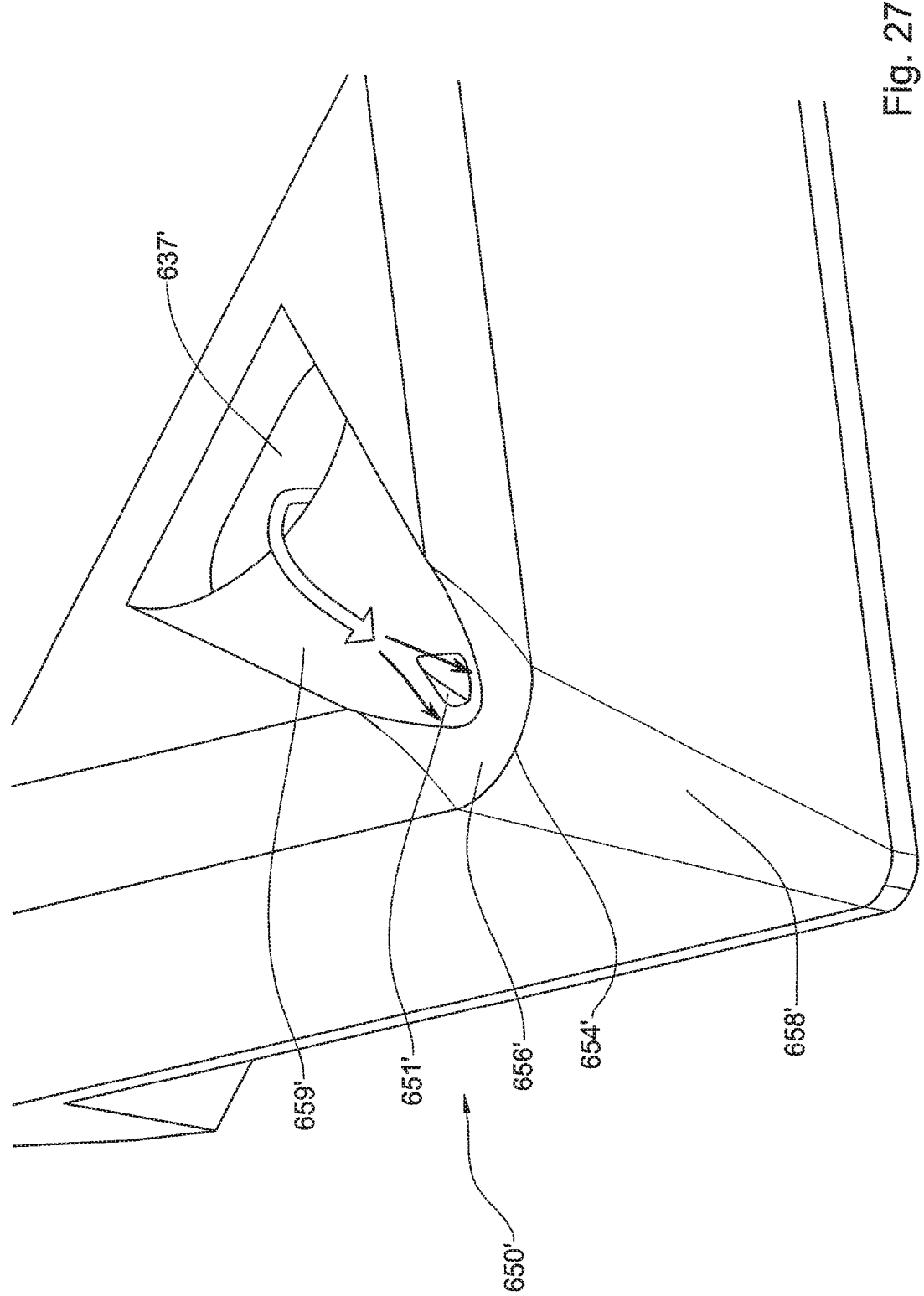
FIG. 27 is a schematic enlarged view of the cutting insert shown in FIG. 26A, with a cutting insert thereof being removed, demonstrating the flow of cooling fluid.

The main differences between the cutting tool 601' and 601 are as follows:

First of all, the holder 610' is designed with an additional flow channel 618' and 619' (FIG. 25C) which is configured for recycling cooling fluid used previously for cooling the cutting edge 654' back to the holder so that it is ejected therefrom to impinge on the relief surface of the cutting insert 650' as shown in FIG. 25C.

Secondly, the flow channel 659' is provided with a blocker 651' which is configured for preventing chips removed from the workpiece by the cutting edge 654' from flowing towards the outlet 657' and blocking it. On the other hand, the blocker 651' has a stream-line design configured for minimally obstructing cooling fluid emitted from the outlet 657' towards the cutting edge 654' (see FIG. 27).

Contrary to the previously described example 601, the cutting insert 650' further comprises supports 690 in the form of triangular projections 692' and 694', configured for being received with the holder 610'. The arrangement of the supports 692', 694' is such that allows the cutting insert 650' more surface contact with the holder 610' (compared to the example 601).

Since the bottom surface of the other portion of the cutting insert (the one that, at a given moment, does not perform a cutting operation) is not mated against a base surface of the holder 610', the supports 692', 694' allow preventing a see-saw motion of the cutting insert which could lead to disengagement between the bottom surface $652_B'$ of the operational cutting portion and the plate 630'.

Figure 28:
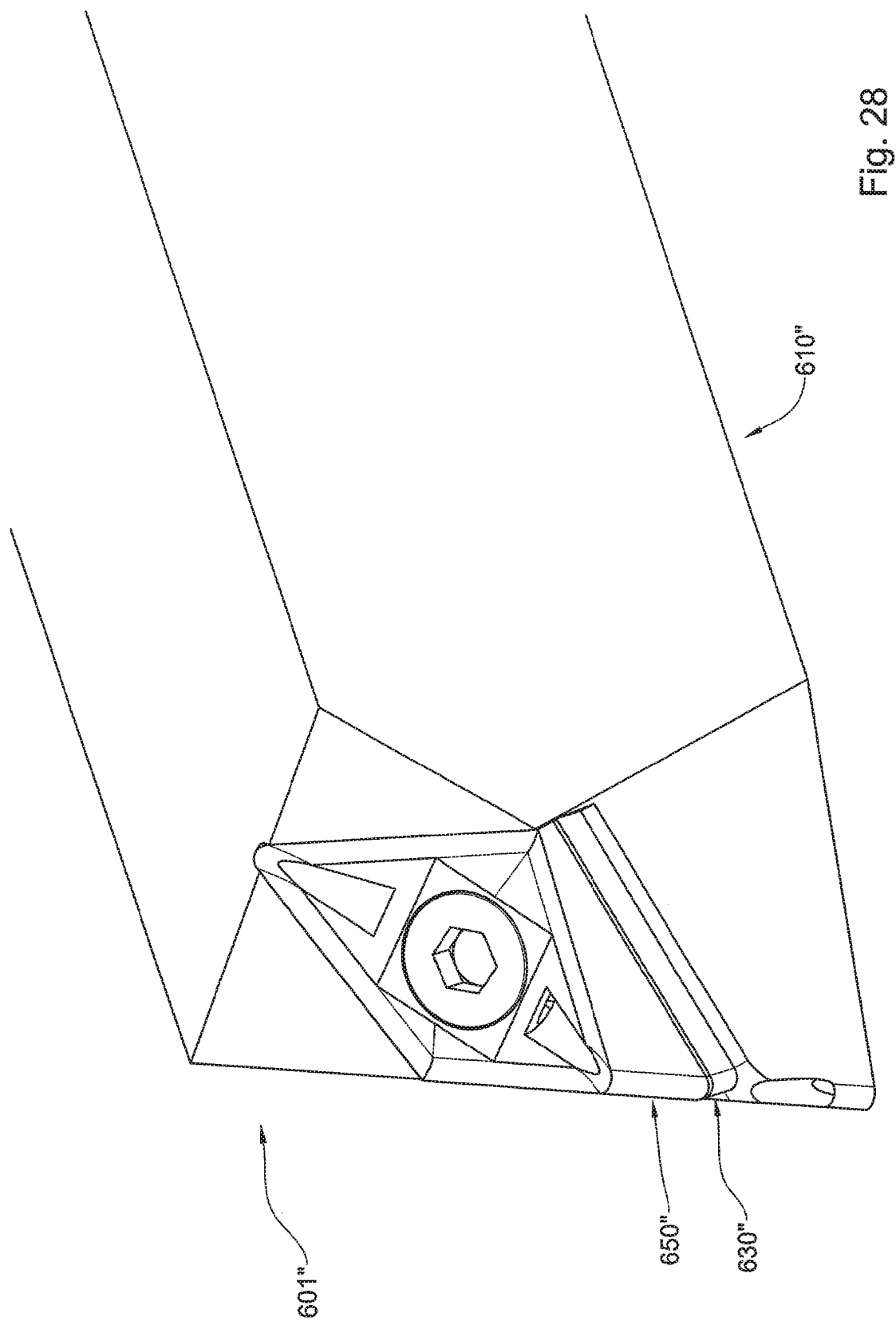
FIG. 28 is a schematic isometric view of a cutting tool according to still another example of the subject matter of the present application.
Figure 29A:
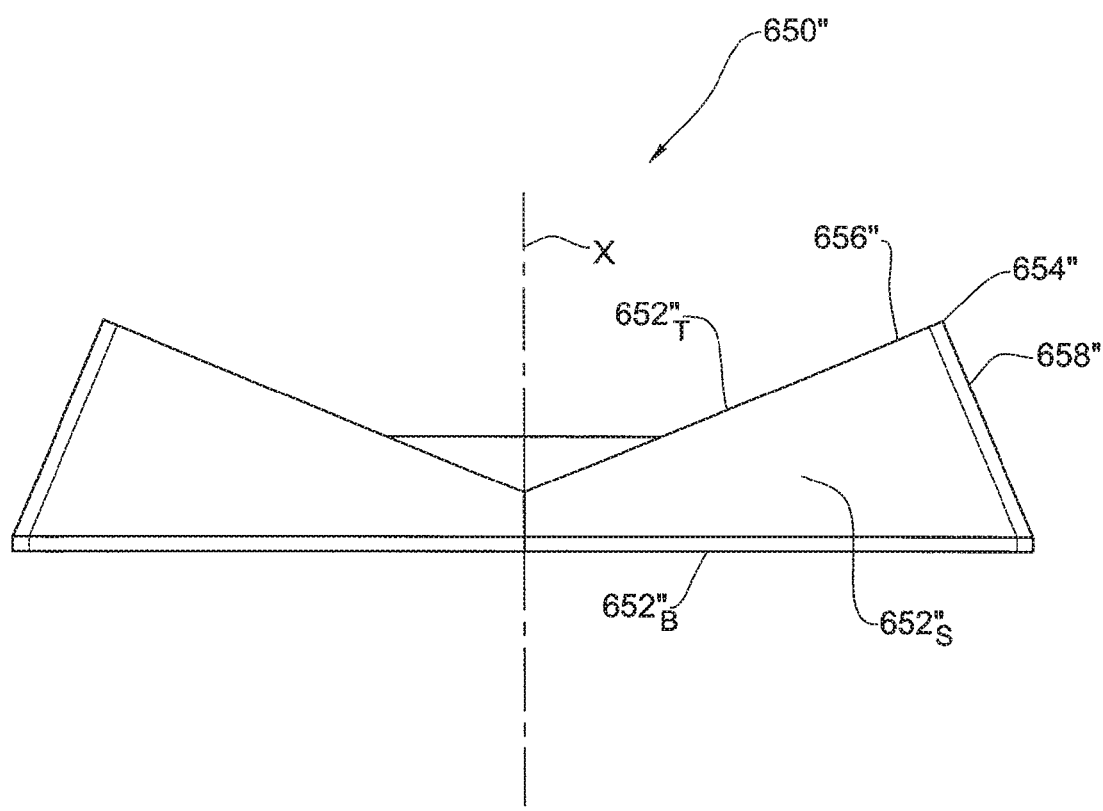
FIG. 29A is a schematic side view of a cutting insert used in the cutting tool shown in FIG. 28.
Figure 29B:
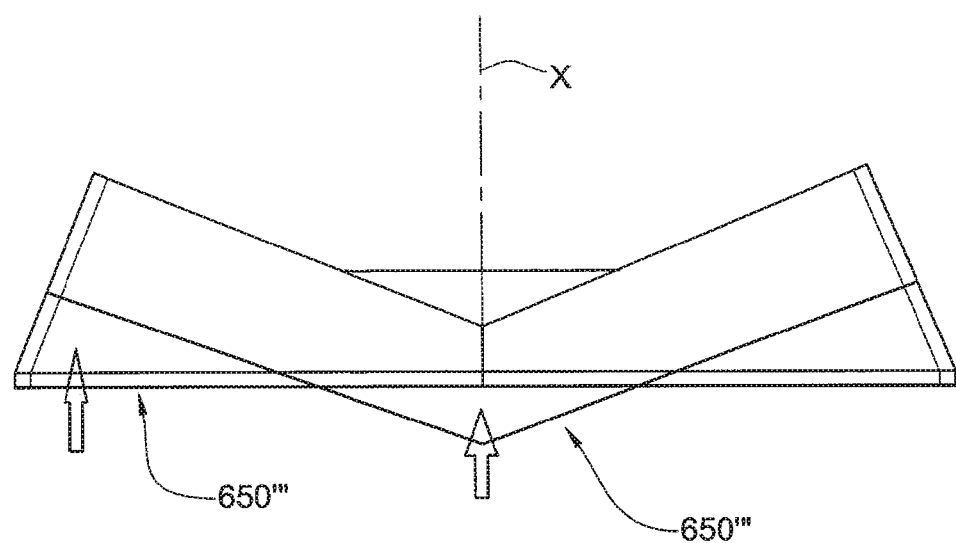
FIG. 29B is a schematic side view of a cutting insert, demonstrating the differences between the cutting insert shown in FIGS. 26B and 29A.
Figure 30A:
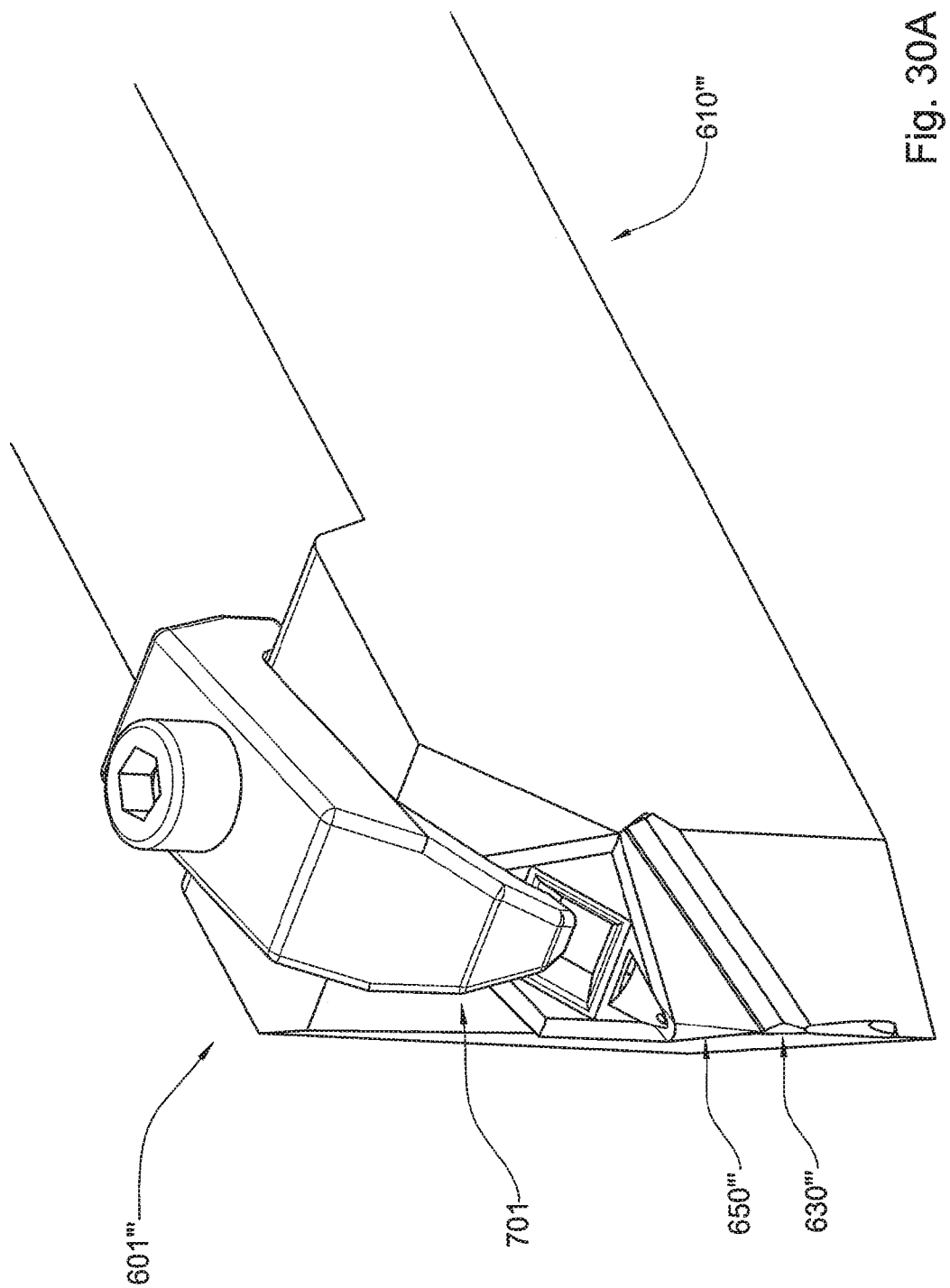
FIG. 30A is a schematic isometric view of a cutting tool according to still another example of the subject matter of the present application.
Figure 31A:
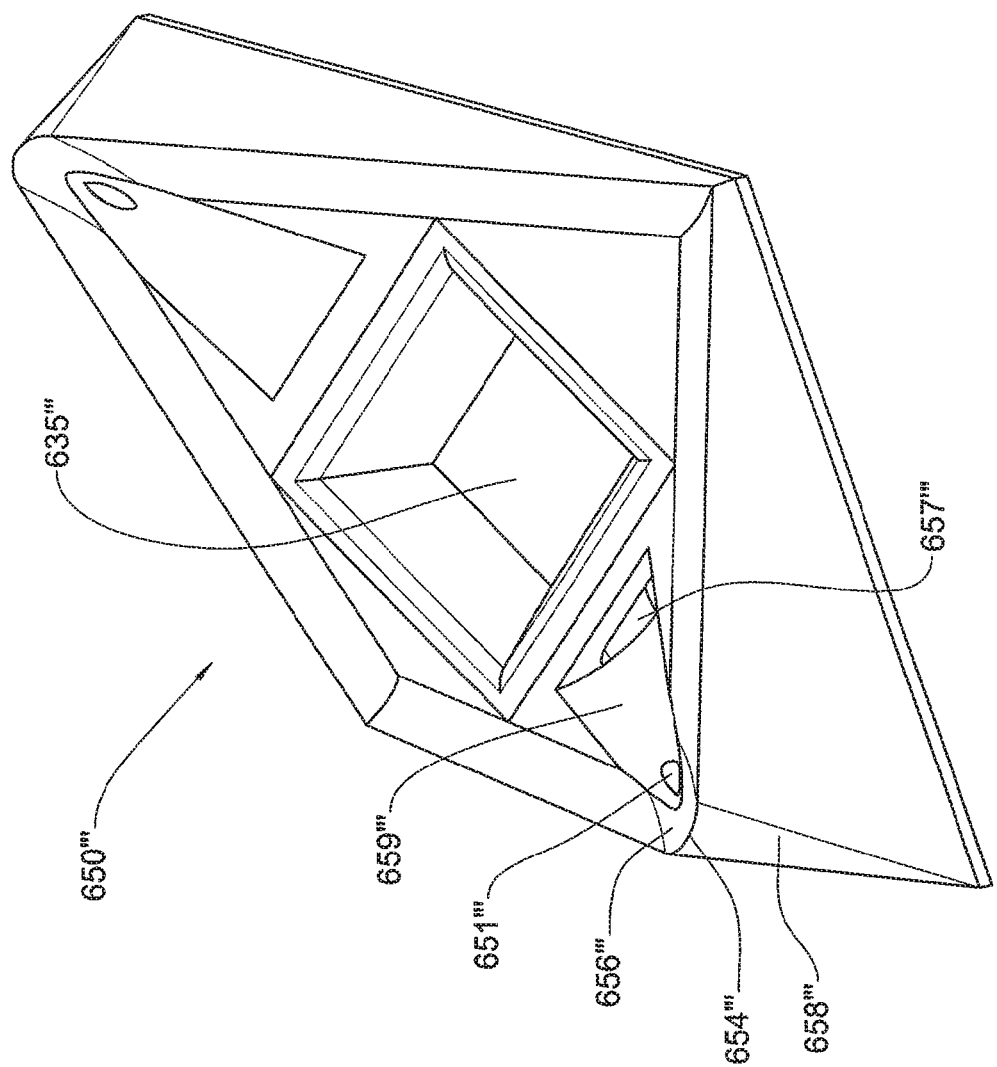
FIG. 31A is a schematic isometric view of a cutting insert used in the cutting tool shown in FIG. 30A.
Figure 31B:
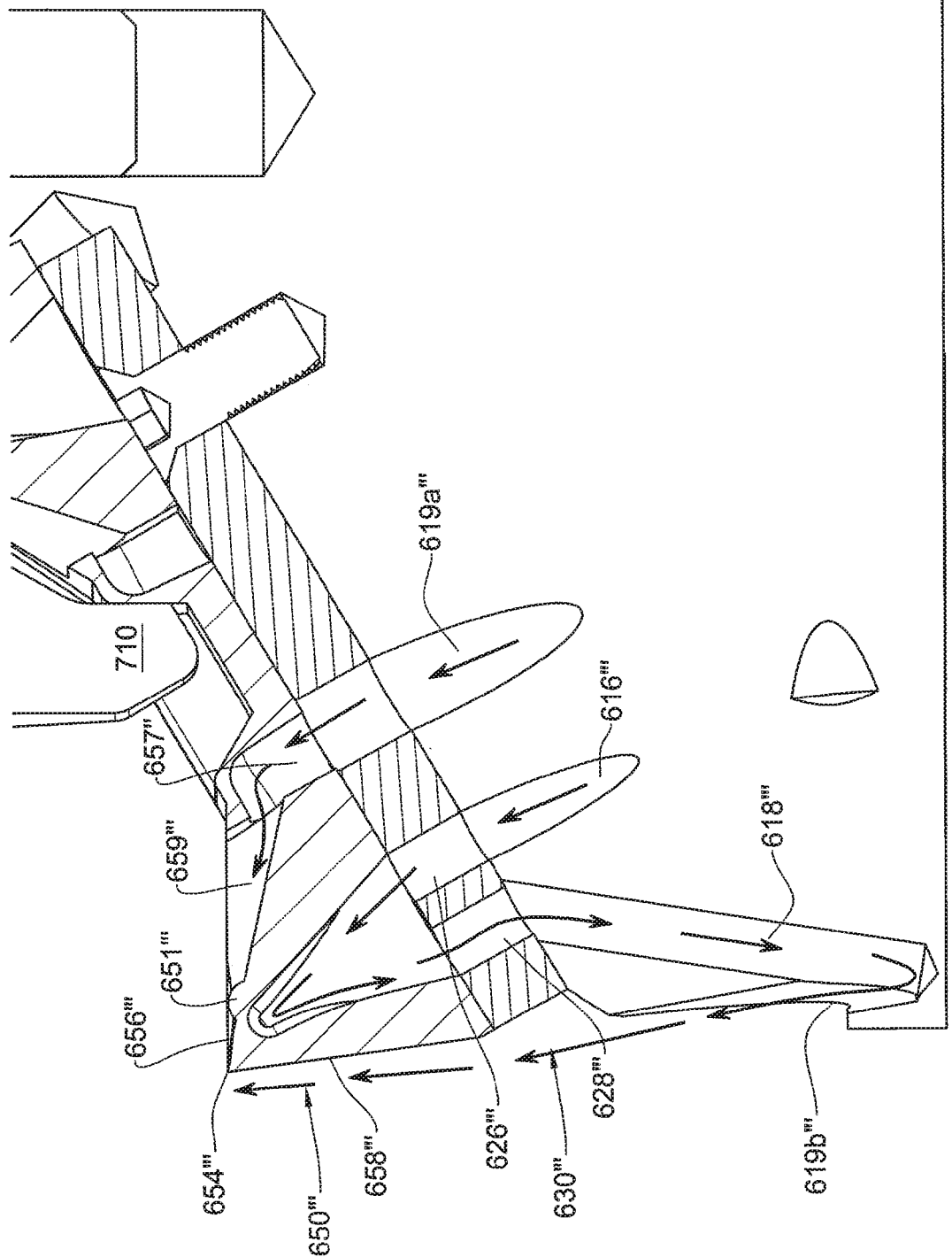
FIG. 31B is a schematic isometric section view of the cutting tool shown in FIG. 30A, demonstrating the flow of cooling fluid.
Figure 31C:
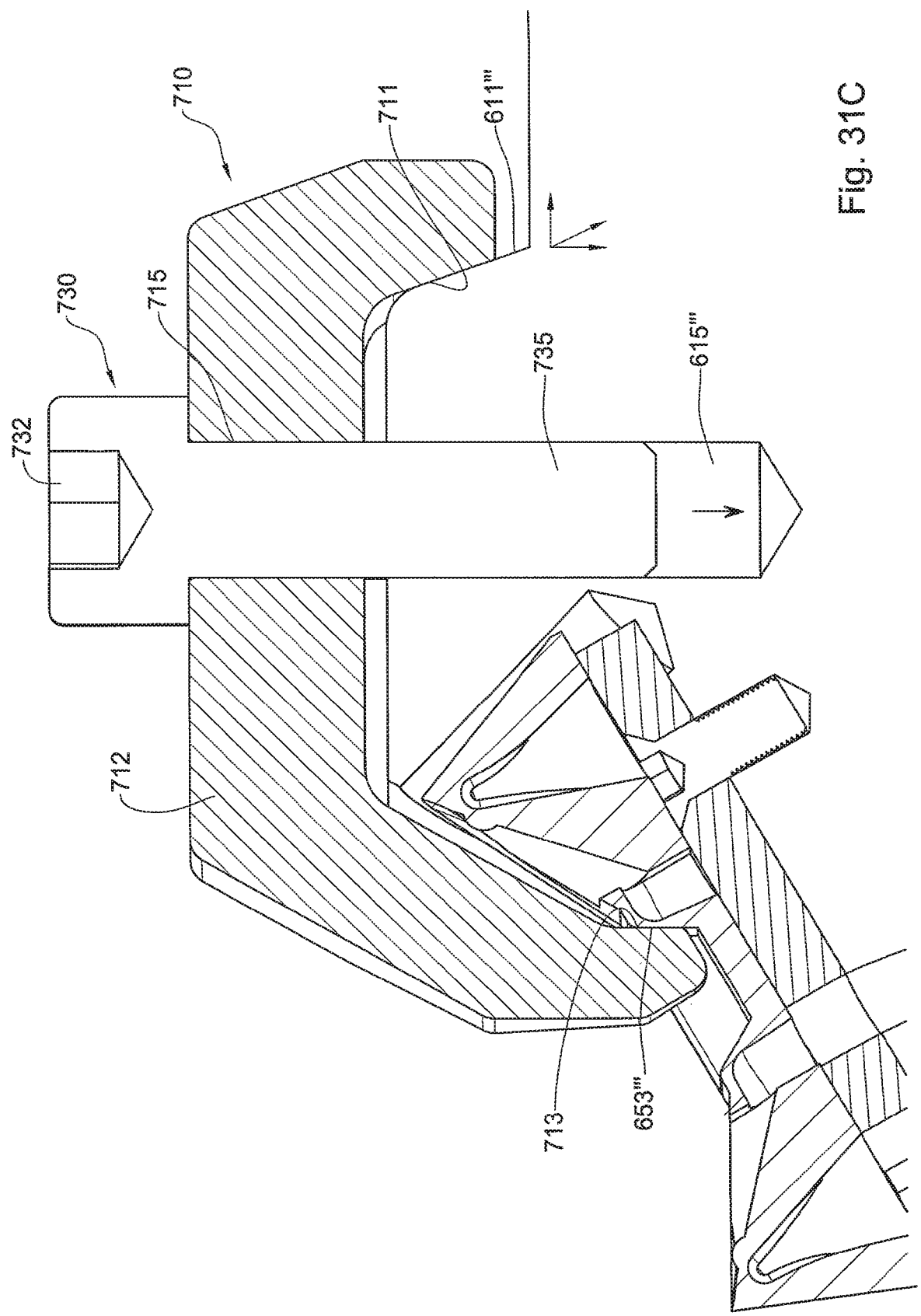
FIG. 31C is a schematic section view of the cutting tool shown in FIG. 30A, demonstrating the cutting insert's fastening mechanism.

Attention is now drawn to FIGS. 28 to 29B, in which yet another example of a cutting tool is shown, generally designated 601". Similar elements have been designated with similar reference numbers, with the addition of a double prime (i.e., cutting insert 650 uses a similar reference number as cutting insert 650", both having cutting edge 654, 654" etc.).

The main difference between the cutting insert 650" and the previously described cutting insert 650' lies in the design of the bottom surface of the cutting insert, 652$_B$". Whereas the previous cutting insert 650' was shown to have a see-saw configuration, the cutting insert 650" has a flat bottom surface 652$_B$".

With particular reference being made to FIG. 29B, it is noted that when comparing the geometry of the cutting insert 650' and 650", the material removed from the tip of the see-saw of cutting insert 650', is compensated by addition of material at the sides in cutting insert 650".

Attention is now drawn to FIGS. 30A to 31C, in which still another example of a cutting tool is shown, generally designated 610'". Similar elements have been designated with similar reference numbers, with the addition of a triple prime (i.e., cutting insert 650 uses a similar reference number as cutting insert 650", both having cutting edge 654, 654'" etc.).

The main difference between the cutting tool 601'" and the cutting tool 601" lies in the fastening mechanism used to secure the cutting insert 650'" to the tool holder 610'". In particular, a clamping mechanism 700 is used, which operates in conjunction with a recess 635'" of the cutting insert 650'", contrary to an insert bore as described with respect to the previous examples.

Figure 33A:
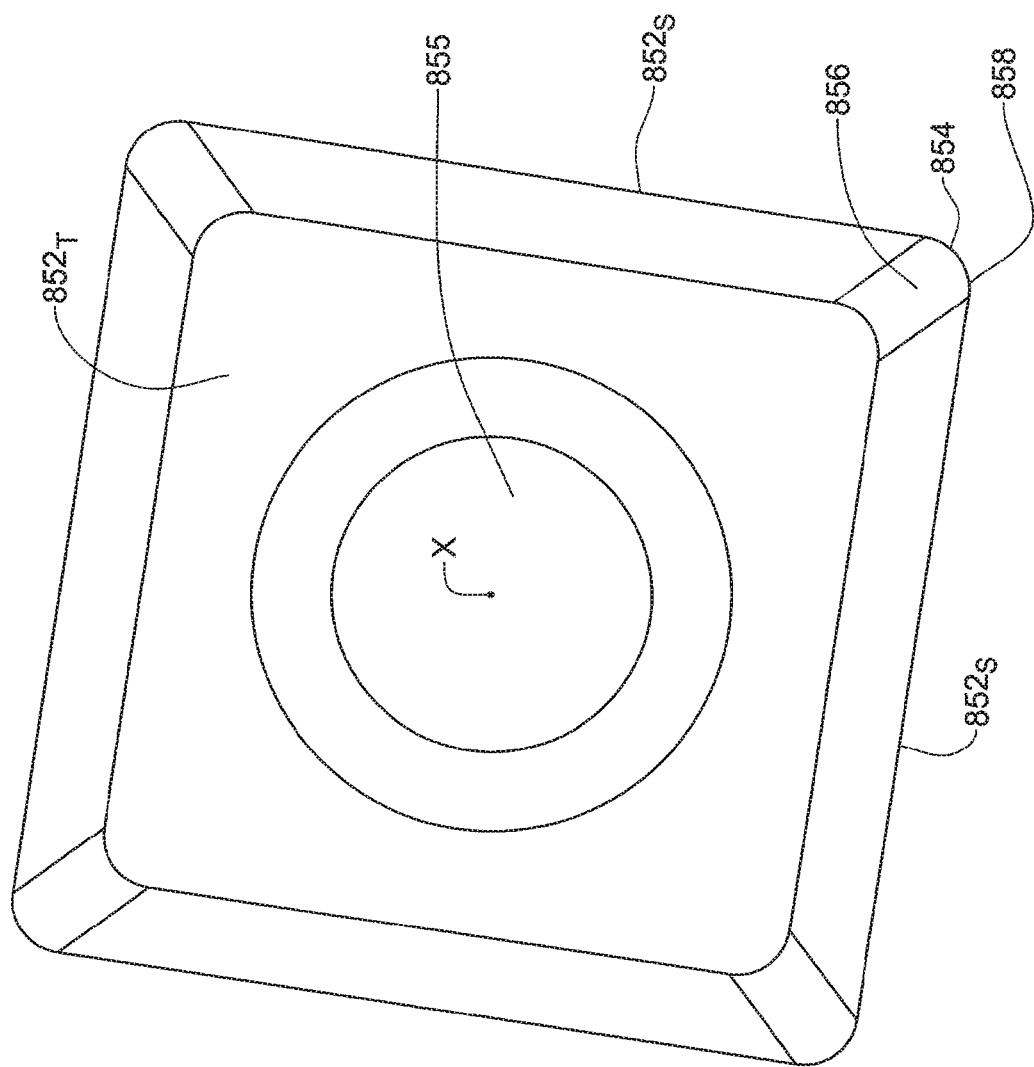
FIG. 33A is a schematic top view of a cutting insert used in the cutting tool shown in FIG. 32.
Figure 33B:
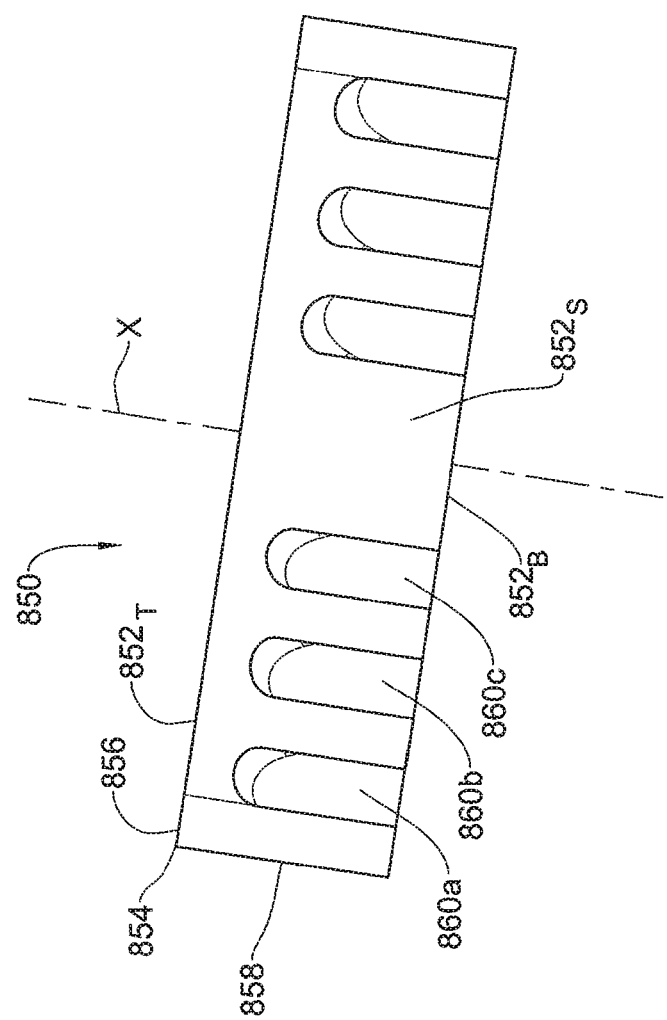
FIG. 33B is a schematic side view of a cutting insert used in the cutting tool shown in FIG. 32.
Figure 33C:
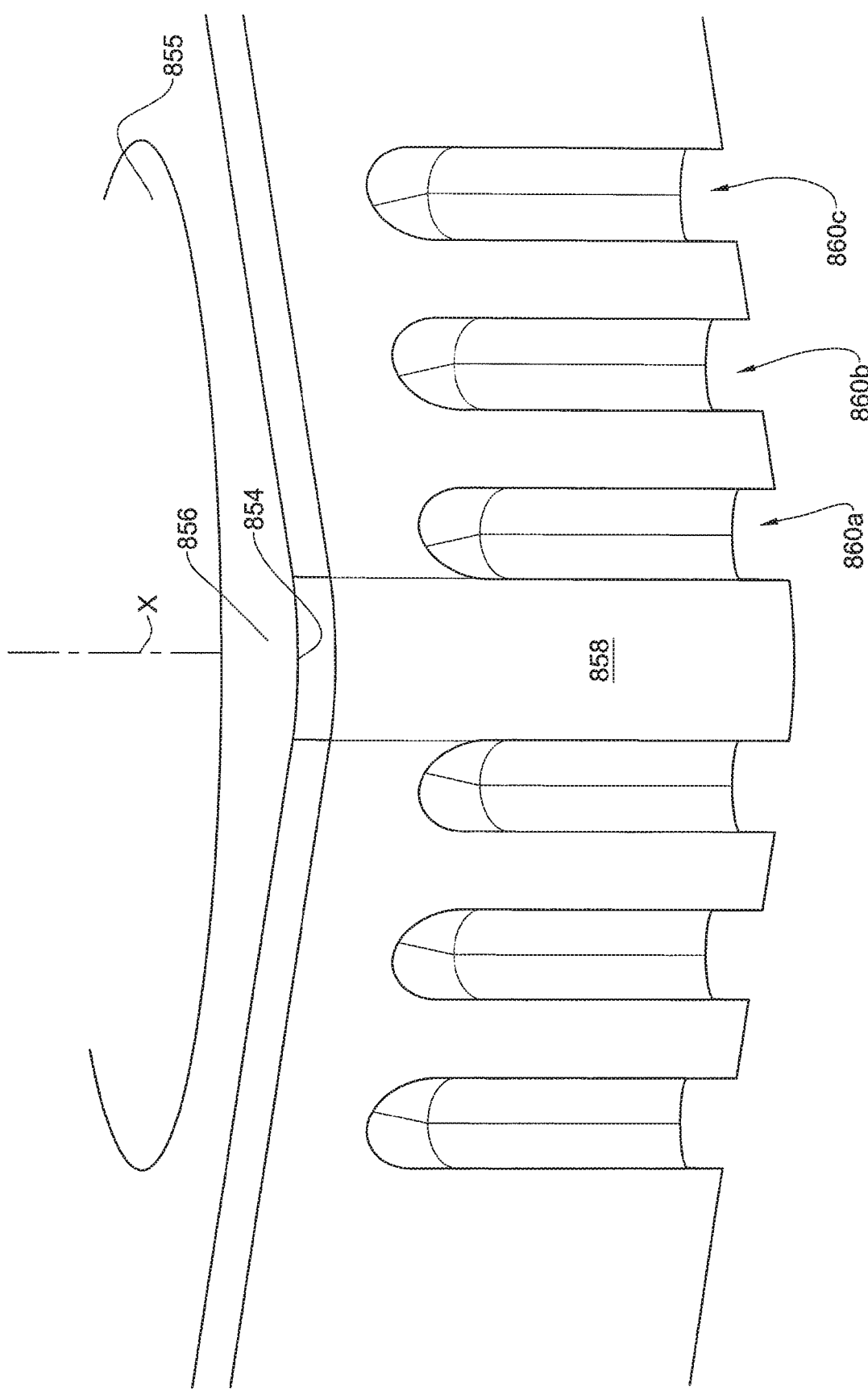
FIG. 33C is a schematic isometric enlarged view of a cutting insert used in the cutting tool shown in FIG. 32.

Turning now to FIGS. 32 to 33C, another example of a cutting tool is shown, generally designated 801, and comprising a cutting insert 850 mounted onto a cutting tool holder 810.

Similar elements have been designated with similar reference numbers, with the addition of 800 (i.e., cutting insert 850 uses a similar reference number as cutting insert 650, both having cutting edge 654, 854 etc.).

The cutting insert 850 is formed with openings along the circumference thereof configured for allowing cooling fluid to flow therein and reach the entire length of the cutting edge 854 of the cutting insert 850.

Cooling fluid is provided through the cutting tool holder 810 and intermediate plate 830, and emitted from outlets O (see FIG. 32). The cooling fluid emitted therefrom spreads along the hollow bottom of cutting insert 850 and is later emitted therefrom through the arcuate openings 860a, 860b, 860c.

It is noted that the wall of the openings are arranged so as to face the cutting corner of the cutting insert 850 (rather than being perpendicular to the side surfaces 852$_S$ of the cutting insert 850).

Turning now to FIGS. 34A to 36E, a milling tool is shown, generally designated 901 and comprising a cutting tool holder 910 and a plurality of cutting, or milling, inserts 950. The cutting inserts 950 are similar to cutting inserts 650" previously described, i.e., having a see-saw configuration (see FIG. 36E).

Figure 34B:
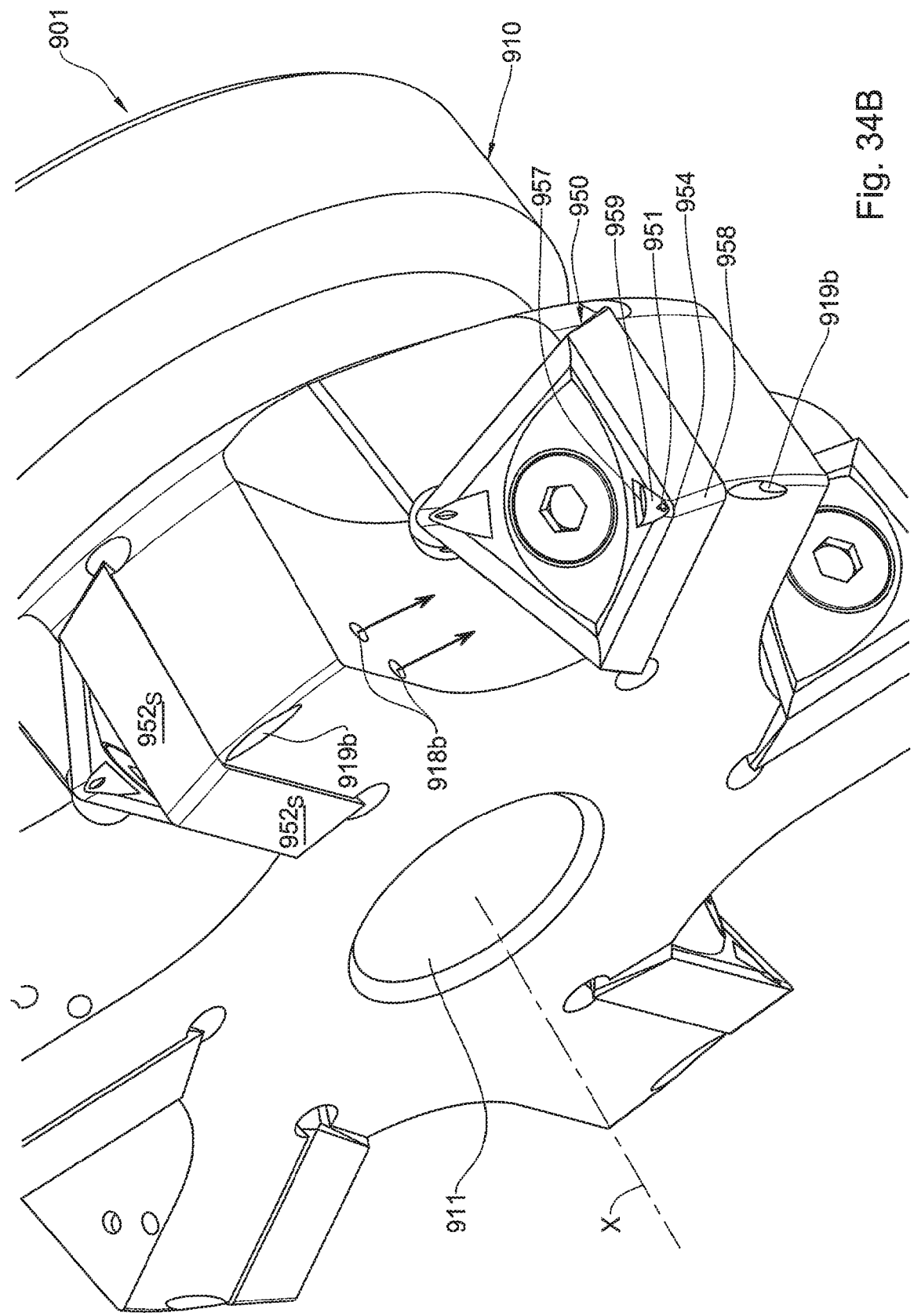
FIG. 34B is a schematic enlarged view of the milling tool shown in FIG. 34A.
Figure 35A:
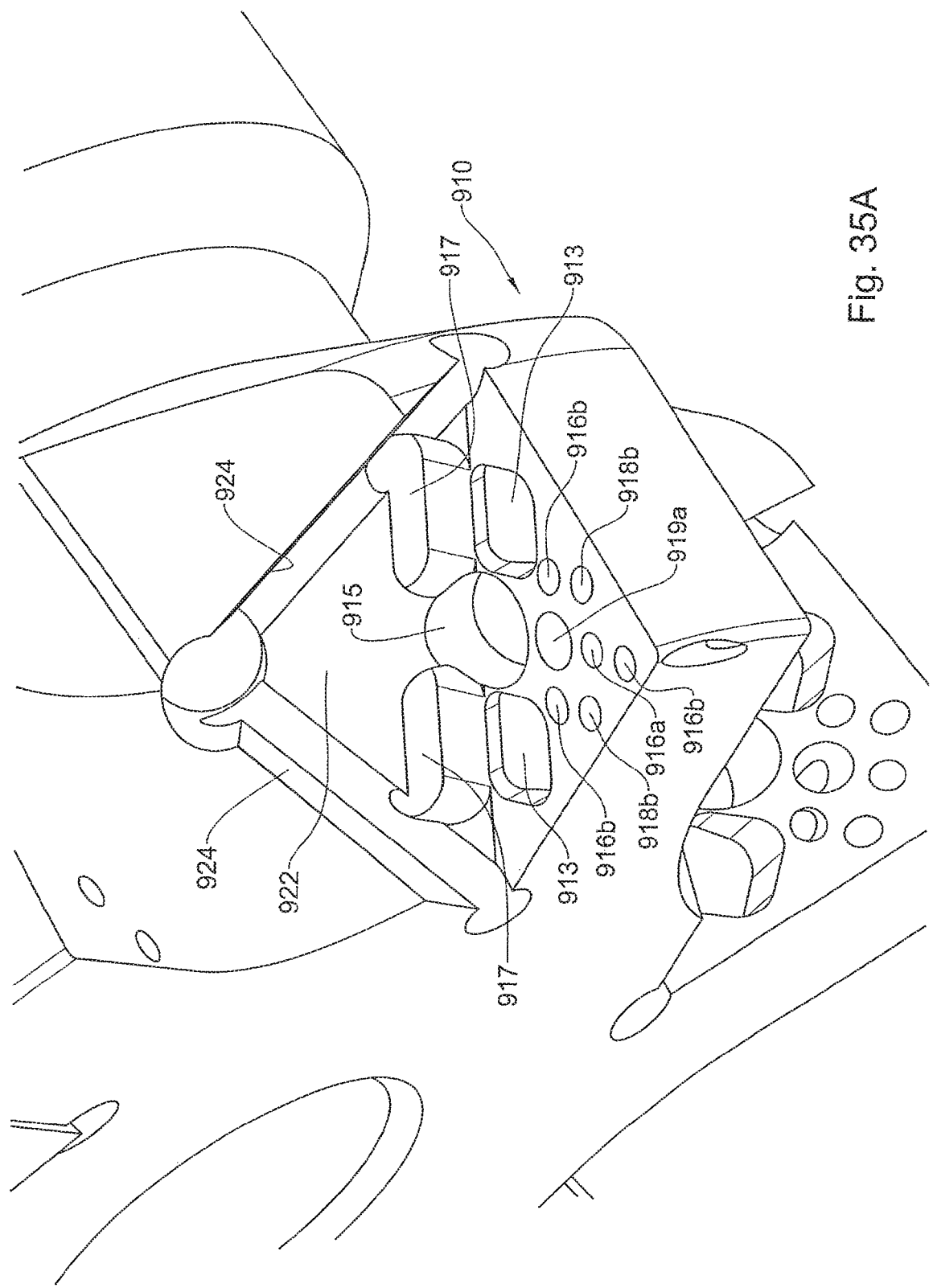
FIG. 35A is a schematic enlarged view of an insert seat space of the milling tool shown in FIG. 34A.
Figure 36A:
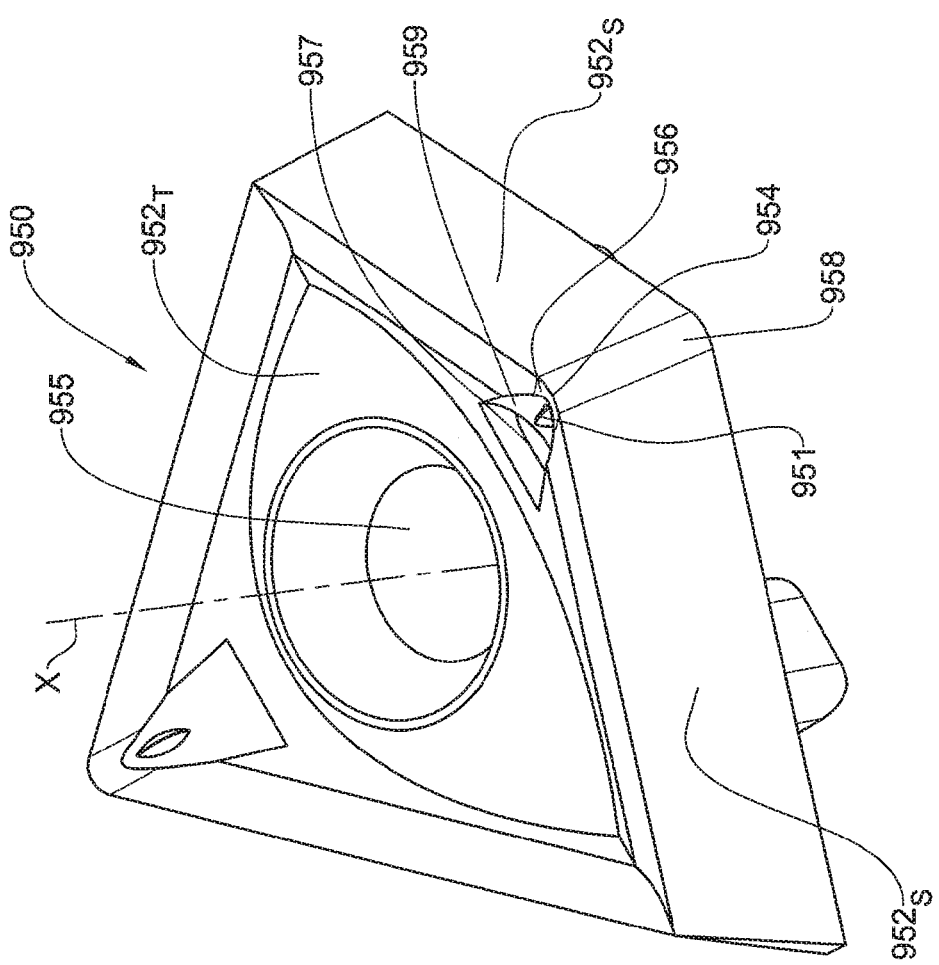
FIG. 36A is a schematic isometric view of a milling insert used in the milling tool shown in FIG. 34A.
Figure 36B:
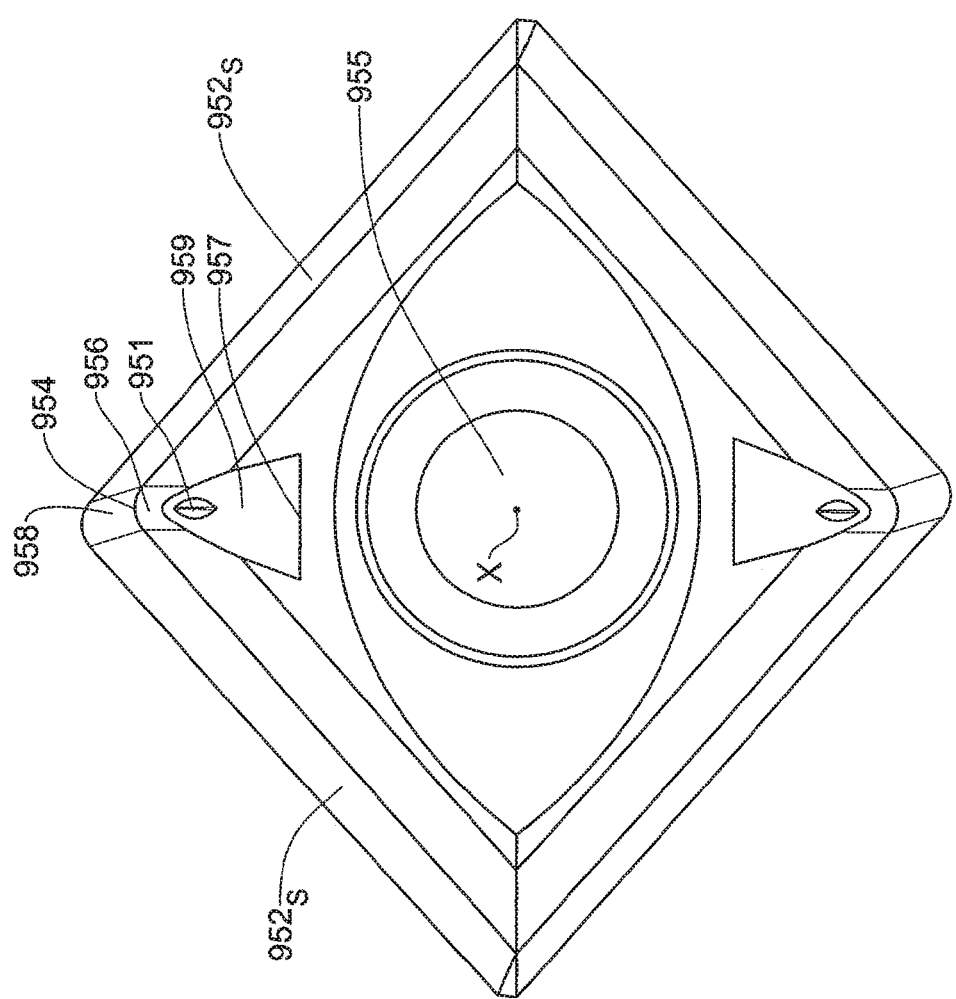
FIG. 36B is a schematic top view of the milling insert shown in FIG. 36A.
Figure 36C:
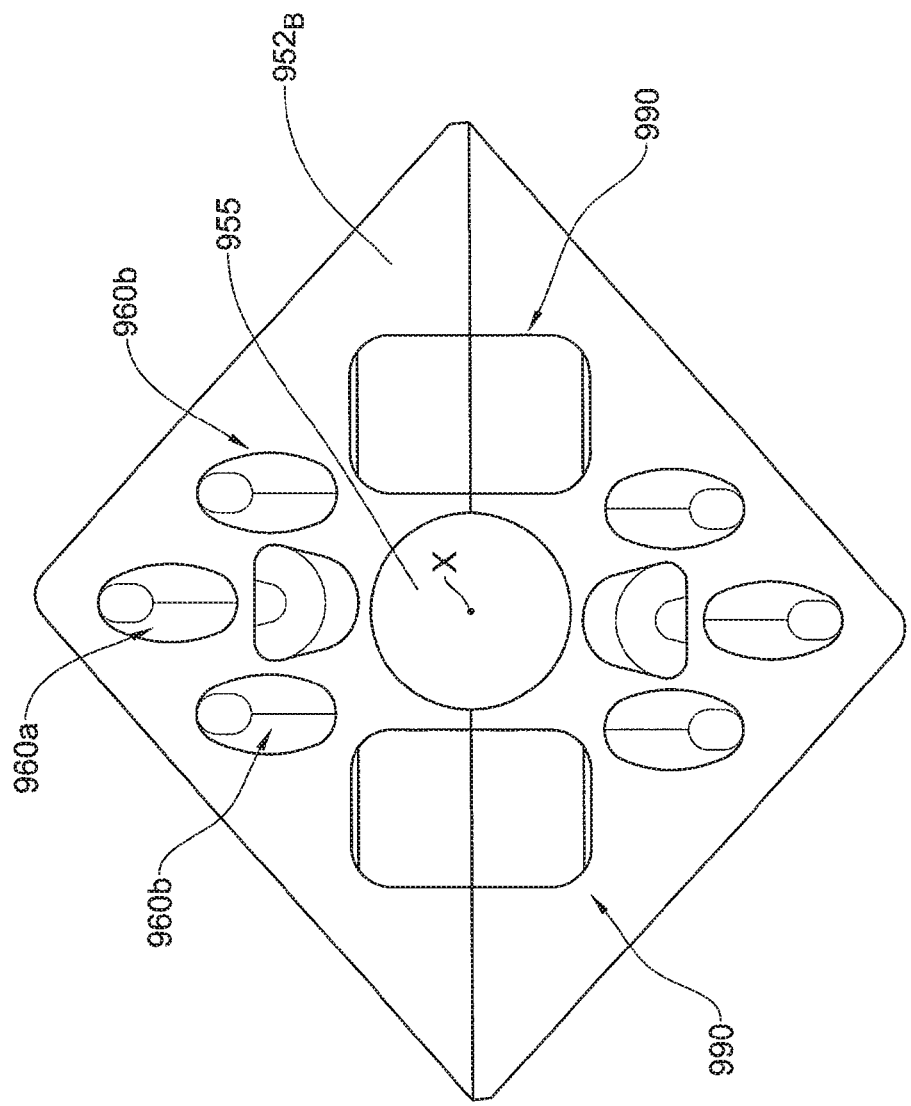
FIG. 36C is a schematic bottom view of the milling insert shown in FIG. 36A.

In addition, as shown in FIG. 34B, cooling fluid used for internal cooling of the milling inserts 950 is redirected, after removing heat from the internal side opposite the cutting edge, to two directions:

A first portion of the cooling fluid is directed, similar to cutting tool 601', back towards the relief surface of the cutting insert 950 via outlet 919b.

A second portion of the cooling fluid is directed backwards to impact the cutting edge of the subsequent milling insert 950, via outlets 918b.

In this manner, cooling fluid usage is somewhat optimized to remove heat not only from the cutting insert to which it is originally directed but from a subsequent cutting insert as well. It is appreciated that the subsequent cutting insert has a cooling mechanism of its own and that a portion of the cooling fluid used therein is directed to a cutting insert subsequent thereto and so on, and so forth.

Figure 37A:
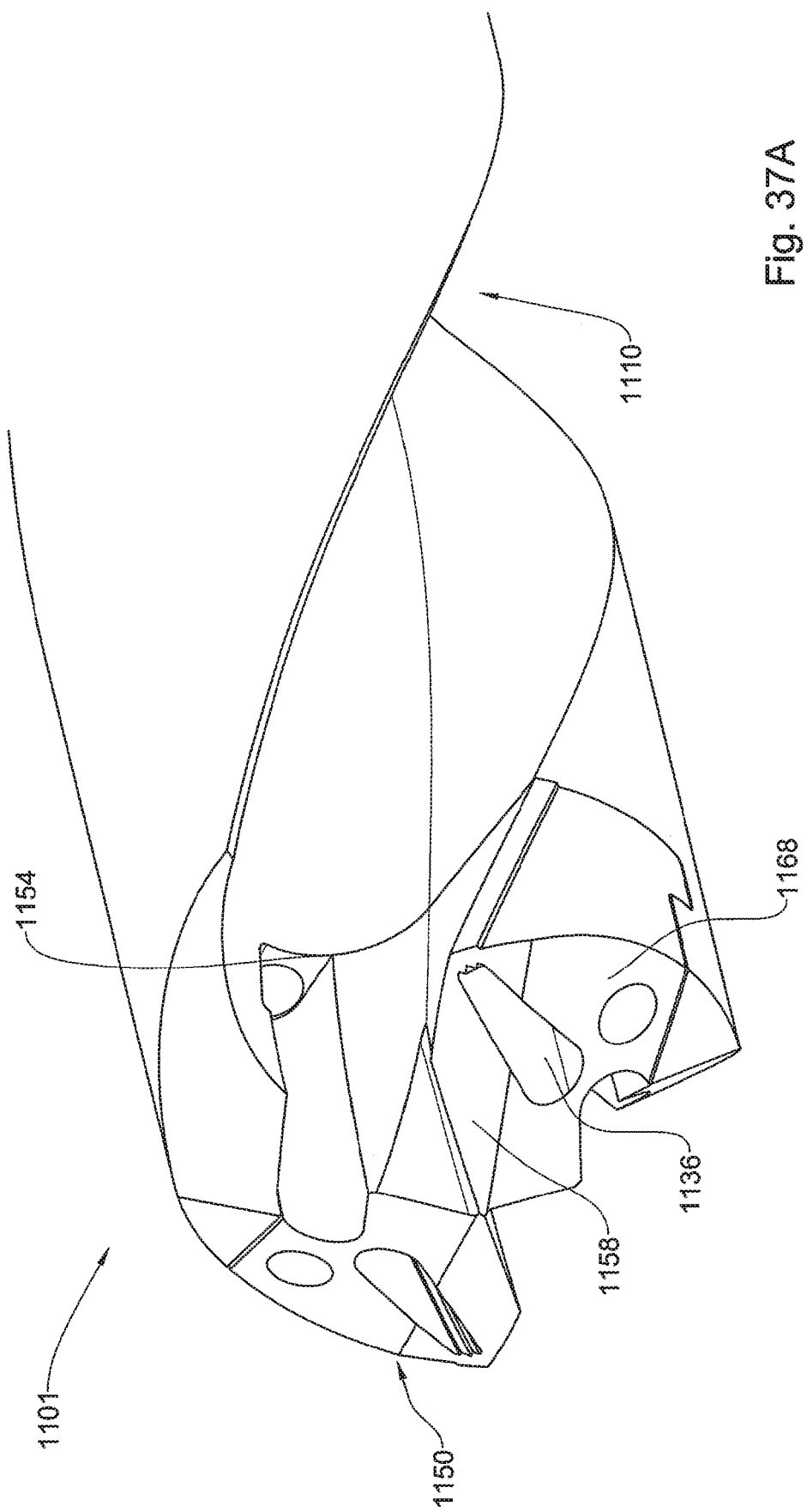
FIG. 37A is a schematic isometric view of a drilling tool according to the subject matter of the present application.
Figure 37B:
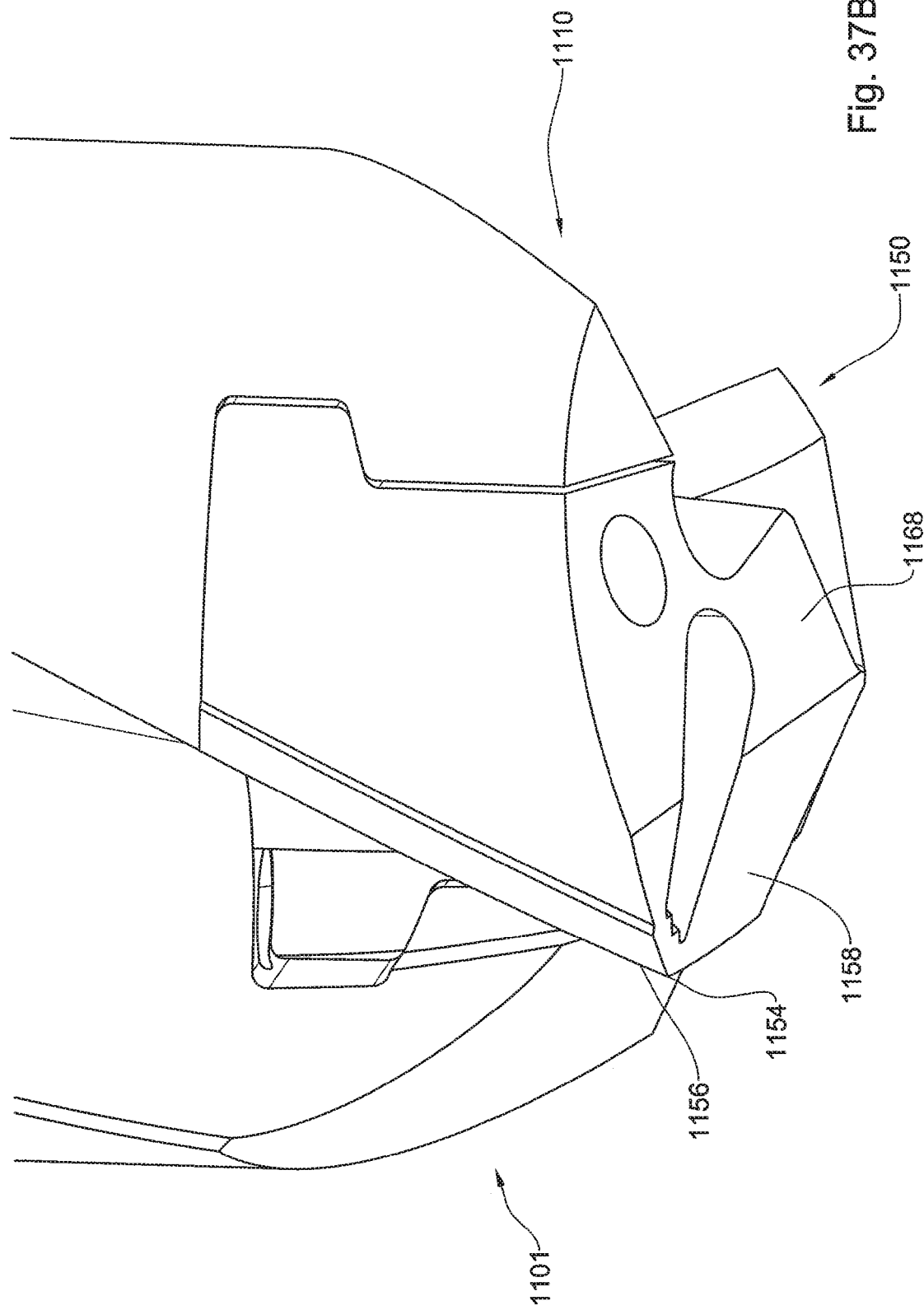
FIG. 37B is a schematic enlarged view of the drilling tool shown in FIG. 37A.

Attention is now brought to FIGS. 37A to 38, in which a drilling tool is shown, generally designated 1101, comprising a tool holder 1110 and a cutting, or drilling, insert 1150. Similar elements have been designated with similar reference numbers, with the addition of 1000 (i.e., cutting insert 1150 uses a similar reference number as cutting insert 650, both having cutting edge 654, 1154 etc.).

In the example described herein, as in previous examples, the cooling cavity 1136 almost reaches the cutting edge 1154 of the drilling tool 1101, allowing to provide cooling fluid directly to the cutting edge 1154.

However, due to the geometry of the drilling tool 1101 (see FIG. 38, the cooling fluid provided thereto ends up at a "dead-end" in terms of flow. In order to remove cooling fluid from such a dead-end and allowing new cooling fluid to flow in and replace it, the drilling tool 1101 makes use of its own spinning and interaction with the workpiece.

In particular, when the drilling tool 1101 revolves with respect to the workpiece, the bottom surface of the bore formed in the workpiece constantly carries away with it, during respective turning of the drilling tool, the cooling fluid "stuck" at the dead-end and removes it from the area. This also allows breaking up the boundary layers at the front surface of the drill, allowing for more efficient cooling and fluid flow.

With particular reference to FIG. 38, the chamfered surface indicated by arrow R does not come into contact with the workpiece, allowing cooling fluid to flow away from the cutting edge as it is removed from the cutting area.

It will be appreciated that while examples described herein with reference to and as illustrated in the accompanying drawing relate to a cutting insert, this is by way of illustrating a non-limiting example only, and are not to be construed as limiting to a cutting insert. The teachings of this disclosure may be applied to any suitable cutting element, and cutting elements provided in accordance with the teachings of this disclosure are included within the scope of the presently disclosed subject matter, mutatis mutandis.

Those skilled in the art to which this invention pertains will readily appreciate that numerous changes, variations, and modifications can be made without departing from the scope of the invention, mutatis mutandis.

The invention claimed is:

1. A cutting insert, comprising:
   a top surface, a bottom surface, and a plurality of side surfaces spanning therebetween;
   a cutting edge formed at an intersection of said side surface and a forwardly-disposed portion of said top surface;
   a cooling cavity projecting into the cutting insert and spanning between an open bottom end formed in said bottom surface and a top end, the top end of the cooling cavity being disposed further forwardly than a forwardmost portion of the bottom end thereof, said cooling cavity defining one or more molding angles, with respect to said bottom surface, along which a molding axis lies, wherein a solid element having the shape of the cooling cavity and completely inserted therein may be retracted intact therefrom along a linear path parallel to said molding axis; and
   a circumscribing portion formed on said plurality of side surfaces and encircling said cutting insert, wherein the circumscribing portion is formed parallel to said molding axis and has a non-zero height, in a direction parallel to said molding axis, along an entire extent thereof, and wherein the cutting insert does not extend beyond the circumscribing portion.

2. The cutting insert according to claim 1, wherein said circumscribing portion is continuous around the cutting insert.

3. The cutting insert according to claim 1, wherein said molding axis is disposed at an angle of 45° with respect to said bottom surface.

4. The cutting insert according to claim 1, wherein said top and bottom surfaces are parallel to each other.

5. The cutting insert according to claim 1, wherein said height of the circumscribing portion varies along an extent thereof.

6. The cutting insert according to claim 1, wherein at least one of the plurality of side surfaces comprises a shelf extending along at least a portion of a length thereof, said shelf defining a plane transverse to said molding axis and facing an area free of material of the cutting insert along any path parallel to said molding axis and intersecting the shelf.

7. The cutting insert according to claim 6, said shelf generally facing towards the top surface.

8. The cutting insert according to claim 6, wherein at least two adjacent side surfaces of the plurality of side surfaces comprise said shelf.

9. The cutting insert according to claim 6, further comprising a second cooling cavity formed on an opposite side thereof, said second cooling cavity being formed correspondingly to the cooling cavity and inverted with respect thereto, and disposed such that the second cooling cavity is open to the top surface.

10. A mold for producing the cutting insert, the cutting insert comprising:
a top surface, a bottom surface, and a plurality of side surfaces spanning therebetween;
a cutting edge formed at an intersection of said side surface and a forwardly-disposed portion of said top surface;
a cooling cavity projecting into the cutting insert and spanning between an open bottom end formed in said bottom surface and a top end, the top end of the cooling cavity being disposed further forwardly than a forwardmost portion of the bottom end thereof, said cooling cavity defining one or more molding angles, with respect to said bottom surface, along which a molding axis lies wherein a solid element having the shape of the cooling cavity and completely inserted therein may be retracted intact therefrom along a linear path parallel to said molding axis; and
a circumscribing portion formed on said plurality of side surfaces and encircling said cutting insert, wherein the circumscribing portion is formed parallel to said molding axis and has a non-zero height, in a direction parallel to said molding axis, along an entire extent thereof, and wherein the cutting insert does not extend beyond the circumscribing portion;
the mold comprising a female mold portion and a male mold portion,
said female mold portion comprising a cavity defined between parallely extending sidewalls and an open top end, and an upwardly facing first imprinting surface formed on a bottom end of the cavity;
said male mold portion being configured to be snuggly and slidably received within the cavity of said female mold portion, and comprising a downwardly facing second imprinting surface;
wherein the first imprinting surface has a shape corresponding to that of a first part of the cutting insert, when oriented such that a molding axis thereof is parallel to the sidewalls of the female mold portion, demarcated by a first edge of the circumscribing portion, and the second imprinting surface has a shape corresponding to that of a second part of the cutting insert, when oriented such that the mold axis is parallel to the sidewalls of the female mold portion, demarcated by a second edge of the circumscribing portion.

11. A method of manufacture of a cutting insert, the cutting insert comprising:
a top surface, a bottom surface, and a plurality of side surfaces spanning therebetween;
a cutting edge formed at an intersection of said side surface and a forwardly-disposed portion of said top surface;
a cooling cavity projecting into the cutting insert and spanning between an open bottom end formed in said bottom surface and a top end, the top end of the cooling cavity being disposed further forwardly than a forwardmost portion of the bottom end thereof, said cooling cavity defining one or more molding angles, with respect to said bottom surface, along which a molding axis lies, wherein a solid element having the shape of the cooling cavity and completely inserted therein may be retracted intact therefrom along a linear path parallel to said molding axis; and
a circumscribing portion formed on said side surfaces and encircling said cutting insert, wherein the circumscribing portion is formed parallel to said molding axis and has a non-zero height, in a direction parallel to said molding axis, along an entire extent thereof, and wherein the cutting insert does not extend beyond the circumscribing portion;
the mold comprising a female mold portion and a male mold portion, said female mold portion comprising a cavity defined between parallely extending sidewalls and an open top end, and an upwardly facing first imprinting surface formed on a bottom end of the cavity;
said male mold portion being configured to be snuggly and slidably received within the cavity of said female mold portion, and comprising a downwardly facing second imprinting surface;
wherein the first imprinting surface has a shape corresponding to that of a first part of the cutting insert, when oriented such that the molding axis is parallel to the sidewalls of the female mold portion, demarcated by a first edge of the circumscribing portion, and the second imprinting surface has a shape corresponding to that of a second part of the cutting insert, when oriented such that the mold axis is parallel to the sidewalls of the female mold portion, demarcated by a second edge of the circumscribing portion;
the method comprising:
providing a mold according to claim 10;
providing raw material in the cavity of the female mold portion;
inserting the male mold portion into the cavity such that the first and second imprinting surfaces face one another; and
forming the cutting insert, from said raw material, in the space between the imprinting surfaces.

12. The method according to claim 11, wherein said raw material is a sintering material, said forming comprising providing sufficient pressure along said molding axis to form the cutting insert from the sintering material.

13. The method according to claim 12, wherein said sintering material comprises a ceramic powder.

14. The method according to claim 11, wherein said raw material is provided in liquefied form, said forming comprising allowing said raw material to solidify.

* * * * *